US012572984B1

(12) United States Patent

Heitmann et al.

(10) Patent No.: US 12,572,984 B1

(45) Date of Patent: Mar. 10, 2026

(54) EMBEDDED COMMUNICATION IN AN INSURANCE BROKERAGE ACCOUNTING SYSTEM

(71) Applicant: Ardent Labs, Inc, Wilmington, DE (US)

(72) Inventors: Mae Heitmann, San Francisco, CA (US); Jordan Katz, San Francisco, CA (US); Michael Mattheakis, San Francisco, CA (US)

(73) Assignee: Ardent Labs, Inc, Wilmington, DE (US)

( * ) Notice: Subject to any disclaimer, the term of this patent is extended or adjusted under 35 U.S.C. 154(b) by 0 days.

(21) Appl. No.: 19/207,138

(22) Filed: May 13, 2025

(51) Int. Cl.
    G06Q 40/08 (2012.01)
    G06Q 40/12 (2023.01)

(52) U.S. Cl.
    CPC ............. G06Q 40/08 (2013.01); G06Q 40/12 (2013.12)

(58) Field of Classification Search
    CPC .............................. G06Q 40/08; G06Q 40/12
    USPC .......................................................... 705/4
    See application file for complete search history.

(56) References Cited

U.S. PATENT DOCUMENTS

| | | | | |
|---|---|---|---|---|
| 8,234,188 B1 * | 7/2012 | Phillips | ................. | G06Q 40/12 705/30 |
| 12,373,885 B1 * | 7/2025 | Bent, II | ................. | G06Q 40/02 |

* cited by examiner

*Primary Examiner* — Robert R Niquette

(57) ABSTRACT

In one embodiment, a method includes displaying, on a user interface of an insurance brokerage accounting system, an identification of at least one of a deposit data object or a production data object; displaying, on the user interface, an embedded communication interactive element that is specific to a particular one of the at least one deposit data object or production data object identified on the display; receiving input from a user including an interaction with the embedded communication interactive element; in response to the user input, displaying a transient embedded communication user interface overlaid on the user interface; receiving, from the user and on the embedded communication user interface, second user input including a communication regarding the particular data object; and displaying, in response to a third user input, the transient embedded communication user interface including the communication and overlaid on the user interface.

20 Claims, 38 Drawing Sheets

Figure 1:
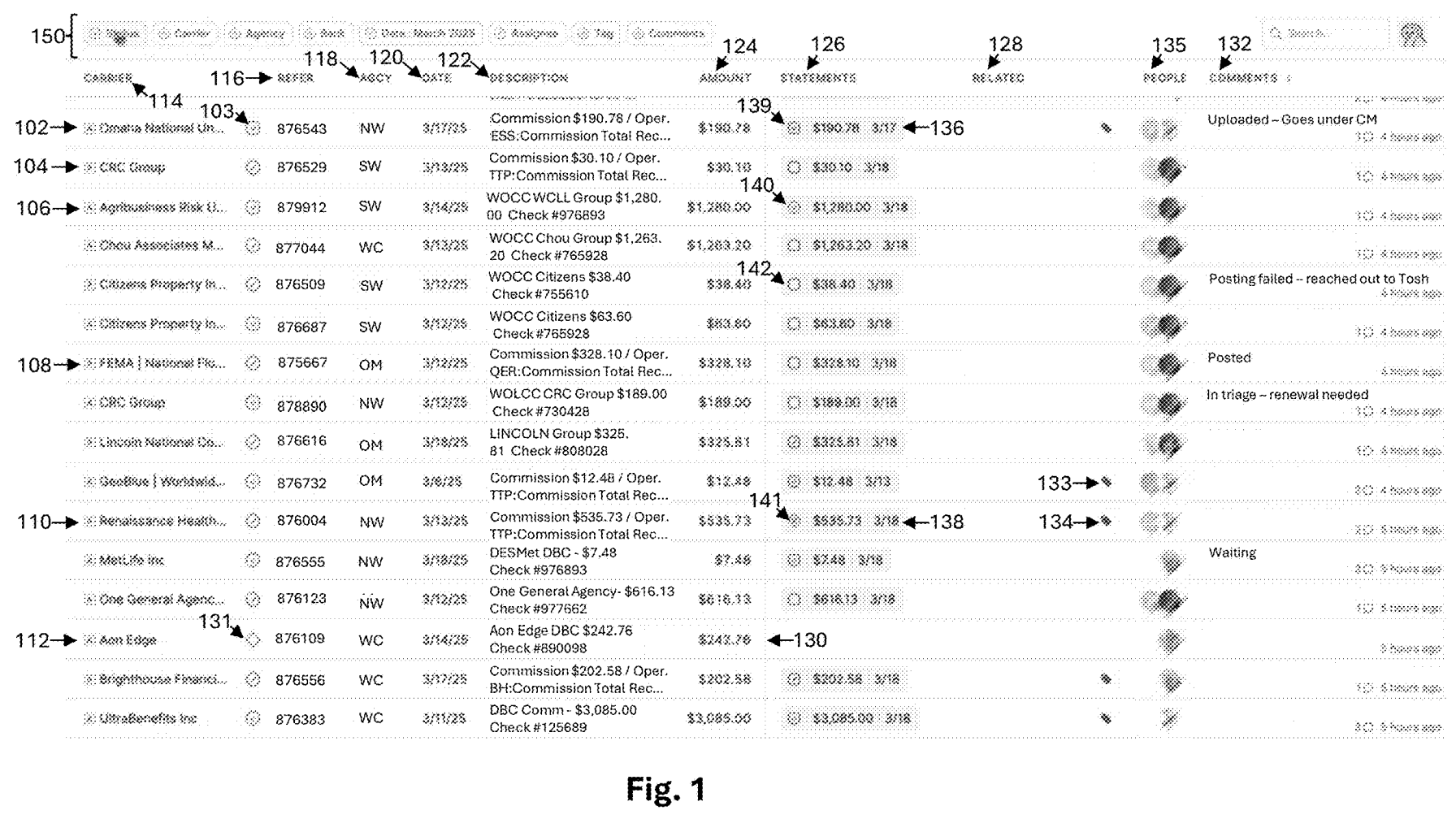

150

132 — Uploaded – Goes under CM

135

128

126

124

102 → Omaha National Un...   876543   NW   3/17/23   Commission $190.78 / Oper. ESS:Commission Total Rec...   $190.78   $190.78   3/17   ← 136

104 → CRC Group   876529   SW   3/13/23   Commission $30.10 / Oper. TTP:Commission Total Rec...   $30.10   $30.10   3/18

106 → Applied Business Risk I...   879912   SW   3/14/23   WOCC WOLL Group $1,280. 00  Check #976893   $1,280.00   $1,280.00   3/18

Chou Associates Manage...   877044   WC   3/13/23   WOCC Chou Group $1,263. 20  Check #765928   $1,263.20   $1,263.20   ← 142

Citizens Property In...   876509   SW   3/12/23   WOCC Citizens $38.40  Check #755610   $38.40   $38.40   3/18

Citizens Property In...   876687   SW   3/13/23   WOCC Citizens $63.60  Check #765928   $63.60   $63.60   3/18

108 → FEMA | National Fl...   875667   OM   3/12/23   Commission $328.10 / Oper. QER:Commission Total Rec...   $328.10   $328.10   3/18   — Posted CRC Group   878890   NW   3/13/23   WOLCC CRC Group $189.00  Check #730428   $189.00   $189.00   3/18   — In triage – renewal needed Lincoln National Co...   876616   OM   3/18/23   LINCOLN Group $325. 81  Check #808028   $325.81   $325.81   3/18

Readitax | Workdesk...   876732   OM   3/8/23   Commission $12.48 / Oper. TTP:Commission Total Rec...   $12.48   $12.48   3/13   133 →

110 → Renaissance Health...   876004   NW   3/13/23   Commission $535.73 / Oper. TTP:Commission Total Rec...   $535.73   $535.73   3/18 ← 138   134 →

MetLife Inc   876555   NW   3/18/23   DESMet DBC - $7.48  Check #976893   $7.48   $7.48   3/18   — Waiting One General Agenc...   876123   NW   3/18/23   One General Agency- $616.13  Check #977662   $616.13   $616.13   3/18

112 → Aon Edge   876109   WC   3/14/23   Aon Edge DBC $242.76  Check #890098   $242.76   ← 130

Brighthouse Financia...   876556   WC   3/17/23   Commission $202.58 / Oper. BH:Commission Total Rec...   $202.58   $202.58   3/18

Ultrabenefits Inc   876383   WC   3/13/23   DBC Comm - $3,085.00  Check #125689   $3,085.00   $3,085.00   3/18

Posting failed – reached out to Tosh

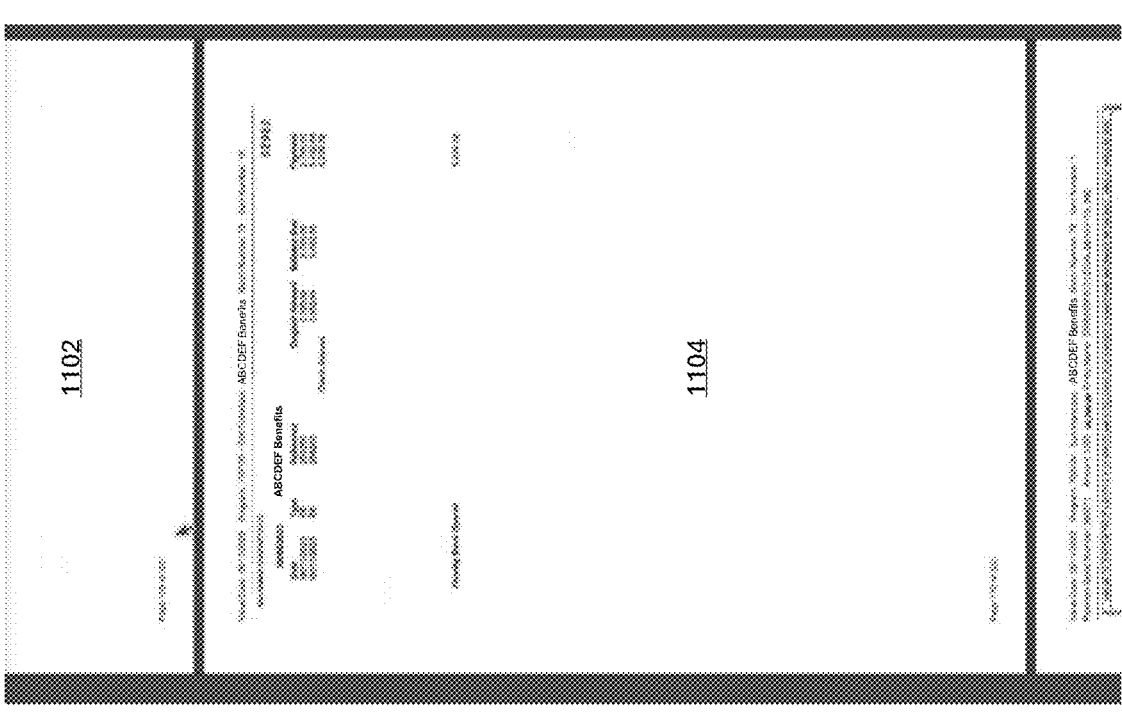
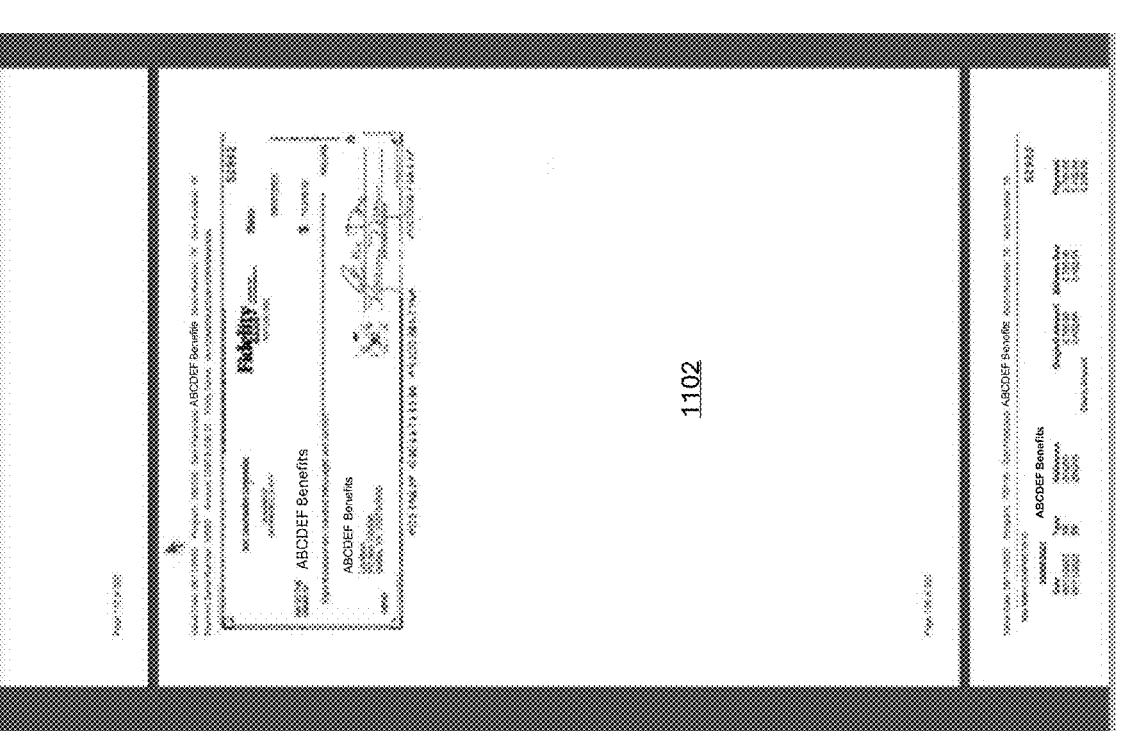
Fig. 11

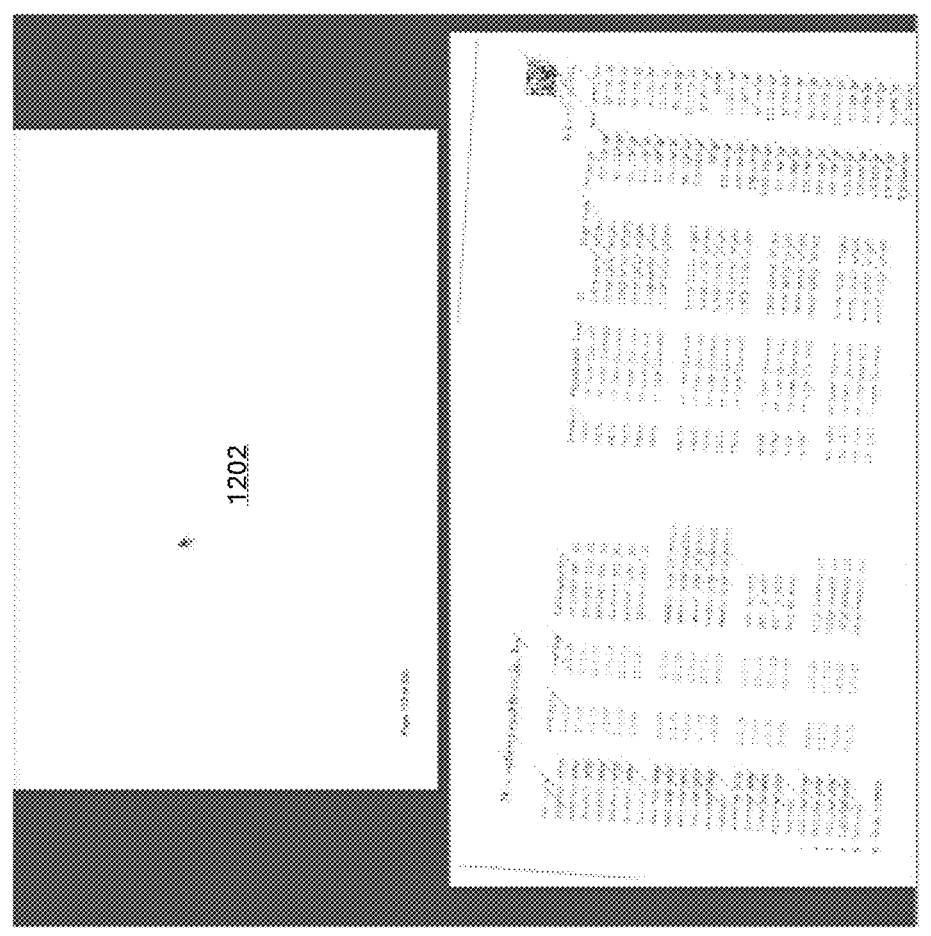
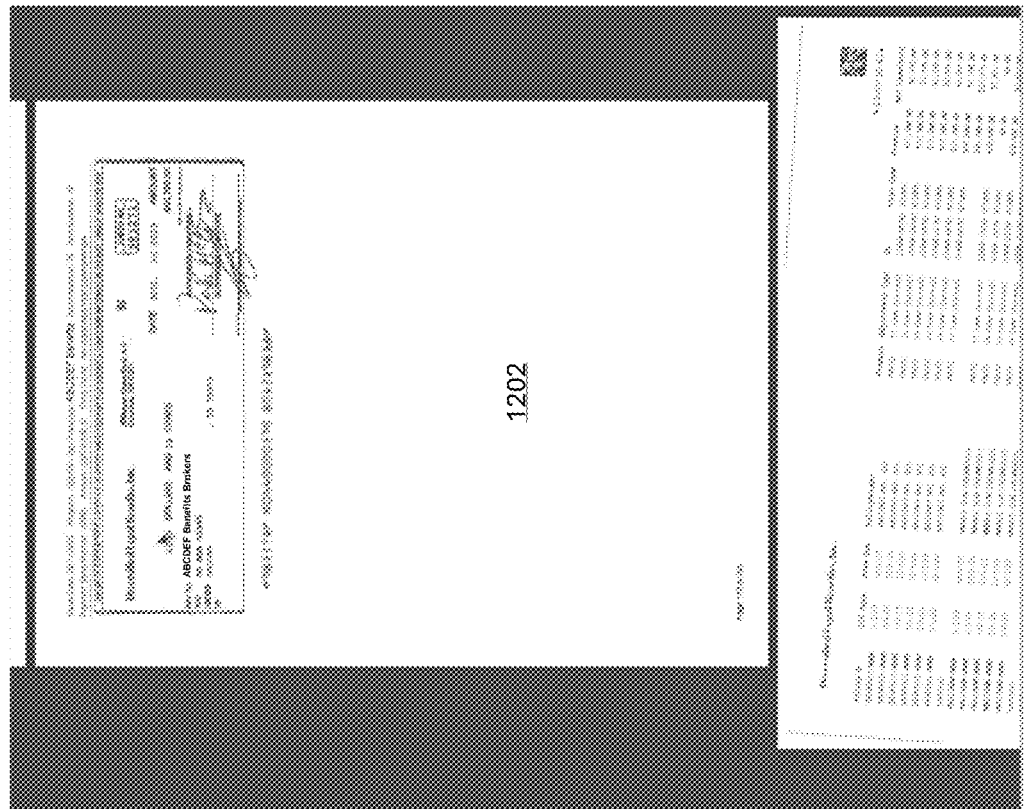
Fig. 12

Fig. 14

Figure 15:
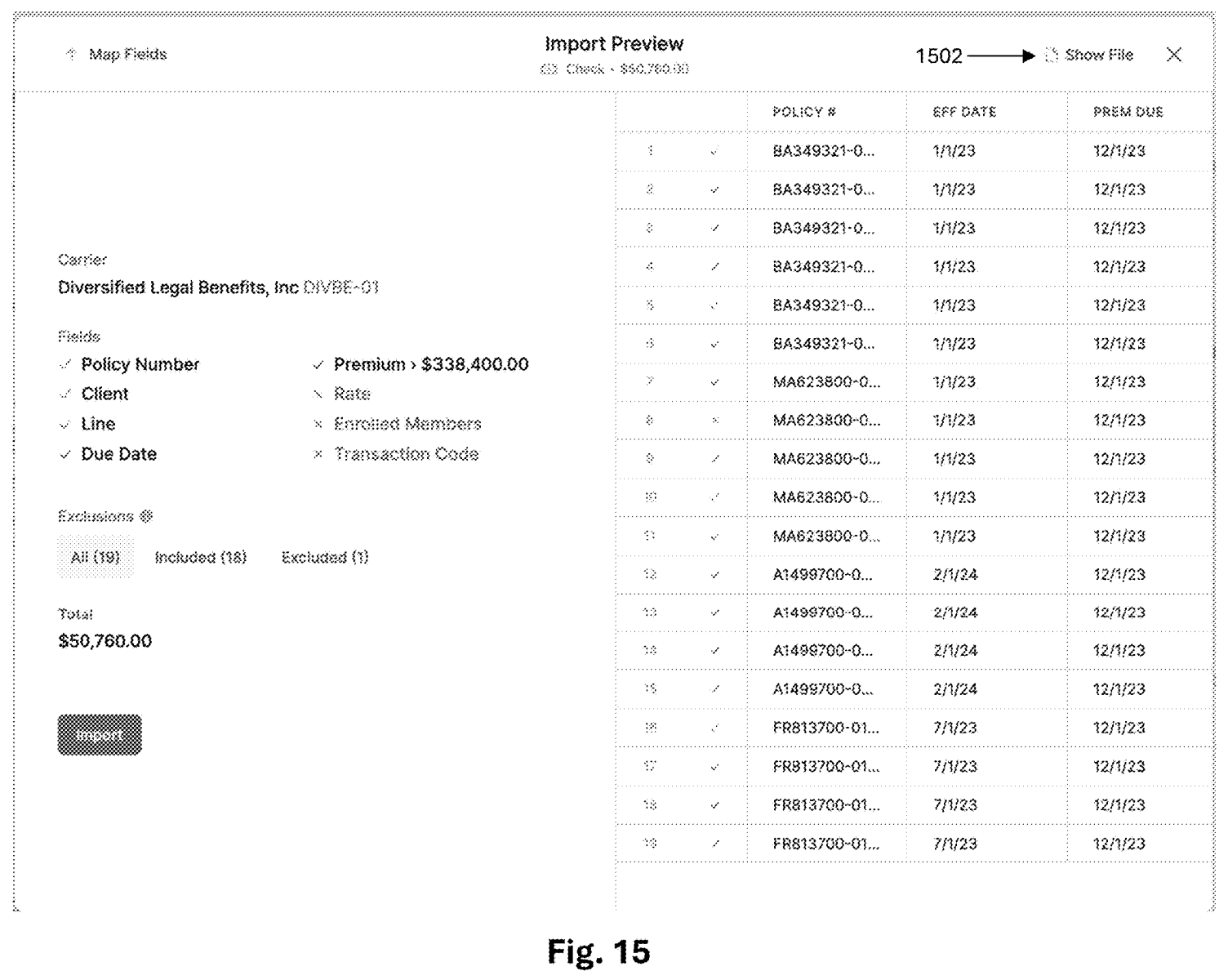

Import Preview

☐ Check - $50,760.00

1502 ⟶ ☐ Show File   ✕

Carrier
Diversified Legal Benefits, Inc DIVBE-01

Fields
- ✓ Policy Number
- ✓ Client
- ✓ Line
- ✓ Due Date

- ✓ Premium > $338,400.00
- ✓ Rate
- ✗ Enrolled Members
- ✗ Transaction Code

Exclusions ⊙
All (19)    Included (18)    Excluded (1)

Total
$50,760.00

| | | | POLICY # | EFF DATE | PREM DUE |
|---|---|---|---|---|---|
| | 1 | ✓ | BA349321-0... | 1/1/23 | 12/1/23 |
| | 2 | ✓ | BA349321-0... | 1/1/23 | 12/1/23 |
| | 3 | ✓ | BA349321-0... | 1/1/23 | 12/1/23 |
| | 4 | ✓ | BA349321-0... | 1/1/23 | 12/1/23 |
| | 5 | ✓ | BA349321-0... | 1/1/23 | 12/1/23 |
| | 6 | ✓ | BA349321-0... | 1/1/23 | 12/1/23 |
| | 7 | ✓ | MA623800-0... | 1/1/23 | 12/1/23 |
| | 8 | ✗ | MA623800-0... | 1/1/23 | 12/1/23 |
| | 9 | ✓ | MA623800-0... | 1/1/23 | 12/1/23 |
| | 10 | ✓ | MA623800-0... | 1/1/23 | 12/1/23 |
| | 11 | ✓ | MA623800-0... | 2/1/24 | 12/1/23 |
| | 12 | ✓ | A1499700-0... | 2/1/24 | 12/1/23 |
| | 13 | ✓ | A1499700-0... | 2/1/24 | 12/1/23 |
| | 14 | ✓ | A1499700-0... | 2/1/24 | 12/1/23 |
| | 15 | ✓ | A1499700-0... | 7/1/23 | 12/1/23 |
| | 16 | ✓ | FR813700-01... | 7/1/23 | 12/1/23 |
| | 17 | ✓ | FR813700-01... | 7/1/23 | 12/1/23 |
| | 18 | ✓ | FR813700-01... | 7/1/23 | 12/1/23 |
| | 19 | ✓ | FR813700-01... | 7/1/23 | 12/1/23 |

| CARRIER | | # | ACCT | DATE | DESCRIPTION | AMOUNT | STATEMENTS | RELATED |
|---|---|---|---|---|---|---|---|---|
| Everest Cash Mutual... | ◇ | 876531 | NW E... | | Commission $48.04 / Oper. HHR:Commission Total Rec... | $48.04 | | |
| Sapphire Insurance... | ◇ | 876640 | NW | | WOCC Group $25,329.73 Check #976893 | $25,329.73 | | |
| Sapphire Insurance... | ◇ | 876421 | NW E... | | FTTHRS CC $4,075.18 | $4,075.18 | $4,075.18 | |
| Nationwide Mutual L... | ◎ | 876556 | MW | | UTR DBC Comm.Rec. Total $2,353.45 | $2,353.45 | $2,353.45 / $2,354.00 | |
| Nationwide Mutual L... | ◎ | 876388 | SW E... | | Commission $75.39 / Oper. BH:Commission Total Rec... | $75.39 | $75.39 / $75.00 | |

Fig. 20

Posting failed

In triage -- renewal needed

Waiting #57697048

Uploaded -- Goes under MB

Posted

Bonus

Feb outstanding

2106

2102

2104

2101

876531-1   MCC    Direct Bill -- WCLL Group +038576583920

876640-2   MCC    Direct Bill -- WCLL Group +038579037590

876421-3   MCC    Direct Bill -- WCLL Group +064827583920

876556-3   MCC    Direct Bill -- WCLL Group +038576000875

876388-4   MCC    Direct Bill -- BAL Group +038576583920

876531-5   MCC    Direct Bill -- BLL Group #38570

876640-6   MCC    Direct Bill -- WCLL Group #220576583920

876421-7   MCC    Direct Bill -- WCLL Group #334509658583920

876556-7   MCC    Direct Bill -- JJH Group #00986495486 / $3.28

876388-8   MCC    Direct Bill -- JJH Group #900949685

876531-9   MCC    Direct Bill -- WCLL Group #45446098

875540-2   MCC    Direct Bill -- WCLL Group +6008778434

878921-3   MCC    Direct Bill -- WCLL Group #09643113

873356-3   MCC    Direct Bill -- WCLL Group +#576583920

876258-4   MCC    Direct Bill -- WCLL Group +#76583920 / $308.57

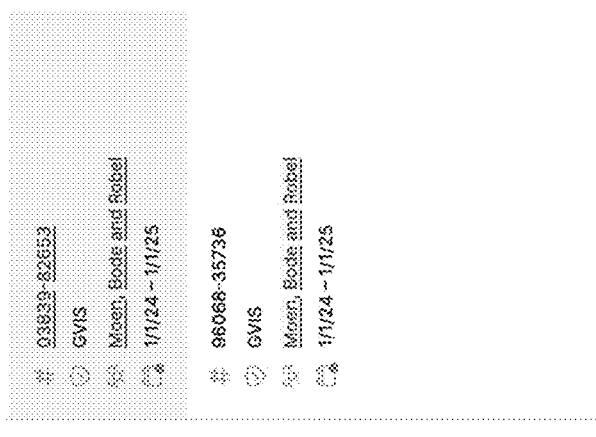
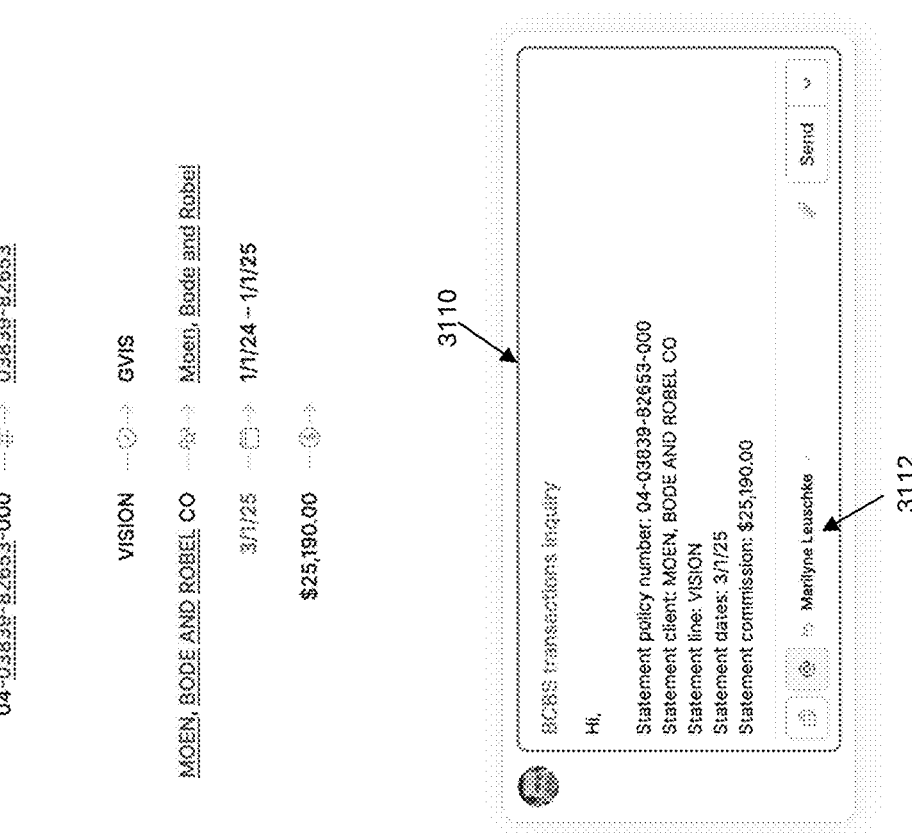
3110
3112
Fig. 31

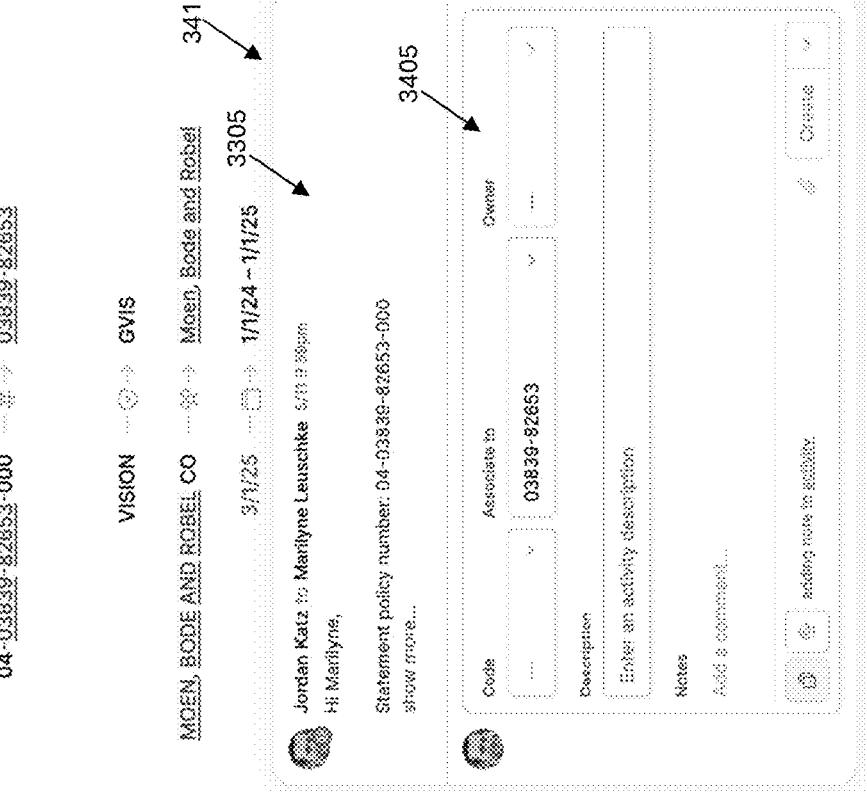
Fig. 34

EMBEDDED COMMUNICATION IN AN INSURANCE BROKERAGE ACCOUNTING SYSTEM

TECHNICAL FIELD

This application generally relates to embedded communication in an insurance brokerage accounting system.

BACKGROUND

Insurance brokers sell insurance policies to clients on behalf of insurance carriers. An insurance carrier is the entity that insures the client, e.g., reimburses the client in the event of a covered loss suffered by the client. The client is the insured entity and may be an individual, a commercial entity (e.g., a business), a non-profit entity (e.g., a school), etc.

Insurance brokers receive a commission agreed to by the relevant carrier in exchange for their services. The client pays some agreed-upon total for insurance coverage. A portion of this total goes to the brokerage as commission, and the remainder goes to the carrier as an insurance premium.

Strict accounting and financial rules govern how a broker accounts for proceeds it receives and disburses. For example, a broker may be paid the full, agreed-upon total from a client, an arrangement that is sometimes referred to as "agency billing." However, a portion of this total is the insurance premium due to the carrier, and the broker must account for and sequester this portion from its own funds, and then direct the premium to the appropriate carrier.

On the other hand, a client may send the full amount due to a carrier, who (after combining many payments for many different reasons) periodically sends a lump-sum payment to the broker, an arrangement that is sometimes referred to as "direct billing." The broker must then unpack why it received this payment, e.g., which specific commission-inducing, policy-level transaction(s) are covered by the payment and which are not, in order to properly account for the payment. Such accounting can get very complicated, for instance because a broker may have many different agencies, each of which uses various accounting systems, and may need to account for thousands or tens of thousands of different policy-level transactions.

BRIEF DESCRIPTION OF THE DRAWINGS

FIG. 1 illustrates an example user interface of an embodiment of an insurance brokerage accounting system.

FIG. 2 illustrates an example deposits user interface and related functionality of an insurance brokerage accounting system.

FIG. 4 illustrates an example of a conventional approach to assigning statement transactions to a policy.

FIG. 5 illustrates an example user interface of a statements view of an insurance brokerage accounting system.

FIG. 6 illustrates an example user interface surfaced in response to a specific user interaction with the user interface of FIG. 5.

FIG. 7A illustrates an example implementation of, and user interface for, applying statement data objects to deposit data objects.

FIG. 7B illustrates an example implementation of, and user interface for, applying statement data objects to deposit data objects.

FIG. 9 illustrates an example user interface illustrating lockbox deposits for a particular account.

FIG. 11 illustrates an example of a native format of the physical deposit illustrated in FIG. 10.

FIG. 12 illustrates an example native format of another physical deposit.

FIG. 14 illustrates an example user interface of an embodiment of an insurance brokerage accounting system.

FIG. 15 illustrates an example user interface surfaced in response to a user interaction with a specific interactive element of the user interface of FIG. 14.

Figure 17:
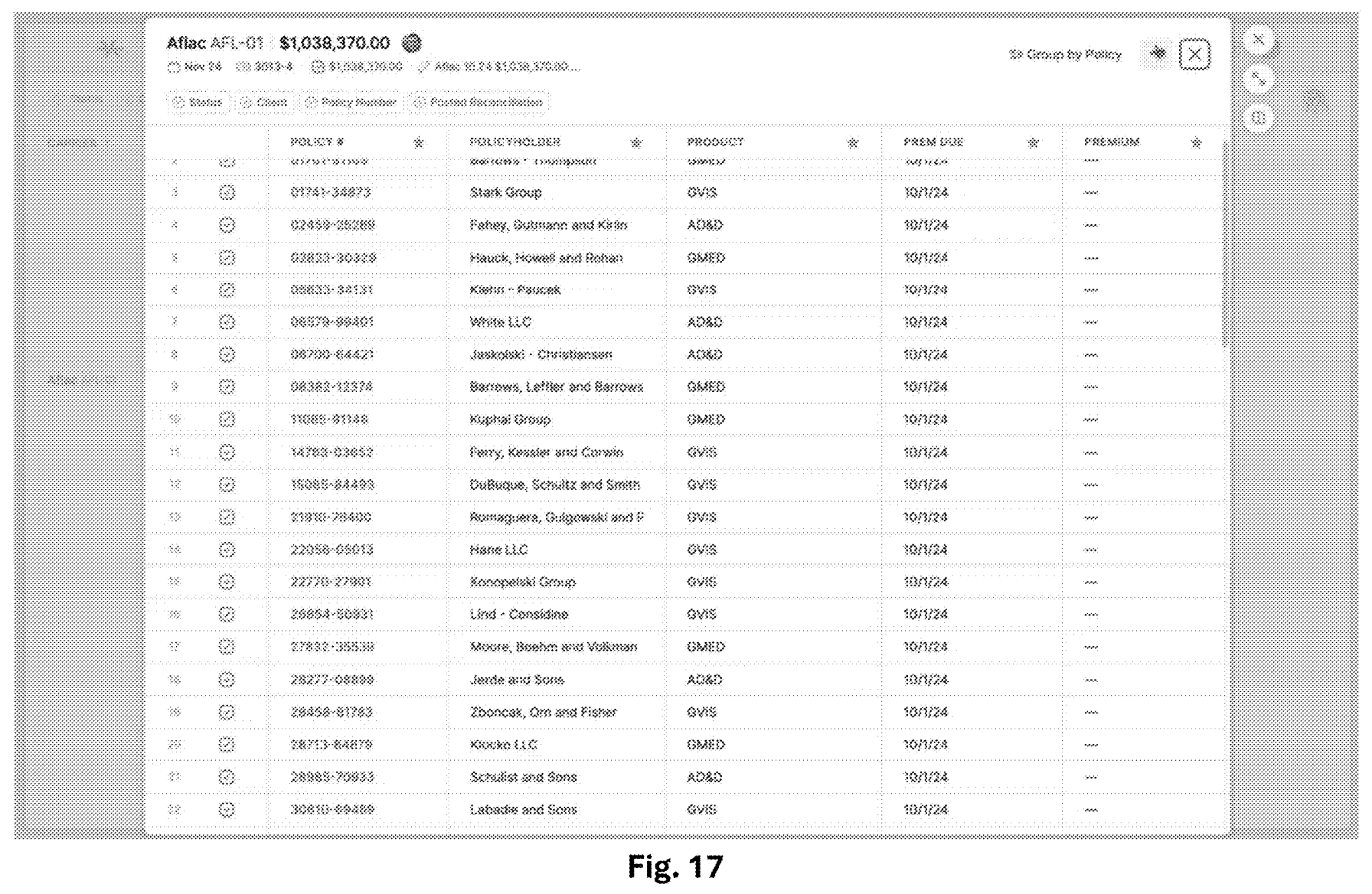

FIG. 17 illustrates an example of formatted transaction data from the pdf statement of FIG. 18.

FIG. 19 illustrates an example embodiment of a particular interactive element of an example user interface of an insurance brokerage accounting system.

FIG. 20 illustrates an example user interface that corresponds to the relationships between certain statement data objects and deposit data objects.

FIG. 21 illustrates an example user interface in which two statement data objects are linked to a single deposit data object.

FIG. 22 illustrates an example user interface of an embodiment of an insurance brokerage accounting system.

FIG. 24 illustrates an example interactive element for importing statements.

FIG. 25 illustrates an example embodiment in which a user has selected a particular interactive element corresponding to a particular carrier.

FIG. 27 illustrates an example of a statements user interface of an insurance brokerage accounting system.

FIG. 29 illustrates an example embodiment of a user interface that is surfaced when a user interacts with a specific portion of the user interface of FIG. 28.

FIG. 31 illustrates an example user interface of an embedded communication element that is surfaced in response to a particular user interaction.

FIG. 34 illustrates another example user interface of an embedded communications interactive element.

DESCRIPTION OF EXAMPLE EMBODIMENTS

Figure 3A:
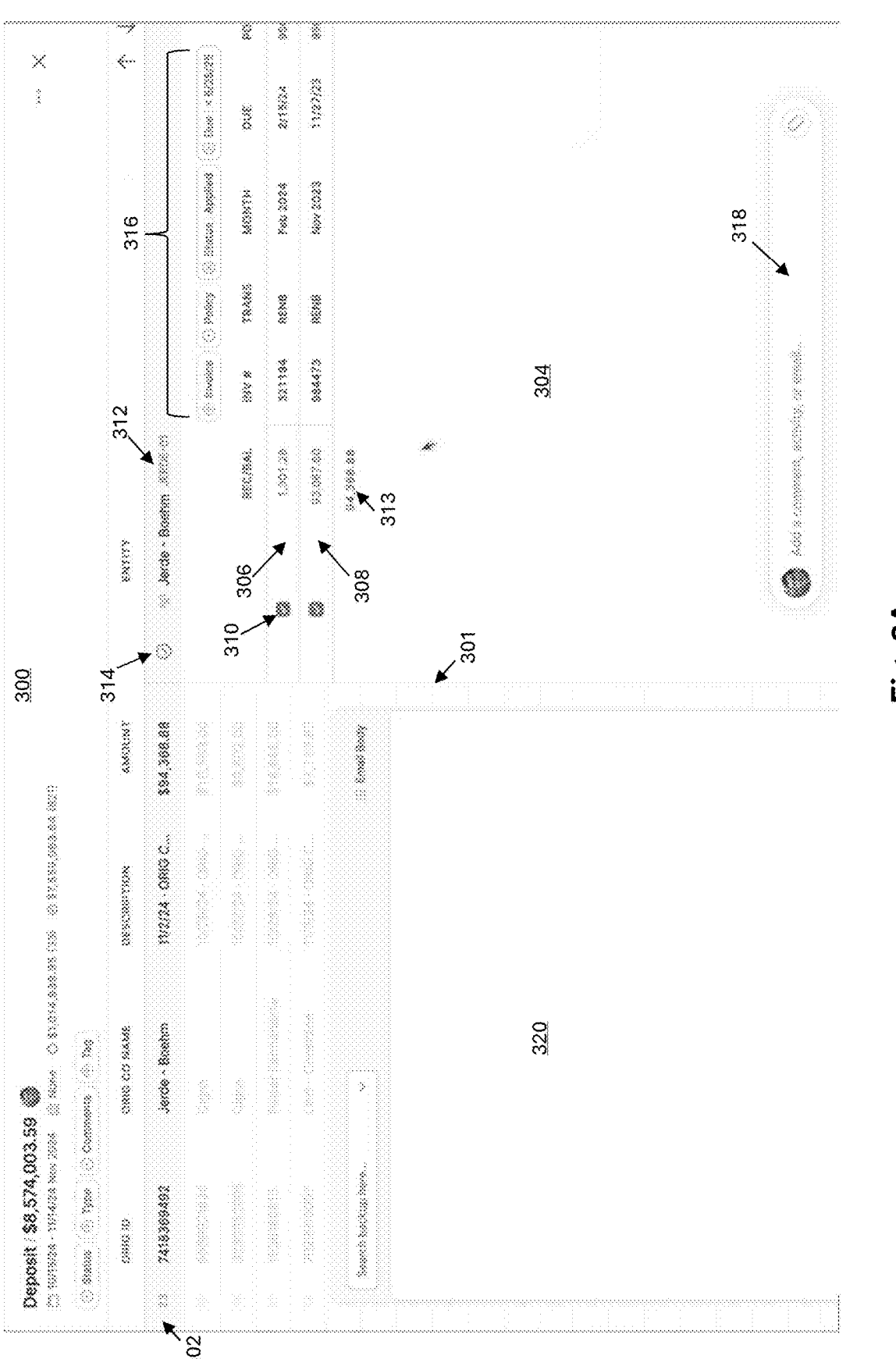
FIG. 3A illustrates an example user interface surfaced in response to a specific user interaction with the user interface of FIG. 2.

One reason insurance brokerage accounting is complex is because the broker receives funds from many different entities. And as described above, different types of funds have different implications for a broker, which are subject to strict accounting regulations. For instance, a broker may receive a deposit from a client, but this deposit includes both funds that are payable to the broker and funds that are payable to the insurance carrier, and the deposit itself does not distinguish between these two items. However, the broker must accurately do so. On the other hand, the broker may receive a deposit, and if that deposit is from a carrier, then the broker is entitled to the entire amount, provided that the broker can properly account for the reason for payment.

For brokerage accounting, reasons for payment are called "production," and include commissions owed to the brokerage, which are typically detailed as policy-level transactions in a statement. These statements may be generated by a broker, by a carrier, or both. However, the statements often do not accompany deposits, and deposits can cover multiple statements, a single statement, or parts of a statement (e.g., some but not all of the policy-level transaction set forth in the statement). However, this too is not something that is identified from the deposit—the broker merely receives some amount of money, and must accurately determine what that money is for. This process is further complicated by the fact that a broker can receive many hundreds or thousands of deposits, which are intended to cover thousands or tens of thousands of policy-level transactions, and the broker must reconcile deposits and production across many carriers and clients. In addition, the broker itself may contain many different agencies, each with its own set of (potentially overlapping) carriers, clients, policy-level transactions, and statements.

Brokerage accounting was traditionally, and in some instances still is, performed using paper records, such as by depositing physical checks and mailing out paper invoices. Reconciliation was performed using a paper general ledger (also referred to as a "system of record"), by which an accountant would record and compute transactions for various accounts. The general ledger is typically organized by type, such as assets, liabilities, revenues, and expenses.

These paper-based processes are now typically computerized and automated, such that deposits, statements, and invoices are often stored as electronic files, such as pdfs. The general ledger is also typically a software product that electronically records the brokerage's account information. Different software applications are sometimes used for each type in the general ledger; for instance, one application may be dedicated to tracking and accounting deposits, while another may be dedicated to tracking and accounting production. These software applications may, for instance, be dedicated to particular subledgers.

However, a problem with this computer-based approach is that the distinct software applications do not cross over from one domain to another. For example, a statement may be posted to a software application dedicated to accounting for production, but this application has no sense of the production's relationship to deposits contained in an application that accounts for revenue. Even when deposits and production are posted to their respective software applications, these applications keep these distinct accounting types separate from each other.

This siloed approach often occurs even when deposits and production are placed into the same accounting system (e.g., a general ledger). For instance, balancing in the general ledger usually occurs at the aggregate level, such that deposits collectively balance statements, without any insight into which deposits actually correspond to which statements (or, if the two aggregates do not balance, the root cause behind the imbalance). Moreover, while certain systems allow a user to manually associate a particular statement data object with a particular deposit data object, such relationships are only statically conveyed to the user (e.g., when the user runs a report on statements and deposits that have been manually matched). And even more fundamentally, such matches cannot partially occur in either direction; only a single statement data object can match to a single deposit data object. In addition, such statement data objects can only be created in the first place if every transaction in the statements is associated with a particular policy. If the brokerage does not know even a single transaction-policy association in a statement, then the brokerage has only two options in conventional systems: (1) wait to post the entire statement to the system, in which case the statement does not exist as a data object and therefore cannot even be manually associated with a data object, and the general ledger will not balance or (2) create an artificial "statement" data object in the system that excludes the unreconciled transaction. However, the second approach means that the artificial statement data object in the system has no real-world counterpart, and also will result in artificial imbalances between matched statements and deposits (e.g., if a deposit fully applies to a particular statement, but the brokerage must remove a $100 transaction in order to post an artificial version of the statement that excludes the transaction, then even if a user manually matches the artificial statement to the deposit data object, the system will show an artificial mismatch of $100 because the artificial statement in fact incorrectly represents the real statement that would fully reconcile with the deposit).

In contrast, this disclosure relates to a software application, or set of software applications, (which is referred to as "the system" in this disclosure) that introduces new functionality and techniques for the specific requirements of insurance brokerage accounting. These application(s) may be stored on, and executed on, a client device of a user, a server device, or a combination of computing devices to provide the functionality described herein. While this disclosure describes many examples and embodiments, one important aspect of embodiments of the system described herein is the creation and use of dynamic, interactive (and often UI-independent) data objects by the system that interface with data objects in the system of record, but are not themselves the data objects in the system of record. And as explained herein, particular embodiments integrate these data objects with specific interactive UI functionality that allows a user to manipulate, create, and modify these data objects, connections between them, and relationships with the system of record in new ways.

FIG. 1 illustrates an example user interface that details several features of an example embodiment of this disclosure, and will be returned to throughout this disclosure. In the example of FIG. 1 are a set of rows (e.g., rows 102, 104, etc.). Each row is divided by a divider 130. In the example of FIG. 1, on the left of divider 130 is a portion of the UI dedicated to displaying information about specific deposits received by a brokerage. As explained in detail below, deposit information is brought into the system in a variety of ways, and each deposit is stored as a deposit data object in the system. The right side of divider 130 includes a portion of the UI that is dedicated to displaying information about statements, such as the statements identified by elements 136 and 138. As explained below, statement information is brought into the system, and each statement is stored as a statement data object. In the example of FIG. 1, the UI on the left side of divider 130 also includes additional portions dedicated to other functionality (e.g., communication regarding the row and its constituent data objects, as described more fully below).

The brokerage must match each deposit to production in order to accurately balance the accounts (e.g., receipts and accounts receivable) in its general ledger. This disclosure describes several aspects of how the insurance brokerage accounting system matches those data objects and creates and manipulates those data objects and relationships between data objects.

In the example of FIG. 1, each deposit has been identified, uploaded into the system, and matched to a carrier prior to its inclusion in the UI of FIG. 1. In other words, a deposit cannot be displayed in the UI of FIG. 1 unless it has first undergone that process and become a deposit data object in the system. Example embodiments of these processes will be described first, below. In addition, certain deposit data objects may be automatically matched to statements (including to automatically identified and uploaded statements that are not fully imported into the system, in particular embodiments), so that when viewed in the example UI of FIG. 1, these deposit data objects have already been balanced to particular statements. Statements may also be manually matched to deposits, e.g., using certain features of the UI of FIG. 1, and these features are likewise described in detail below.

While this disclosure throughout describes interactions with a "carrier," which typically refers to the entity that underwrites an insurance policy, in this disclosure "carrier" is generally more broadly synonymous with "company," in that embodiments of the insurance brokerage accounting system (and a brokerage itself) may interact with insurance-related, non-carrier companies in the same way that the system and brokerage would interact with a carrier. For example, a company can include an intermediary such as another brokerage, e.g., a wholesale brokerage that sells insurance policies on behalf of one or more carriers to downstream brokerages. As another example, a company can include third-party administrators operating as proxies for a carrier. This disclosure contemplates that embodiments of the insurance brokerage accounting system may be used by a brokerage that interacts with such non-carrier companies in place of carriers, that interacts with downstream brokers as its customers rather than directly with end-user (i.e., insured) customers, or combinations thereof, and the techniques described herein with respect to carriers likewise applies to related, non-carrier companies.

Figure 2:
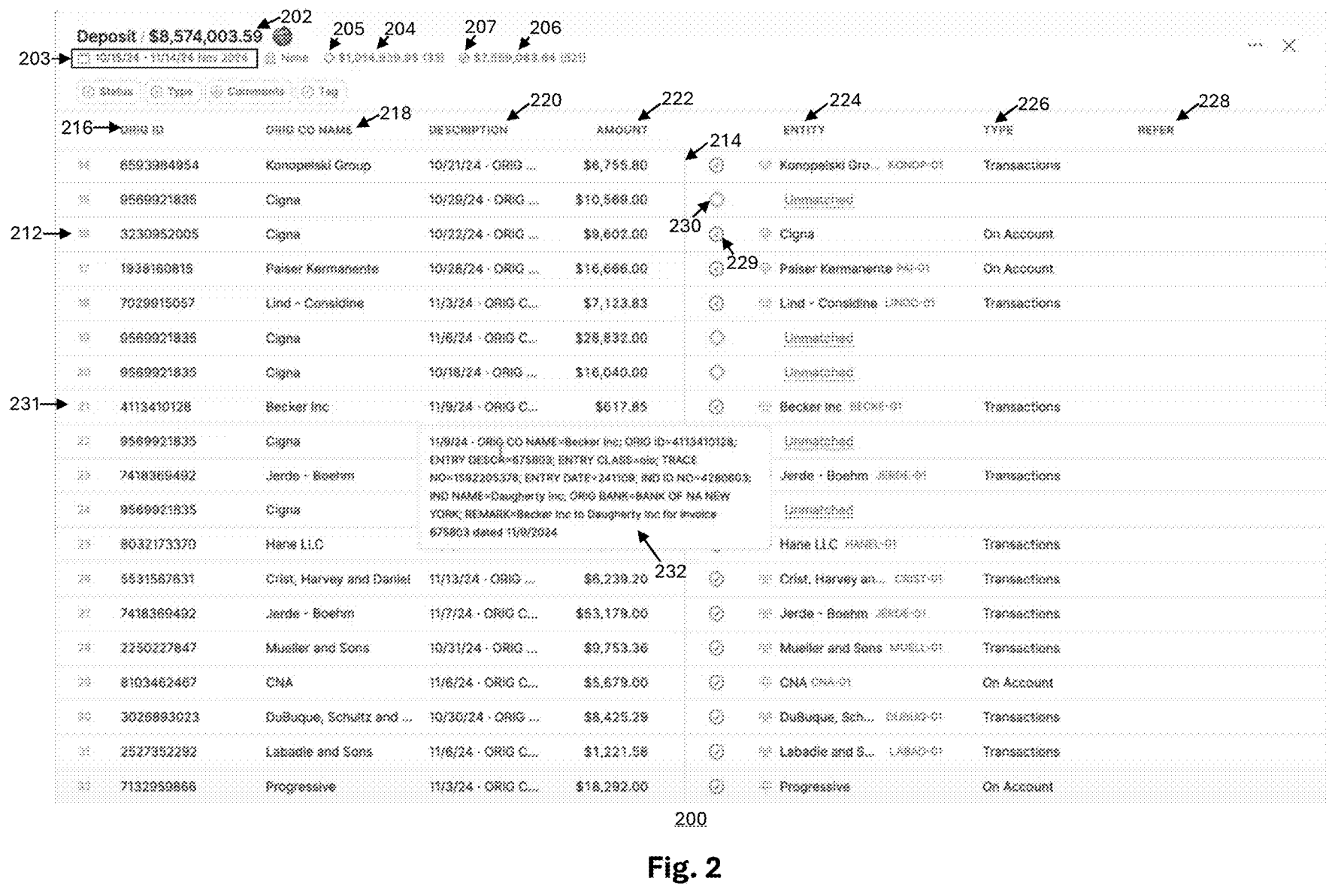

FIG. 2 illustrates an example deposits UI 200 and related functionality of certain embodiments described herein. Example UI 200 includes several rows, such as row 212, and several columns that are explained more fully below. UI 200 includes a divider 214 that separates each row into two sections. In example UI 200, the left side of divider 214 represents deposit data objects in the system. Each row corresponds to a particular deposit data object in the system.

Each deposit data object is derived from ground-truth deposit documents (e.g., from a pdf, a paper check, a spreadsheet detailing EFTs, etc.). Ground-truth deposit documents are ingested by the system, for example, as one or more .csv files or one or more pdfs. For example, a financial institution such as a bank may receive deposits on behalf of (in one or more account(s) of) a broker, and the bank may provide a .csv or other electronic file format that contains information about deposits received in the one or more accounts, for example over a particular period of time (e.g., each day, each week, over a custom period of time, etc.). Particular embodiments of this disclosure extract this information and, after parsing or processing in particular embodiments, display the processed deposit data on a deposits UI in a dedicated portion of the UI, e.g., on the left of divider 214 in the example of UI 200, in association with its respective deposit data object. While deposit data is typically parsed from ground-truth documents (usually in electronic form), embodiments of the system described herein permit a user to manually enter raw deposit information, as well.

In example UI 200, deposit data extracted from a ground-truth document includes, typically for each deposit, an originating ID 216, an originating company name 218, a description 220, and a deposit amount 222. Here, the extracted data originated from the ground-truth document, and the information in that document, may not necessarily correspond to semantically meaningful real-world information. For example, for some financial institutions the originating company name may be an alphanumeric string used by the institution to identify the depositor. As another example, the originator company name may be a shorthand, e.g. "Cigna," although there may be many different "Cigna" entities that exist, and the financial institutions' raw deposit data does not differentiate among these various entities.

In particular embodiments, such as illustrated in UI 200, description 220 may include a consolidation of certain raw financial data extracted from a ground-truth document. For example, a deposit date may be extracted, and in the example of FIG. 2, the deposit date is the first piece of information provided in description 220. In particular embodiments, as illustrated in example UI 200, a user may interact with a particular row's description (e.g., by hovering a cursor over that field for a particular amount of time or pressing and holding that field for a particular amount of time) to reveal a fuller set of description data in UI element 232. For instance, in the example of FIG. 2, a user has hovered a cursor over the description field corresponding to row 231, revealing UI element 232 that provides the full set of description data, such as bank information, remarks or notes accompanying the deposit, etc. Ceasing the interaction (e.g., moving the cursor off the particular description field) may then cause the UI element to disappear.

The example of FIG. 2 identifies a total deposit amount 202 of all the deposits that satisfy the filtered criteria (if any filtering is performed), the total unreconciled amount 204 and a corresponding status identifier 205, the total reconciled amount 206 and a corresponding status identifier 207, and the data range 203 for which deposit data is shown.

In the example of FIG. 2, on the right side of divider 214 each row identifies whether the corresponding deposit data object on the left side of divider 214 is matched to some production in the system. The production may be, for example, a statement of policy-level transactions in a direct-bill arrangement, or may be an invoice sent to a client in an agency-bill arrangement. In the agency-bill arrangement, production may also include a statement containing the policy-level transactions corresponding to the invoice.

In the example of FIG. 2, to the right of divider 214, each row identifies an entity 224, a type 226, and a reference number 228 that identifies whether the production corresponds to a data object in an external accounting system. As illustrated in FIG. 2, if a particular deposit data object has no matching production in the system, then an identifier such as "Unmatched" may be presented to the user, thereby indicating that no relationship exists between the deposit data object and a production data object in the system.

In particular embodiments, data objects can be created and manipulated, both automatically by the software system and through user interactions with various UIs of the system described herein. In other words, for instance as in the example of FIG. 2, each row on the right side of divider 214 is an interactive element that allows a user to create, delete, modify, and inspect specific production data objects. A consistent theme of this description is that certain UIs, such as UI 200, are not merely informational, in that they do not merely display information about a deposit data object and a production data object on the same row. Instead, this display is intrinsically connected to the relationship between data objects in the system-if some production identified on the right side of divider 214 is removed from a row, then a relationship recorded in the system between that production data object and the deposit data object in that row is broken. If a production data object is added to a specific row, then a relationship between that production data object and the deposit data object is created in the system. The converse is also true: if a relationship is created in the system between a deposit data object and a particular production data object, then the corresponding row of UI 200 will be dynamically updated based on this updated relationship.

In contrast, deposits and production are sometimes electronically recorded in separate, siloed accounting systems. These electronically recorded deposits and invoices are treated as data objects in their respective systems, but since they are siloed, modifying a data object in one system does not affect the corresponding data object or a relationship between data objects, nor does doing so affect any change to the display of such data objects in their respective system. For instance, a user may post a deposit into a general ledger and may post a statement into a system that tracks production. The user may conclude that the statement balances the deposit. However, if the user subsequently discovers that the deposit was erroneously attributed—for example, the deposit amount or depositing company was incorrectly identified, or the deposit was mistakenly made and therefore reversed by a financial institution-then while the user can delete the deposit from the general ledger, no change will occur to the separate production accounting, because the two systems are not linked, much less the two data objects that were deemed by the user to correspond to each other.

In the example of FIG. 2, a dynamic status identifier on the right of divider 214 (e.g., identifiers 229 and 230) is displayed for each row. Each status identifier dynamically identifies the real-time status of the deposit data object for its row. For instance, status identifier 230 (e.g., an empty orange diamond, although this color, shape, and fill is just one example of a status identifier) identifies that the deposit data object of that row does not have a matched production data object in this system.

Dynamic Status identifier 229 (e.g., a green checkmark surrounded by a green circle) indicates that its respective deposit data object has been matched to, and is accounted for by, the production data object identified on the right of divider 214 in that row. As explained below, because the data objects in the example of FIG. 2 correspond to, but are distinct from, posted data objects in the accounting system of record, users can modify data objects in the system corresponding to UI 200 without necessarily modifying the accounting system of record. For instance, a user can investigate potential mistakes and perform adjustments to the data objects in the system of UI 200, and then when satisfied that the adjustments are in fact appropriate, can propagate these changes to the accounting systems of record, without actually changing the accounting systems of record while performing the investigation and adjustments. However, particular embodiments can reflect the relationship between data objects in the system described herein with corresponding data objects in the system of record, as described more fully below.

The relationship between deposit data objects and production data objects can be dynamically modified through user interactions with UI 200. In the example of FIG. 2, each row on the right side of divider 214 is an interactive element that, when interacted with (e.g., selected via a click or touch, etc.), surfaces another UI that reveals details about the relationship between the deposit data object in that row and matched production data deposits, if any. Particular embodiments also allow a user to create relationships between data objects in this surface UI, as well as to create production data objects themselves, in particular embodiments.

FIG. 3A illustrates an example UI in which a user has selected row 23 of UI 200. In the example of FIG. 3A, the left side of divider 301 identifies some of the deposit data objects shown on the left side of divider 214 in FIG. 2. However, the selected deposit (row 302) is now at the top of the left side of divider 301; is emphasized relative to the other, unselected rows; and appears in the same relative order compared to the other rows. This both orients the user as to where they are relative to the UI flow in the previous screen, and also emphasizes the specific deposit data object they are working with.

On the right side of divider 301 is UI portion 304, which shows production data objects that are matched to the deposit of row 302. FIG. 3A illustrates a specific example in which two distinct invoices, the invoice of row 306 and the invoice of row 308, in fact correspond to a single deposit, deposit 302. That relationship of each invoice data object to the deposit data objects is adjustable through the check boxes shown on their respective rows; e.g., element 310 can be toggled to disassociate or associate the invoice data object identified by that row with the deposit data object. Total 313 shows the total of the applied invoices, and in the example of FIG. 3A, this total is shown with a certain graphical emphasis (e.g., green text) to indicate that the sum total of the selected, matched invoice data objects in fact balance the corresponding deposit data object identified in row 302. Dynamic status identifier 314 illustrates the status of this deposit data object. Item 312 shows identifying information about the deposit data object, e.g., in the example of FIG. 3A, this shows both the depositing entity name and a code "JERDE-01" that the accounting system uses to identify that particular entity. Thus, item 312 corresponds to entity identifying information in the accounting system of record, which may or may not correspond to the raw deposit data (e.g., to the originating company name provided in a financial institution's electronic deposit record).

In the example of FIG. 3A, filters 316 allow a user to filter among various production data objects in UI 304. Embedded communications element 318 allows users to create dynamic communication elements within UI and to associate those communications with specific data objects, as explained more fully below. Element 320 in the example of FIG. 3A is used to identify a ground-truth document regarding the deposit (e.g., an actual deposit check image), as explained more fully below.

Figure 3B:
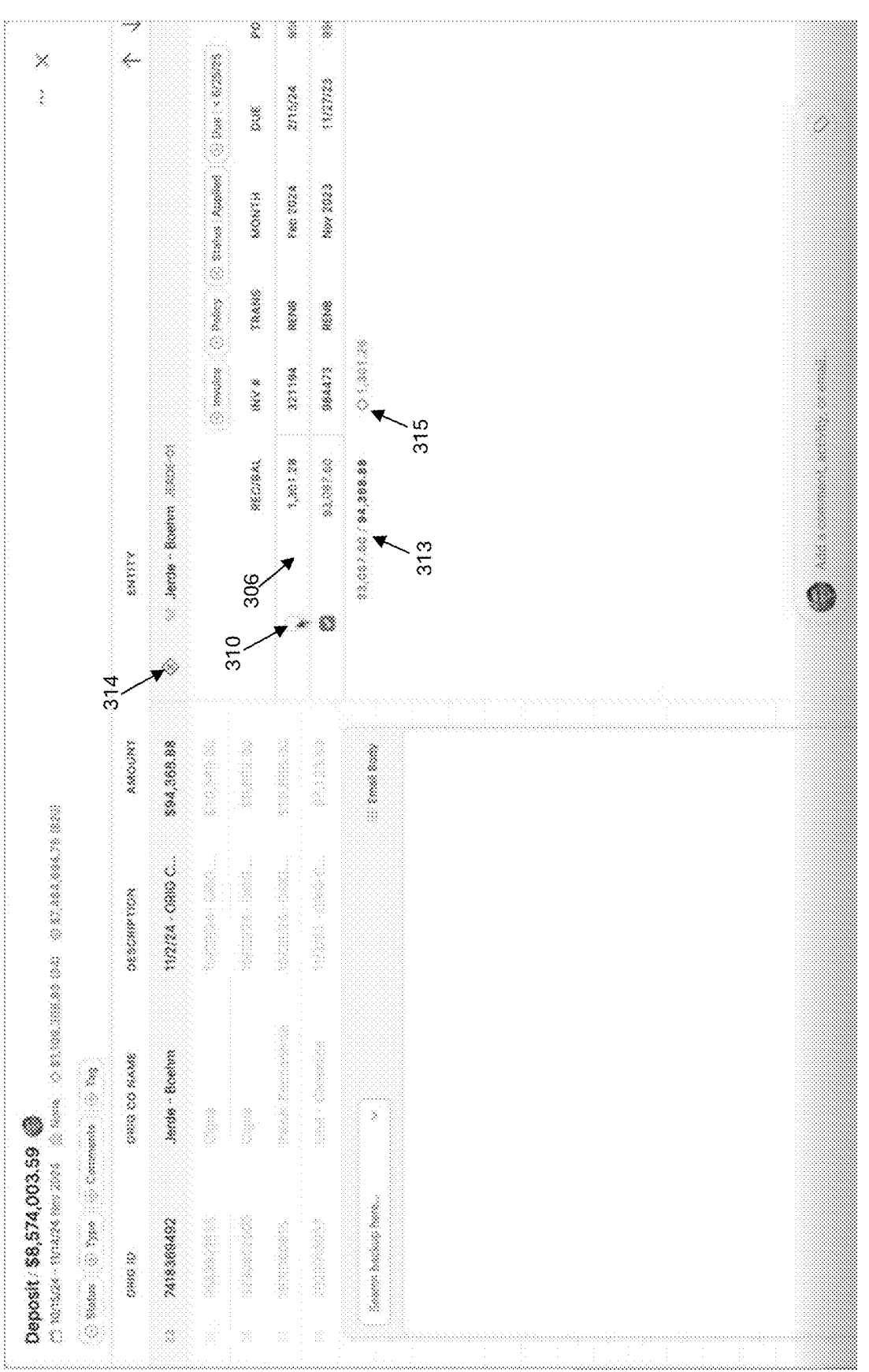
FIG. 3B illustrates example user-interface functionality when the relationship between production data object(s) and the corresponding deposit data objects changes.

FIG. 3B illustrates an example of how UI 304 is updated when the relationship between production data object(s) and the corresponding deposit data objects changes. For instance, a user may select element 310 to dissociate the corresponding invoice data object in row 306 with the deposit data object. Because these data objects are dynamic, and the UI reflects this, the user's dissociation creates a cascade of UI effects. For instance, status identifier 314 for the deposit data object is dynamically updated to reflect the fact that the deposit data object no longer balances with the production data objects it has a relationship with. Here, status identifier 314 is updated to be an orange diamond containing a "does not equal" sign, meaning that the deposit data object is matched to one or more production data objects, but is not fully accounted for by these matched objects. Likewise, total 313 is updated to reflect the effect of dissociating the invoice data object identified in row 306 by showing both the total deposit ($94,368.88) and the matched total ($93,067.60). A new identifier 315 is also surfaced to show that a production data object surfaced in this UI is neither matched to, nor accounted for by, a deposit data object.

Particular embodiments of the system described herein automatically match one or more production data objects with a deposit data object. Production can include statement data objects, which itemize a set of policy-level transactions (e.g., commissions owed to the brokerage), and invoice data objects, which is a bill to a client for the full amount related to one or more policies. As explained more fully herein, these two different kinds of production come with various complications for insurance brokerage accounting.

For instance, a deposit merely reflects the fact that some money was deposited in a brokerage's bank account. But that does not explain what the deposit is for, or whether a portion of the deposit (and if so, how much) is actually due to a different entity (e.g., a carrier). In addition, a single deposit is often made for multiple, independent reasons, such that finding a correspondence between the deposit and the production defining the reason for the deposit is not a trivial task.

A production data object must ultimately balance against receipts. In particular embodiments, production data objects may be related to, but distinct from, the data objects that are maintained by the general ledger and various external sub-ledgers. This approach provides various benefits, as described more fully herein.

For an insurance broker, a deposit must ultimately be matched to a statement, a part of a statement, or more than one statement that identifies policy-level transactions of the brokerage. In other words, at least some of a deposit is for at least one transaction, and that transaction will appear somewhere in a statement. For deposits that correspond to direct-bill embodiments, then the payment comes from a carrier and (should) be only for policy-level transactions, and therefore successfully matching the deposit to the transactions should result in a full reconciliation. In contrast, for agency-bill embodiments (in which the insured client pays the full amount to the brokerage, and the brokerage must separate the payment amount into premium amounts due to one or more carriers and commission amounts to be retained by the broker), then a deposit should be matched to both policy-level transactions in one or more statements and to one or more invoices. The latter scenario can be particularly impactful, because legal and industry requirements demand that brokers place monies held on behalf of others in a trust account, so identifying and balancing deposits received from a client is an important thing to get right and can result in real repercussions if done inaccurately.

Particular embodiments attempt to, and do, match deposits to production data objects using some or all of the techniques described below. As described below, particular embodiments can dynamically create production data objects, can dynamically link those data objects with deposit data objects and with corresponding (but distinct) production data objects in an external accounting system, and can show in real-time the status of the dynamic data object and its relationship to other data objects within the system and in external accounting systems. In addition, as explained below, particular embodiments can create connections between portions of data objects, for example by matching a deposit to many statements, many deposits to one statement, many deposits to many statements (but as a single, balanced entry in the accounting system), and partial statements to a deposit or partial deposits to a statement. None of this functionality is available in conventional accounting systems.

Figure 4:
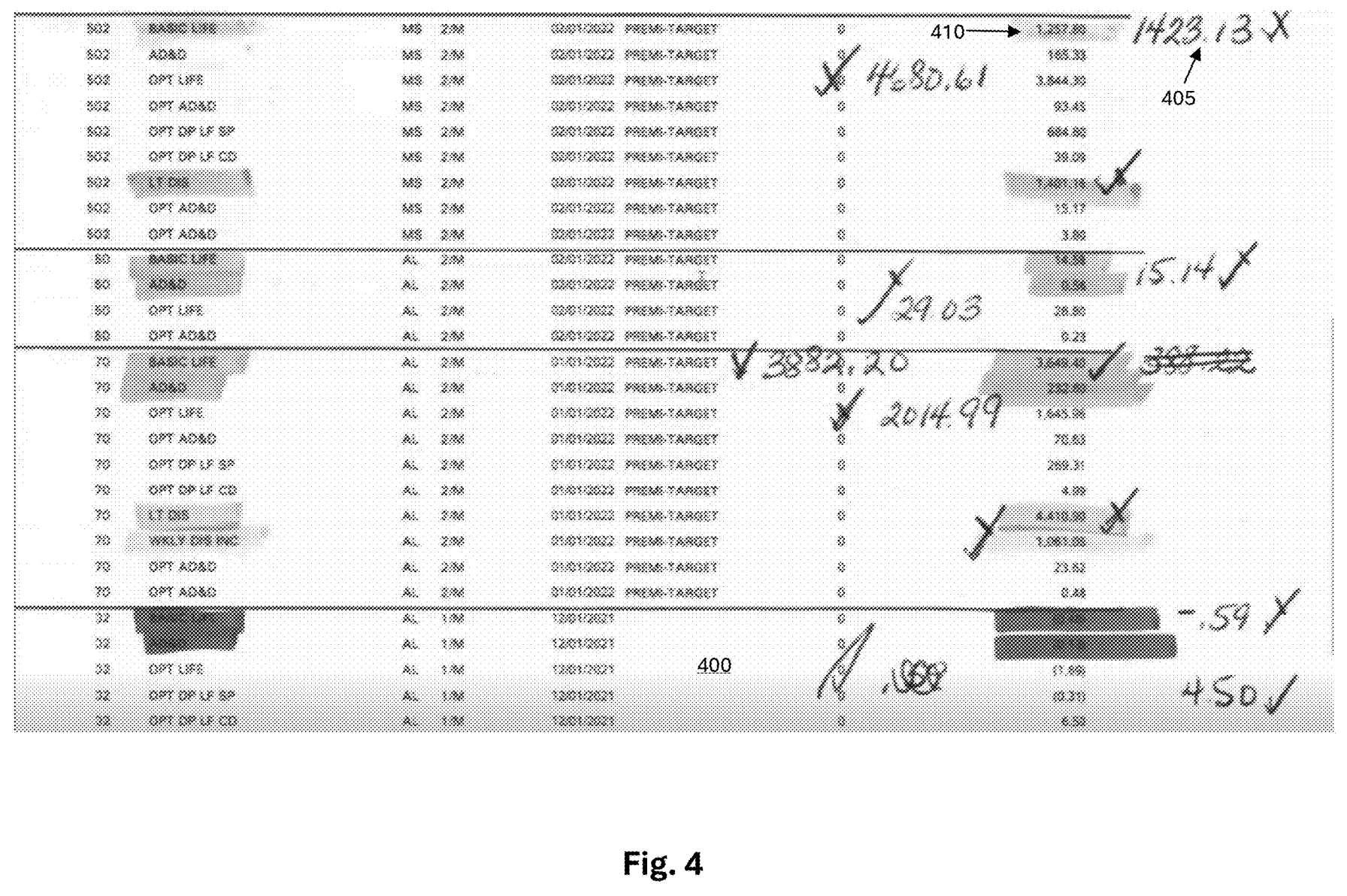

For instance, FIG. 4 illustrates an example of a conventional approach to reconciling transactions 400 to specific policies, which in conventional systems, must occur prior to any deposit-level balancing between deposits and statements (and as explained above, such balancing typically occurs only at the aggregate level in conventional systems). Transactions in a statement typically are provided in a format that is not interactive (e.g., a pdf), and so adjusting and reconciling the transactions in FIG. 4 requires manual adjustments, such as adjustment 405 to transaction 410. However, because transactions 400 are merely contained in an electronic document, identifying these adjustments does not effectuate any change in an accounting system, including system of record. Instead, in order to keep track of the adjustments being made, in the example of FIG. 4 a user has employed highlighting of various colors to identify the changes to the transactions shown.

These problems still exist if done purely electronically, e.g., using a computer. For instance, extracting the data of FIG. 4 and placing it in, e.g., a spreadsheet, allows a user to annotate transaction adjustments electronically. Even then, however, these spreadsheet entries are not actually associated with, or perform any updates to, any data objects in the accounting system of record, and therefore do not alter any data object in an accounting system or any relationship between data objects, nor do they provide real-time statuses of those objects and their relationships. While the example of FIG. 4 illustrates reconciliation of transactions to particular policies, these challenges are more broadly true; for instance, a user may perform similar annotations as those shown in FIG. 4 to a statement in an attempt to reconcile statements or particular transactions to deposits, but doing so (whether performed electronically or not) has no bearing on the accounting system of record, nor does it create or modify any relationships between actual data objects or provide any dynamic information about the work the user is doing.

Moreover, as described herein, insurance brokerage accounting is particularly complex and challenging for users attempting to navigate conventional accounting systems. For instance, the large number of policy-level transactions create both lots of data and complex tracking and reconciling procedures, given that each transaction should ultimately reconcile to a particular deposit. In addition, the limitations of existing systems and user interfaces require users to maintain, update, and navigate amongst many different user interfaces and sources of data; for instance, a user would have to navigate to many different user interfaces in conventional systems to see which particular transactions in a statement do not have an assigned policy; which set of statements are not fully allocated to a particular deposit; which production items are being worked on but are not yet posted; and which deposits are reconciled to some production. Doing so over variable time frames adds additional layers of complexity. In contrast, the techniques described herein reduce and eliminate many of these challenges and drastically reduce the amount of navigating among different applications and user interfaces that is required by conventional systems, among other benefits described herein.

Figure 5:
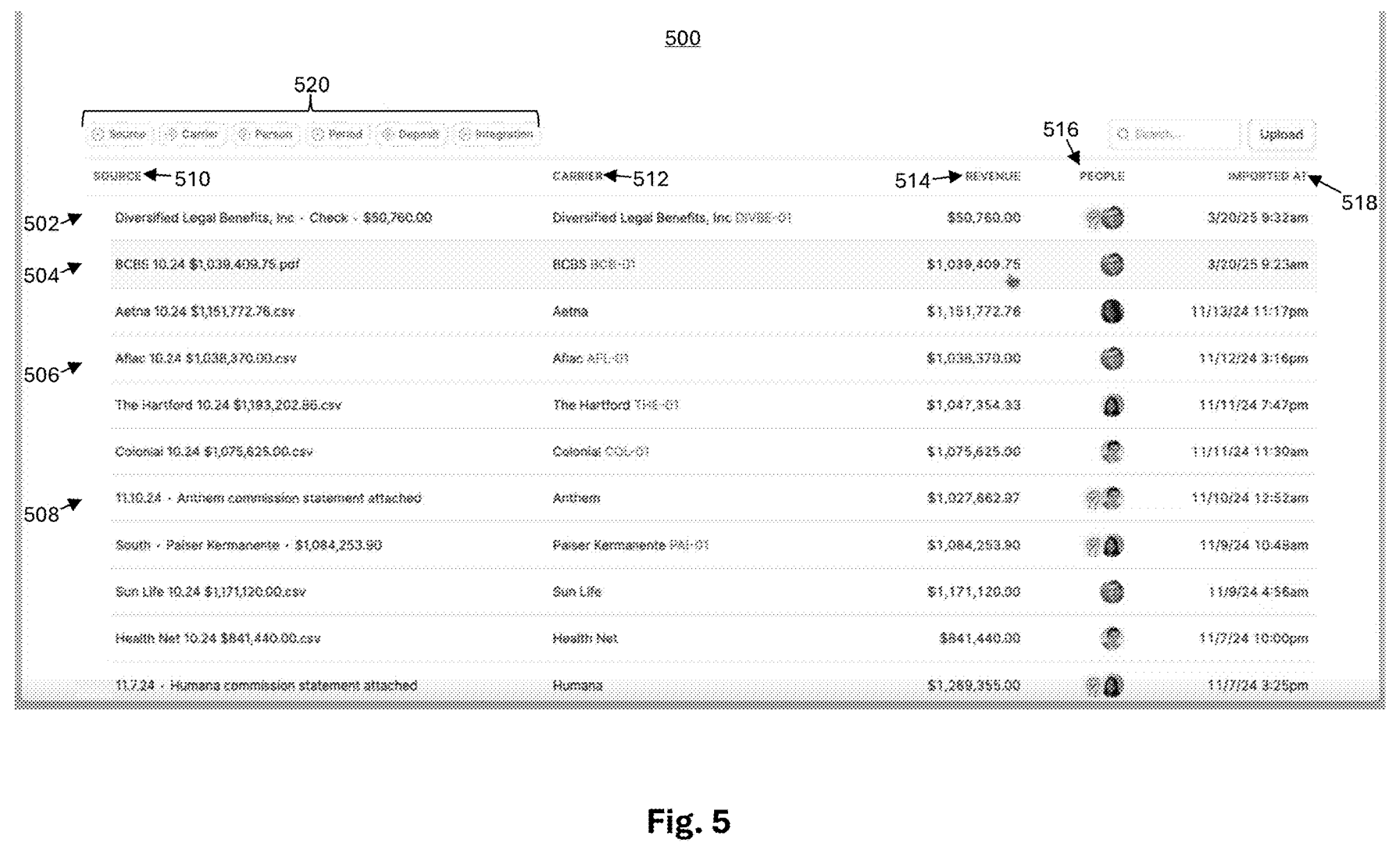

FIG. 5 illustrates an example UI 500 of a statement view of particular embodiments of the system described herein. In the example of FIG. 5, UI 500 includes rows, such as rows 502, 504, 506, and 508, each of which corresponds to a particular statement data object in the system. Column 510 identifies the raw (ground truth) document from which the statement data object was created. FIG. 5 illustrates some of the many different ways in which a statement can be provided to a user. For instance, the statement represented in row 502 (also referred to as statement 502) arrived with a check payment, from which statement 502 was derived (as explained below); statement 504 arrived as a pdf; statement 506 arrived as a csv file, and statement 508 was obtained as an attachment to an email (as explained more fully below). Despite these differences in formats, each ground-truth statement is parsed and placed into a consistent format that the system uses to represent statement data objects.

Column 512 identifies the insurance carrier to which transactions in the statement pertain (i.e., from whom the commissions are owed). As illustrated in FIG. 5, carriers may have both an entity name (in bold text in column 512) and an entity identifier (identified by the smaller alphanumeric string—e.g., "BCB-01"). In particular embodiments, the entity identifier takes the role as an identifier in the accounting system, as a carrier may have different names (e.g., may have different subsidiaries), and/or a brokerage may have several different agencies that represent a carrier with an inconsistent entity name (e.g., "AMCO" vs. "AMCO, Inc." vs. "America Mutual Company," etc.). Column 514 identifies the total statement amount. Column 516 identifies brokerage employees currently identified as assigned to, or working with, the statement data object. Column 518 identifies the date and time at which the statement was imported to the accounting system. Filters 520 allow a user to filter among the statement data objects in the system.

Figure 6:
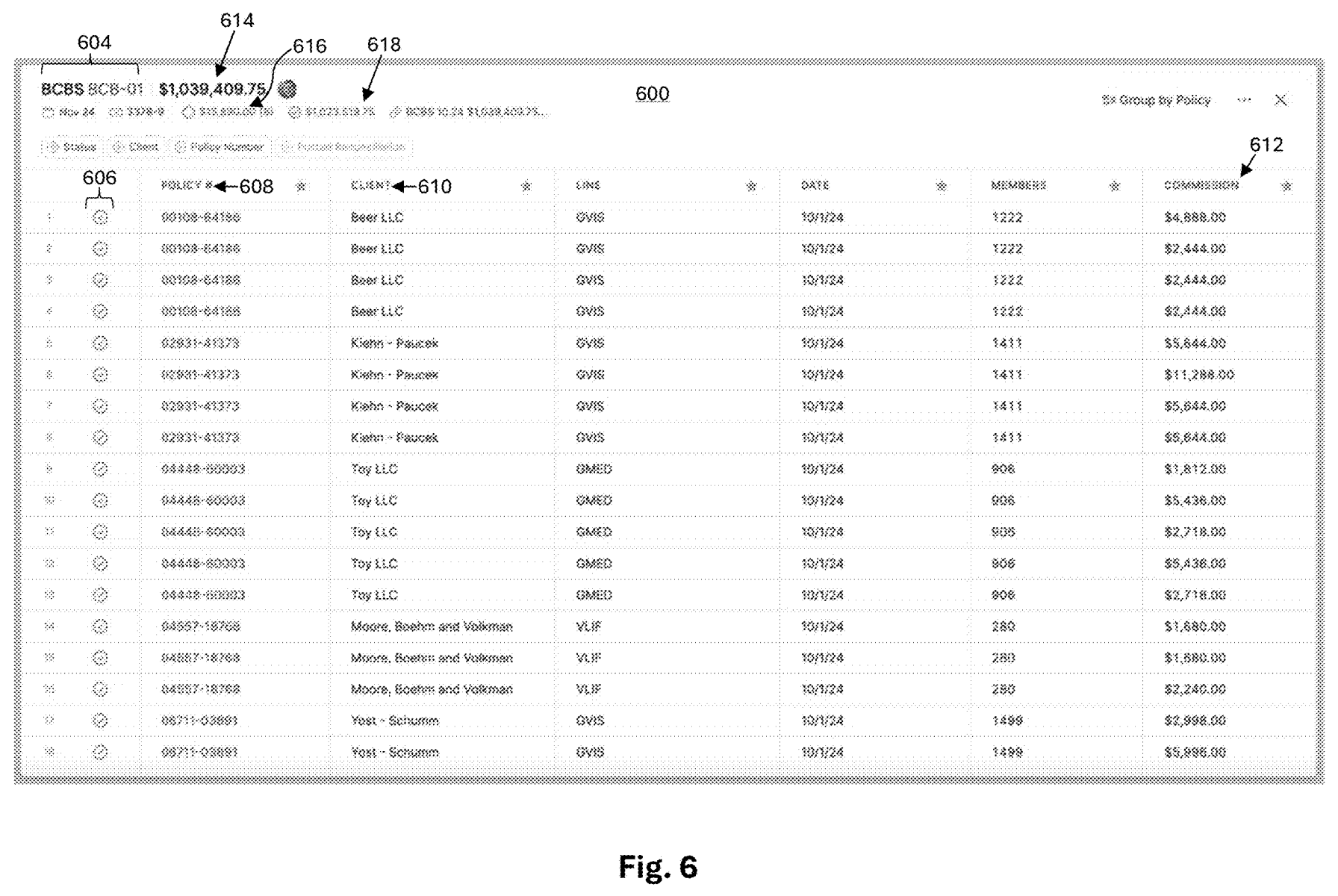

Each row of UI 500 is an interactive element that corresponds to a statement data object in the system and allows a user to see the real-time status and details of the data object. For instance, FIG. 6 illustrates an example UI 600 that results from a user selecting row 504 of UI 500. The corresponding carrier identifier 604 is illustrated in UI 600.

Each row in UI 600 is a particular transaction in the selected statement, and in particular embodiments, each row in UI 600 is an interactive element that corresponds to a dynamic transaction data object in the system. Column 606 identifies the real-time status of each transaction object, i.e., (1) whether it is matched to, and fully accounted for by, a deposit data object; and (2) whether it has been posted to the accounting system of record, etc. Column 608 identifies an insurance policy number to which the transaction pertains. Column 610 identifies the client to which the transaction pertains. In the example of FIG. 6, Column 612 identifies the statement's identification of the commission owed for a particular transaction. The total transaction amount is shown in element 614, and the unmatched amount is shown in 616 and the matched amount (i.e., the amount that is matched to a policy or to a deposit, or both, in various embodiments) is shown in element 618.

As illustrated in FIG. 6, one complication in balancing and matching deposits and statements in insurance brokerage accounting is that a carrier may receive multiple payments from each of multiple clients for many distinct policies, and yet may remit commissions owed across these policies and payments as a single deposit, which may cover all or part of a statement. Thus, unraveling the purpose of a deposit and balancing it at the transaction level is a complicated and difficult process, particularly when there are tens or hundreds of thousands of transactions contained in hundreds or thousands of statements that must be balanced against hundreds or thousands of deposits.

To automatically match production data objects to a deposit data object, particular embodiments first identify a deposit data object that is not fully accounted for (i.e. the deposit data object is not fully balanced and has some unapplied portion). To automatically match production data objects to this deposit data object, particular embodiments use attributes of the deposit data object to create a subset of potentially matching production data objects. For instance, as part of creating a transaction, statement, or deposit data object in the system described herein, the data object's attributes are extracted from the ground-truth data and associated with the respective data object in the system. Attributes can include the carrier, the payment amount (for a deposit data object), the payment date (for a deposit data object), a total parsed amount for a production data object (e.g., a total parsed commission amount for a statement data object), and a production date (e.g., a policy-level transaction date). For a deposit data object, the payment date is the date that the payment was deposited to a financial institution. For a transaction or statement, the date is the date or date range (e.g., statement period) derived from a statement or related data.

To perform matching, attributes are parsed from the deposit information and attributes are parsed from production data objects. Particular embodiments may narrow the set of potentially matching production data objects by creating a subset of one or more such production data objects based on one or more attributes of the deposit data object. For example, deposit data object attributes used to create a subset of statement data objects may include (1) the carrier ID associated with the deposit data object, and (2) a date associated with the deposit data object. As an example of the latter, if a deposit from carrier X is received on Oct. 1, 2025, then only statement data objects that the system may consider matching to the deposit are those objects that have the attribute "carrier: X" and "date: Sep. 1, 2025-11-1/25." While the previous example illustrates a date range that is centered on the deposit data object's payment date and has a one-month window both forward and backward of that date, this disclosure contemplates that an offset window and/or window of different length may be used. For instance, in particular embodiments a date range used to create a set of statement data objects to consider for matching to a deposit data object may be two months prior to the payment-data attribute of the deposit data object.

In particular embodiments, parsed attributes to perform matching between a deposit data object and statement, transaction, or invoice data objects include the originating ID, for example as shown in FIG. 2. Particular embodiments may use data in the "description" field for a deposit data object, e.g., as shown in the example of FIG. 2. For instance, as illustrated in FIG. 2, this field may include an invoice number (for payments from a client, in agency-bill transaction), and thus a subset of potentially matching invoices can be created using only invoices that contain a matching invoice number to that identified in the "description" field.

Then, within the created subset of production data objects to consider for matching to a particular data object, particular embodiments may determine whether there is a single combination of such production (e.g. statement) data objects whose associated amounts (e.g., statement amounts) equal the deposit amount associated with the deposit data object, perhaps within a specified tolerance. If yes, then a match can be automatically identified, and the matched data objects may be updated in the system to create an association with each other. If more than one particular statement or combination of statements within the subset of statement data matches the deposit amount, then in particular embodiments a match is not automatically generated at that time. In such embodiments, the multiple potential matches may be stored and surfaced to a user so that the user can select a particular match, not from the full set of statement data for that carrier, but from the specific, identified set of potential matches to the deposit data object.

In particular embodiments, automatically generating a match includes automatically associating the matching production data objects with the deposit data object in the system. For example, each respective data object may be updated in the system of record that it is associated with a matched data object, e.g., by updating an attribute reflecting which other data objects the data objects is associated with. Particular embodiments may also then dynamically update a status of these now-linked data objects, and may update a UI showing either or both of the deposit and the production (e.g., statement) data objects to reflect that they are part of a matched, balanced transaction. In particular embodiments, after matching, matched deposit data objects and/or statement data objects that are both fully accounted for may be automatically posted to the accounting system of record. In particular embodiments, a determined unique match may still require user approval to update the relationships and corresponding UI identifiers in the system, and/or to post automatically matched and linked data objects in the system to an external accounting system (e.g., to a general ledger).

In particular embodiments, a match may include a tolerance within which a mathematical inequality between matched production and a deposit will still be considered a match. For example, particular embodiments may use a tolerance amount of 1 cent, 2 cents, etc., for instance to account for differences in rounding a deposit amount vs. a statement amount.

In particular embodiments, a subset of statements or transactions to consider matching to a deposit may include an expanded carrier scope, for example to account for the fact that different carriers may operate under different names, or that different subsidiaries of an agency refer to a carrier in different ways. This broadened scope may be determined based on user matching activity. For example, if a user previously matched a deposit from carrier X with a statement from carrier Y, then X and Y may be treated as equivalent carriers when creating a subset of statements to match to a particular deposit. In other words, statements identified as being from either carrier X or Y may be included in considering whether a match exists for a deposit from carrier X or Y. User activity may also be used to expand or narrow the scope used for other attribute fields. For example, if a user dissociated carrier A from carrier B in a set of matches (e.g., undoes a match to carrier A that includes statements from carrier B), then the system may exclude carrier B statement data objects when considering matches for a subsequent deposit from carrier A. As another example, if an exact match is found and created, and then a user undoes that exact match, then the user's actions may preclude subsequently automatically recreating that exact match. While the examples above related to matching statement data objects with deposit data objects, the same analysis applies when matching other types of production data objects.

The matching process can occur periodically (e.g., every day, every hour, etc.) and/or on user request. In particular embodiments, the matching process may trigger anytime an action occurs to a data object in the system that has the potential to create a new match. For example, generating a new deposit or statement data object in the system may trigger the matching process for any processes in which the generated data objects have an attribute used to create the subset of matching data objects. Other potential trigger points for determining whether a match exists include: (1) when an attribute used to create subsets of matching data (e.g., carrier attributes or deposit/statement dates) on a deposit or statement is updated, (2) when a deposit is posted, (3) when a statement is imported, (4) when a successful match is identified (as this match may eliminate data objects from another subset of potential matches that is preventing a single, unique match from occurring to another deposit data object), or (5) when a statement or deposit is deleted. In embodiments that match at the transaction level, then similar activity for transaction data objects (e.g., deleting or adding a transaction data object) may trigger the automatic matching process.

In particular embodiments, a trigger point for determining whether a match exists includes user input that narrows the subset of matching data. For instance, with reference to the example UI of FIG. 2, the "Unmatched" identifiers on the right of divider 214 are an interactive element that, when selected by a user, surface a UI that allows the user to select and filter among potential statements, invoices, and/or transactions. For instance, suppose that on the second row from top in FIG. 2, the deposit corresponding to "Cigna" is not matched because multiple potential matches exist corresponding to the depositor "Cigna." If a user selected "Unmatched" in the corresponding row, the user can filter for specific Cigna entities, e.g., "Cigna-01" vs. "Cigna-02," or the like. If the user performs such filtering, then the subset of potentially matching data objects can be narrowed to the selected entity, and the matching process may be immediately performed for this deposit data object. Because the subset of potential matching data objects has been narrowed, the potential match may now be deterministic (i.e., only a single potential match remains), and thus a Cigna deposit data object corresponding to the selected entity may be created and immediately, automatically matched to, e.g., a set of statement data objects from that particular Cigna entity.

In particular embodiments, if no potential matches are found for a deposit, then the matching process may consider whether a portion of one or more statements (potentially in combination with one or more full statements) in a created subset match to the deposit. In other words, the process may consider whether a partial statement in fact belongs to a deposit. Likewise, multiple unmatched deposits (i.e., deposits that do not have any corresponding matches) may be considered together for matching, provided that there is a correspondence between the deposit data objects' relevant attributes (e.g., they are from the same carrier, etc.).

Figure 7A:
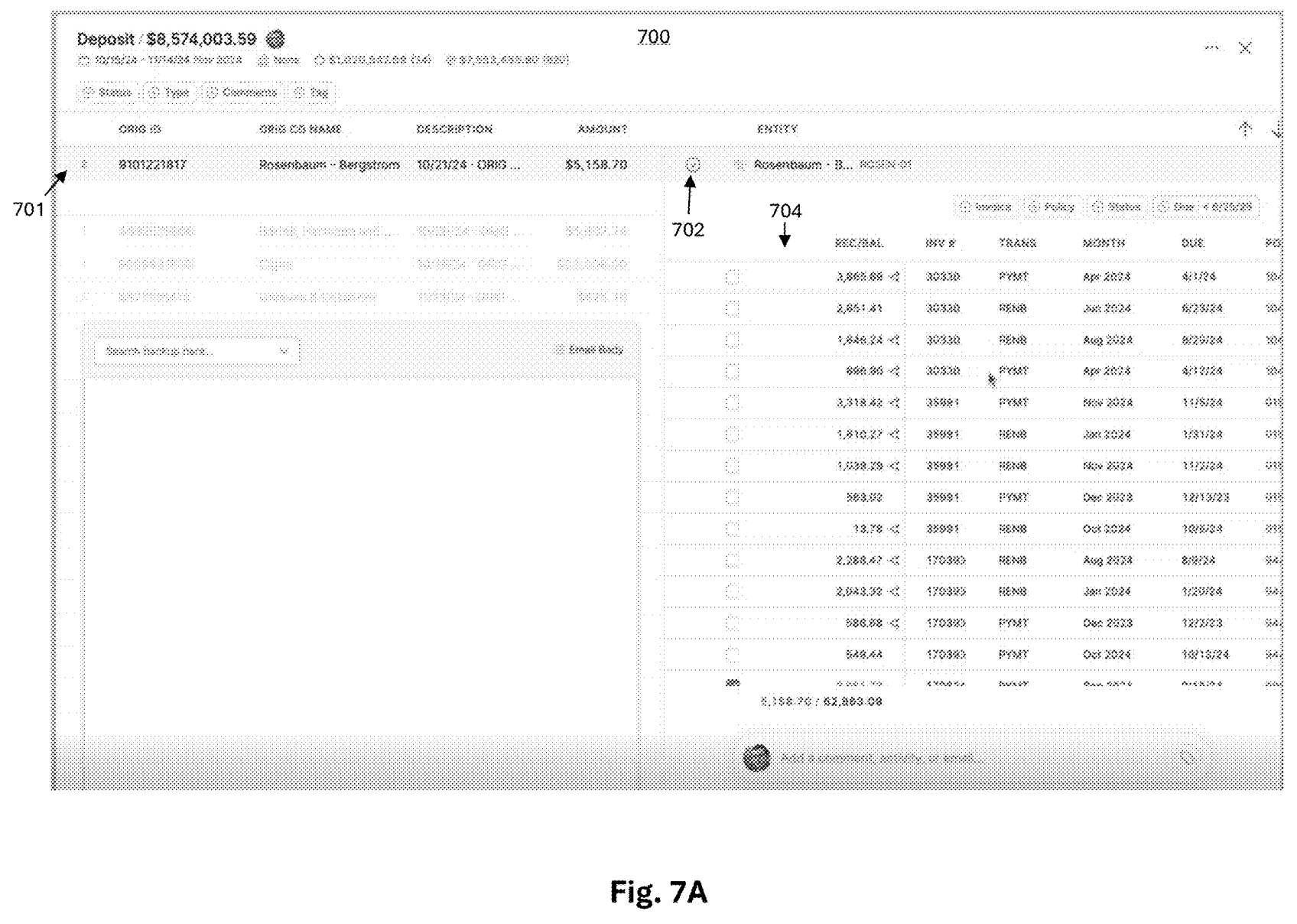
Figure 7B:
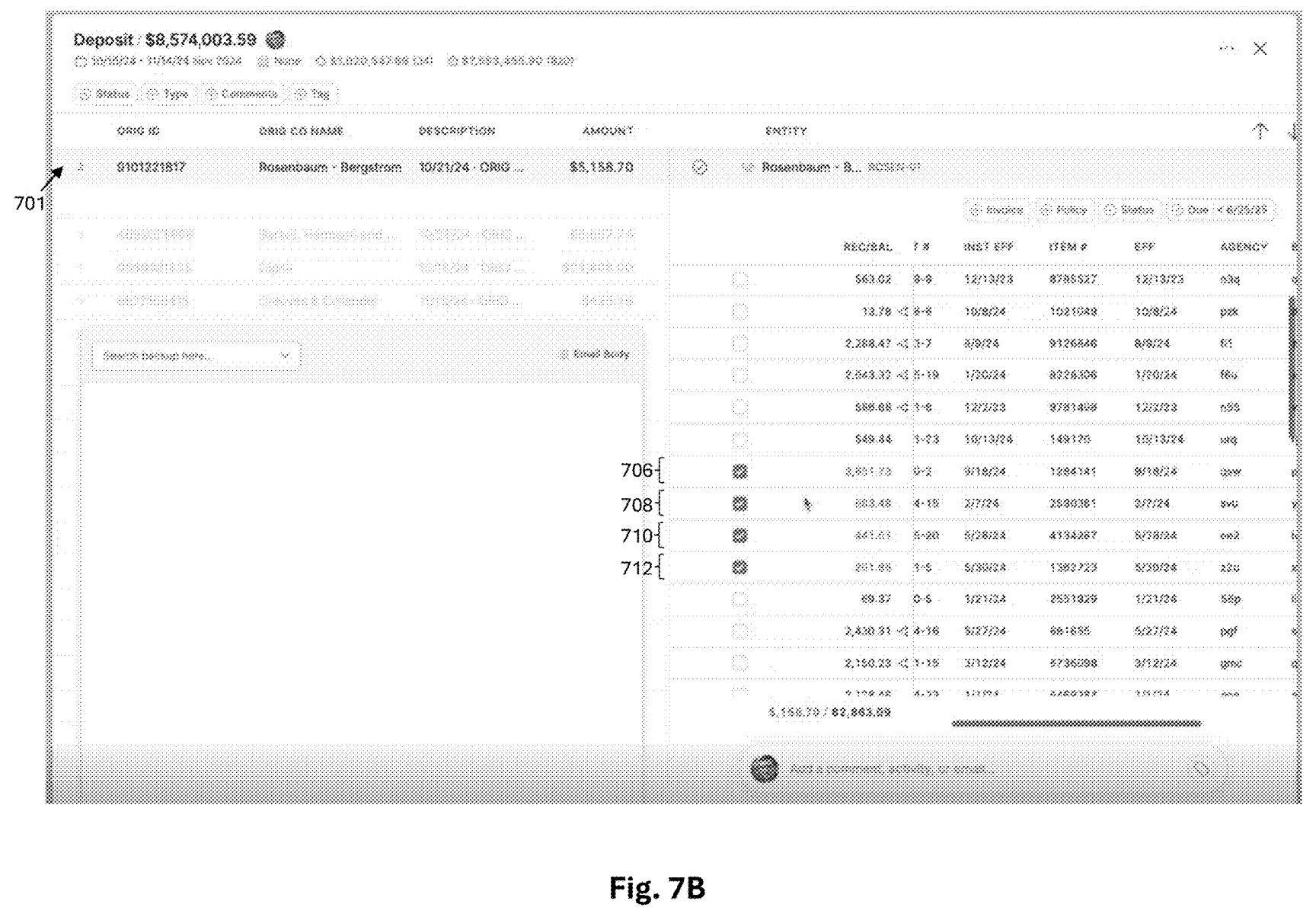

FIGS. 7A and 7B illustrate an example of automatic matching that selects a particular set of invoice data objects from the entire available set of invoice data objects for an entity to match to a particular deposit data object. For instance, FIG. 7A illustrates a UI 700 that is presented in response to a user selecting row 701. This row is shown in context with the other deposit rows, but in the example of FIG. 7A selected row 701 is shown with emphasis relative to the deposit rows with which it is shown.

Indicator 702 shows that the deposit corresponding to selected row 701 is balanced with a set of multiple invoices. UI 704 shows the complete set of invoices for the entity corresponding to row 702, which in this case is a client with whom the brokerage has contracted for an insurance policy on behalf of a carrier. As shown in row 701, many invoice data objects exist for the client, and from the mere fact that a particular deposit was received from the client, it is not clear which invoices, if any, in the brokerage's system actually correspond to and balance with the deposit data object, much less whether the deposit is for an incorrect amount, is a duplicate, is for transactions that have not yet been imported to the system, etc. However, FIG. 7B shows a result of the automatic matching techniques described herein, i.e., that of all the available invoices for the client, specific transactions 706, 708, 710, and 712 collectively balance with the deposit of row 701. And because this match is deterministic, i.e., it is the only match to the deposit of row 701 from the created subset of invoices that match the relevant deposit data object attributes, then the system automatically matches the respective invoice data objects with the deposit data objects and dynamically updates the deposit data object's status identifier (i.e., 702 in FIG. 7A) to reflect its status as being (1) matched to at least one production data object and (2) fully accounted for. A user can edit the matched transactions, e.g., by deselecting the matched transactions, and the connections between data objects in the system and their statuses will be dynamically adjusted as the user does so.

In particular embodiments, a match strength may be evaluated and assigned for a particular potential match. The match strength may reflect the system's certainty as to the match. For example, if there are multiple potential matches to a deposit, then each may be assigned a match score, and that score and the potential matches may be presented to a user, for example so that the user can select which match is the appropriate one while being provided with some information about the perceived relative strength between matches. However, other embodiments may not use match strength, other than to always match when a single, deterministic match exists within a defined tolerance, and to otherwise not match. In accounting, and particularly for brokerage accounting, a false positive can have severe negative impacts, so this approach may ensure that matches only are made in essentially complete-certainty scenarios.

In particular embodiments, an external communication system may be accessed by the insurance brokerage accounting system to help match deposits to invoices, statements, and transactions within the system. For example, a brokerage may grant the accounting system access to email accounts of the brokerage, such as a direct-bill inbox and/or an invoice outbox of the brokerage. Access may be directly to those email folders, via forwarding, or by any other suitable mechanism. For example, direct bill and invoice emails may be forwarded to the system, which may parse these emails and attachments (e.g., by OCRing pdfs) and store the raw content data. This data may be used to search for entity names, invoice or statements numbers, etc. This information may then be used to narrow down a potential set of matches for a particular deposit. For instance, if a deposit's description includes numbers that appear to reference a statement or invoice number, then the system's existing data objects may be searched for attributes that include this number. If none is found, then the stored email data may be searched for using this number. This search may find the email that contains the corresponding statement or invoice, and then may upload the corresponding statement or invoice and match it to the deposit. As another example, a payment (deposit) amount may be used as a search criteria. If this amount is found in stored email data, then the corresponding email in which the amount is found may be parsed to identify whether it references a statement or invoice, and if so, that statement or invoice may be uploaded and matched to the deposit.

In other embodiments, email data may be used to narrow down the subset of statements, invoices, or transactions to potentially match to a deposit. For example, if an email references a total deposit amount, this email may be used to identify a specific carrier or dates associated with the corresponding reasons for deposit, even if it does not contain an attachment such as a statement. The linking information parsed from stored email data may then be used to define the subset of corresponding statements, invoices, or transactions to consider as a possible match to the deposit, reducing the chance the multiple potential matches are found.

Figure 8:
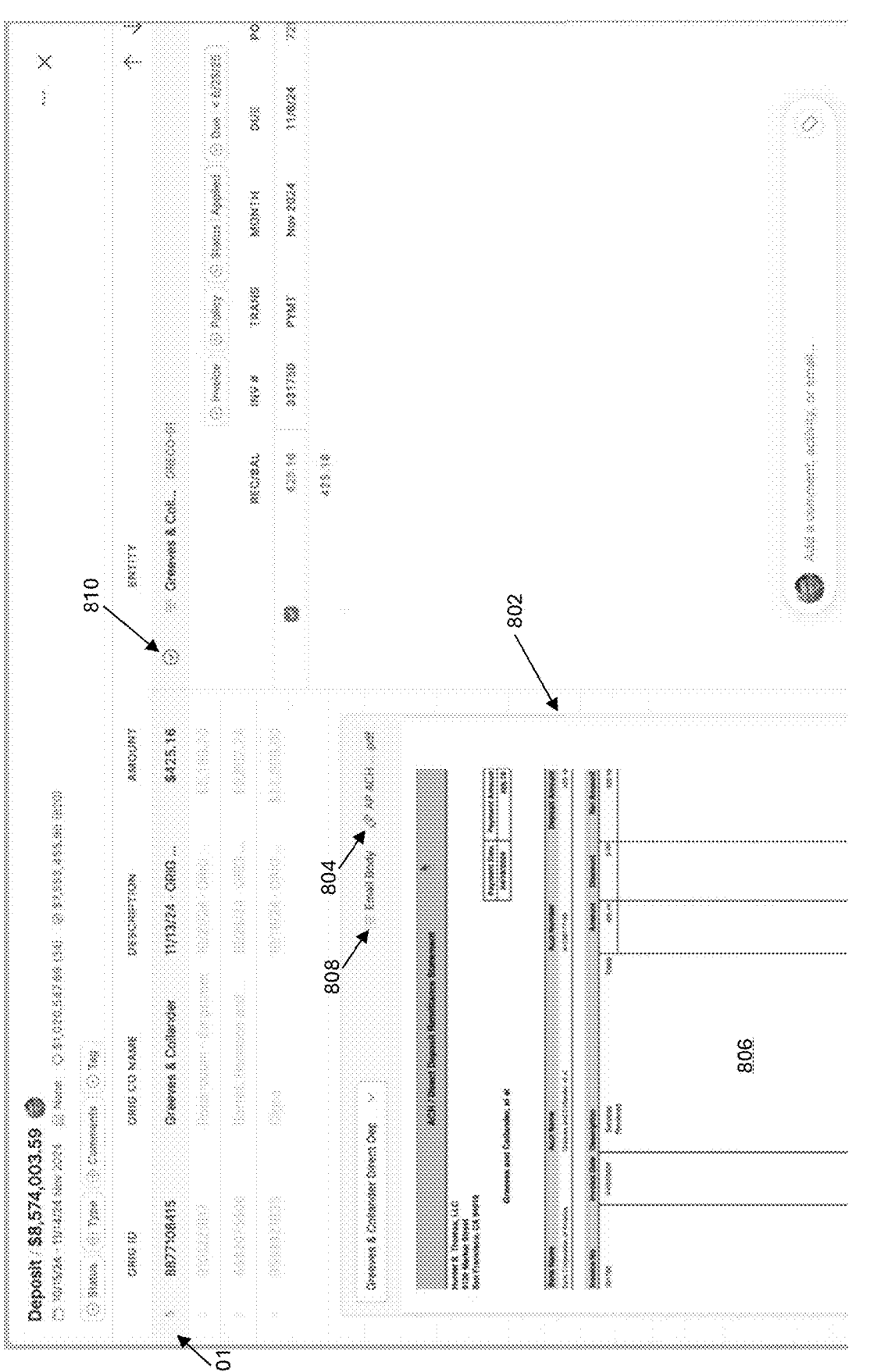
FIG. 8 illustrates an example user interface illustrating a ground-truth pdf statement in association with representations of data objects in an insurance brokerage accounting system.

In particular embodiments, data from an external system, such as email data, may be surfaced as a ground-truth document in the system. For example, FIG. 8 illustrates an example in which UI 802 contains a copy of an attached pdf statement 806 that was included in an email message to the brokerage. In the example of FIG. 8, pdf statement 806 is presented in a deposit detail view for the deposit corresponding to row 801, which is the deposit that statement 806 matches to. Thus, a user can see both the matched transactions to the deposit of row 801 on the left side of the deposit view, the real-time matched status (i.e., in identifier 810), and the ground truth document 806 that led to matching the deposit data object with the transaction data objects in the system.

In the example of FIG. 8, a user can toggle between UI 802 showing the attached statement 806 or the email body that the attachment came with, for example by using attachment selector 804 or email body selector 808 in UI 802.

In particular embodiments, one or more deposits may be in the form of checks. These checks, along with supporting documentation that accompanies a check, may be electronically scanned for the brokerage's records. For example, a financial institution that provides a bank account to a brokerage may also provide lockbox services, in which the bank receives checks from paying entities on behalf of the brokerage, deposits these checks into the brokerage's account, and scans the received check and any supporting paper documents into an electronic file format, typically pdf. As another example, a brokerage employee or vender may scan checks and supporting documents into one or more electronic files.

Scanning checks and supporting documents typically results in a single electronic file that contains all the check deposits and accompanying paper documents over a particular period of time (e.g., a day, a week, etc.). For instance, a brokerage employee or a bank providing lockbox services may perform a weekly scan of all paper checks and supporting documents received since the previous scan. Thus, the scan may include a variable number of checks and supporting documentation. Sometimes, supporting documentation includes a statement. But that is not always the case, and supporting documentation often includes additional non-statement information.

In particular embodiments, the system described herein can automatically identify distinct statements from a scanned file and can associate the statements with their corresponding deposits, both in ground-truth form (i.e., with the scanned paper check) and with the deposit data objects in the system. As explained below, particular embodiments may also present a user interface that parses statements and corresponding checks together and connects those ground-truth documents with matched deposit/statement data objects in the system.

For example, the system may determine a payment sender identifier for each deposit. This may be, for example, the depositor name, depositor ID, etc., or a combination of this information. Each carrier and client has an associated payment sender identifier in the system; therefore, when a payment sender identifier is determined for a deposit, this connection serves as an identification of the entity that made the deposit.

For paper checks received, the payment sender identifier may be determined from (1) the payment account and (2) the routing number on the check. This information is obtained from parsing the scan of the paper check, e.g., using OCR. Then, the system may use this identified payment sender identifier to determine whether there exists in the system a statement that was pulled from an electronic file created by a previous scan and matched to the same payment sender identifier (for a different deposit data object) and in which the statement was actually imported. If so, then the system searches for a statement following the parsed check (where the statement is identified using, e.g., OCR techniques), and if one is found, the system then automatically creates a statement data object from this statement and automatically matches it to the corresponding deposit data object.

If not, then a detected statement that follows the check may be parsed to determine whether it is in fact a statement that corresponds to the check deposit. For example, the system may determine whether there exists another matched check deposit-statement pair, for this payment sender identifier, where that pair's statement's format hash (essentially, a hash of certain predetermined aspects of the statement's format, such as a header hash, which tends to be consistently used by a particular payor) matches the format hash of the prospective statement in the check batch. If so, and if the potential statement has a non-zero dollar amount associated with it, then it is identified as a statement and uploaded into the system. In particular embodiments, user actions with a potential statement in a check batch that indicate the document is a statement may also be used to identify and upload a statement into the system.

Once a statement is identified and uploaded into the system, thereby creating a statement data object, then that statement is matched to the corresponding deposit in the check batch. The uploaded statement may also be imported if automatic statement importation is enabled. In particular embodiments, the system may determine whether a duplicate of the statement exists, and if so, may delete one of the statements or flag the statement for deletion.

Particular embodiments present a UI in which a user can see both extracted ground-truth data for a deposit (e.g., the deposit and supporting documentation, such as a statement) or for a production along with the system's identification of the respective data object.

Figure 9:
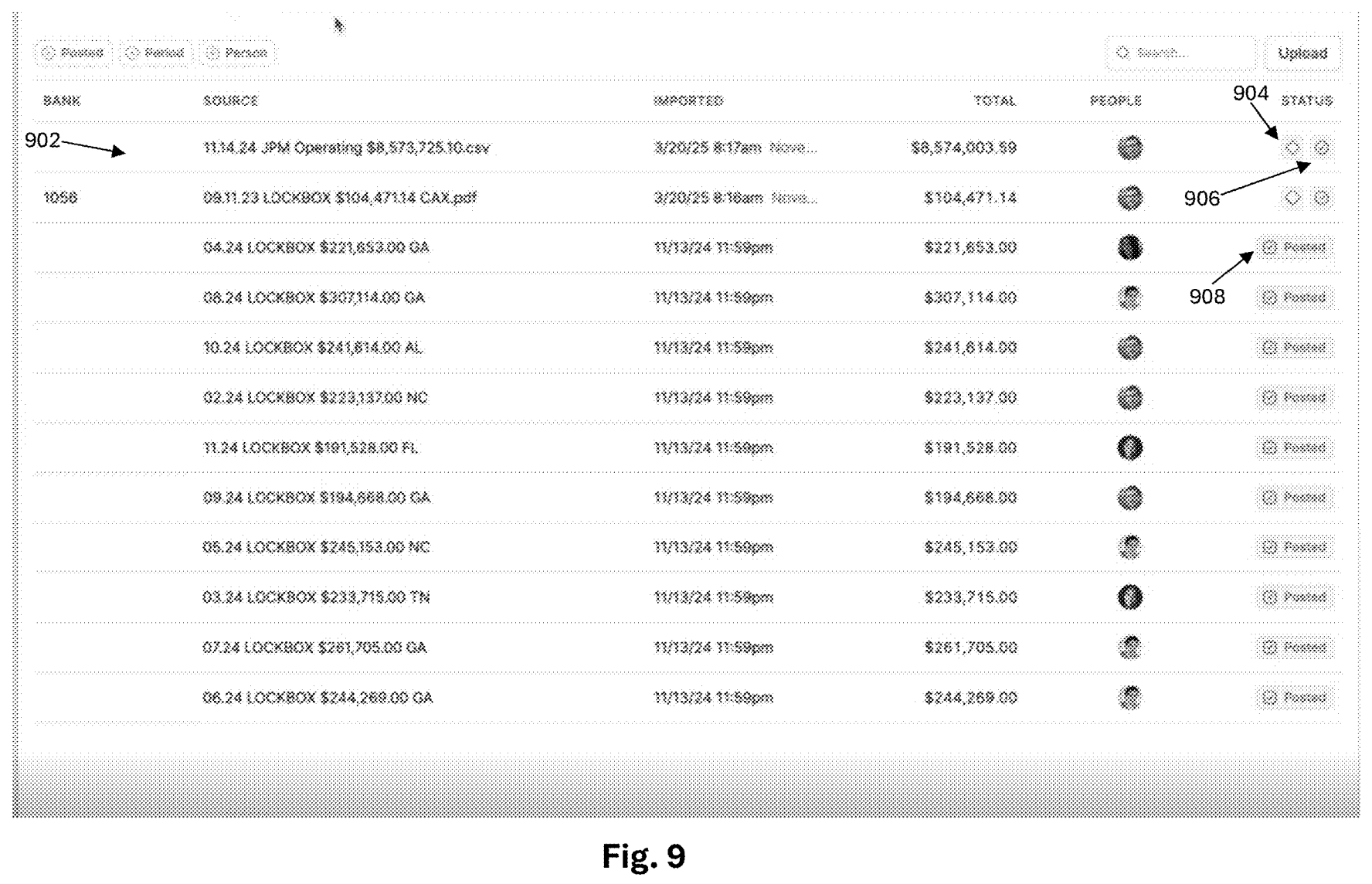

FIG. 9 illustrates an example UI in which a user has filtered a deposits view to show lockbox deposits for a particular account. Each row, e.g., row 902, in the UI corresponds to a particular lockbox deposit. Information about the deposit is shown in each row, including the day the deposit was made and the total amount of the deposit. As shown in FIG. 9, each row also includes a status identifier that shows the accounting status within the system of the entire lockbox deposit. Because each lockbox deposit (i.e., each row in FIG. 9) can in fact include many distinct carrier or client deposits, and each of these distinct deposits has its own accounting status, multiple status identifiers can be used to show a mixed state of the lockbox deposit. For instance, row 902 includes unmatched identifier 904 and matched identifier 906, showing that some of distinct deposits within the lockbox deposit of row 902 have not been matched, while others have been matched and are full accounted for. As another example, status identifier 908 shows that all of the deposits within the lockbox deposit for that row have been matched, balanced, and posted to the accounting system of record.

Figure 10:
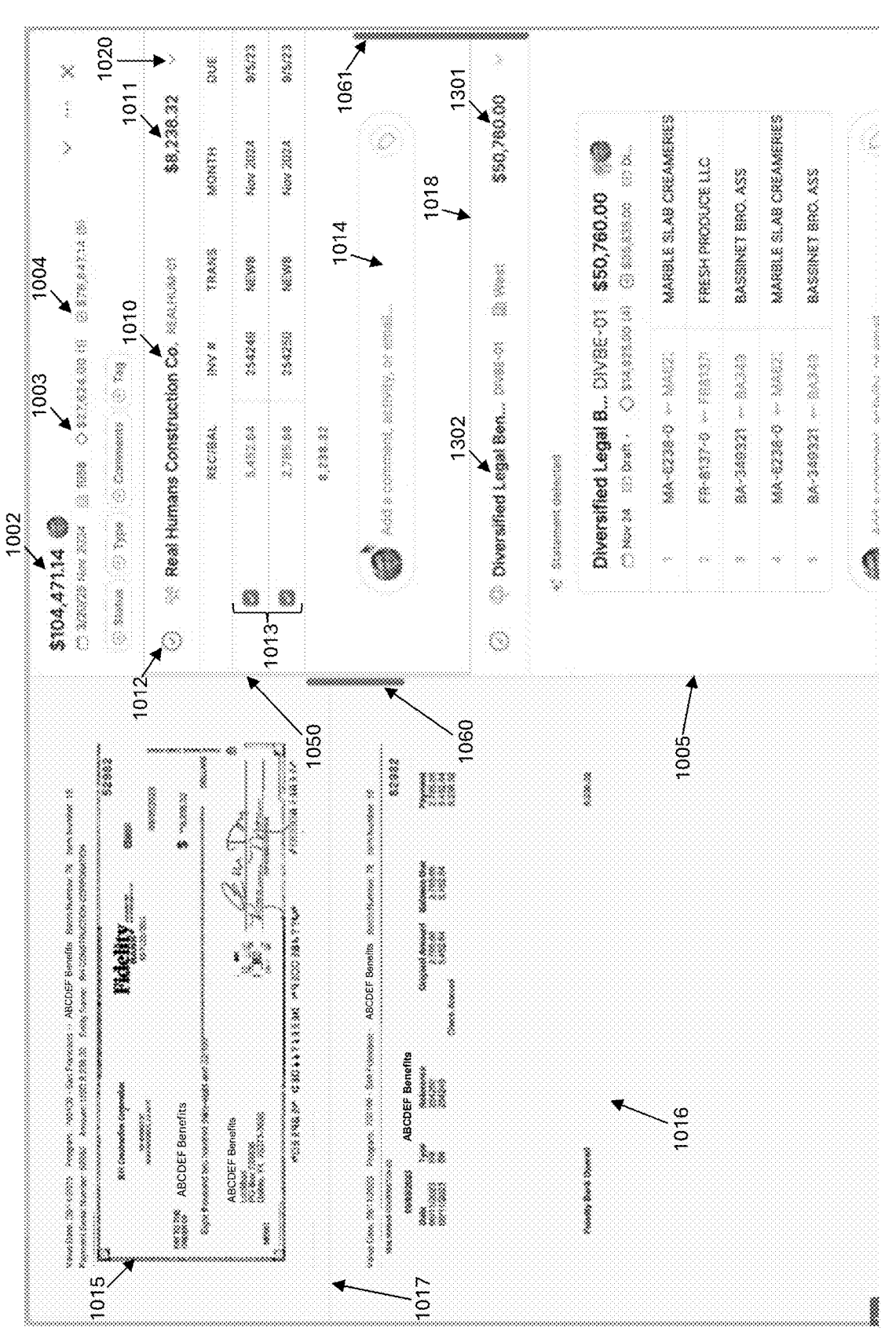
FIG. 10 shows an example user interface that is surfaced when a user selects a particular row in the user interface of FIG. 9.

FIG. 10 shows an example UI that is presented when a user selects a particular row in the UI of FIG. 9, where each row is an interactive element. As explained below, the UI of FIG. 10 couples ground-truth deposit and statement information with the system's data objects for the deposits within the selected lockbox. In addition, with each UI corresponding to a deposit data object is an identification of each production data object (e.g., invoice data objects or statement data objects) matched to that deposit data object.

FIG. 10 includes dynamic UI elements that update as the user navigates the UI and static elements that do not change as the user navigates within the UI for the selected lockbox row. For instance, total deposit amount 1002 (which shows the total amount of the selected lockbox deposit), status identifier 1003 (which shows that certain deposits within the selected lockbox deposit have not been matched), and status identifier 1004 (which shows that certain deposits within the selected lockbox deposit have been matched) are persistently displayed on the UI, in the example of FIG. 10. In contrast, the displays to the right and left of divider 1005 are dynamically updated as the user navigates those interfaces for the selected lockbox row.

For instance, on the left of divider 1005 is a dedicated portion of the user interface that displays ground-truth documents associated with a particular deposit within the selected lockbox deposit. This disclosure contemplates throughout that a ground-truth document may include a portion of the document, e.g., one or more pages, a portion of a spreadsheet, etc. In FIG. 10, ground-truth deposit information 1015, which here is a deposited check, is shown on the left of divider 1005. Below ground-truth deposit information 1015 is scan of a paper statement 1016 that accompanied the check shown in 1015. This ground-truth document corresponds to a particular primary deposit data object on the right side of divider 1005.

In FIG. 10, deposit data objects and related, matching production data objects are shown on the right side of divider 1005. Specifically, to the right of divider 1005 is a dedicated UI portion that identifies particular deposit data objects. One deposit data object is the primary data object, and the primary data object may be identified in the UI via a graphical emphasis such as emphasis 1050 on the portion of divider 1005 that corresponds to the identification of the primary deposit data object. Here, the primary deposit data object corresponds to deposit 1011. The UI for deposit 1011 shows the depositor 1010, the accounting status 1012 of the deposit, and an identification 1013 of the matched invoice data objects to this deposit data object. Thus, the UI to the right of divider 1005 shows both the deposit data object and its matching invoice data objects, as well as the ground-truth information corresponding to these data objects (deposit 1011 is currently the primary data object), all within the same UI. Also shown in FIG. 10 is an embedded communication element 1014 for the active deposit data object, and the functionality of this embedded communication element is described more fully below.

In the example of FIG. 10, the ground-truth data has been cropped from its original appearance in its ground-truth document. For instance, the check shown in 1015 was provided on a single full page, as is typical. Specifically, FIG. 11 illustrates the native format in which the check shown in 1015 and statement 1016 arrived, along with the significant non-content items (i.e., blank space 1102 and 1104) surrounding these content items. However, rather than show the entire scanned check page, which makes it difficult to digest the ground-truth information corresponding to the active deposit data object in this UI, in the example of FIG. 10 check 1015 has been cropped to show only the content on that page, i.e., the blank space and headers and footers (e.g., page numbers) have been removed. In the example of FIG. 10, the separation between pages is shown by vertical divider 1017. Likewise, blank space has been removed from the page containing statement 1016, thereby allowing both pieces of information to be shown simultaneously on the UI when the deposit data object corresponding to deposit 1011 is the primary data object in this UI. Similarly, FIG. 12 illustrates the native format in which deposit 1301 and statement 1311 (discussed below) arrived, including blank space 1202 surrounding those elements.

On the right side of divider 1005, another deposit 1301 from the overall lockbox deposit is shown in the UI. This deposit data object is separated by vertical divider 1018 from the primary deposit data object above it. The deposit amount 1301 and depositor 1302 are shown in the UI for this deposit data object.

In particular embodiments, a user can navigate among either ground-truth deposit data or among deposit data objects, and the UI will simultaneously navigate among the other in order to match the displayed ground-truth document with the current primary data object. For instance, if a user scrolls through ground truth documents on the left of divider 1005, e.g., using scroll indicator 1060, then the data objects shown on the right side of divider 1005 will likewise scroll so that these data objects match the ground-truth data shown on the left of divider 1005. In contrast, if a user scrolls through deposit data objects on the right of divider 1005, e.g., using scroll indicator 1061, then the ground-truth document shown on the left side of divider 1005 will likewise scroll so that the displayed ground-truth document matches the current primary deposit data object on the right of divider 1005. As illustrated by both the size and position of scroll indicators 1060 and 1061, the amount of scrolling is not necessarily symmetric, because the amount and size of ground-truth information does not match the number and size of deposit data objects in the example of FIG. 10. However, the UI maintains the connection between these elements shown on the screen.

Figure 13:
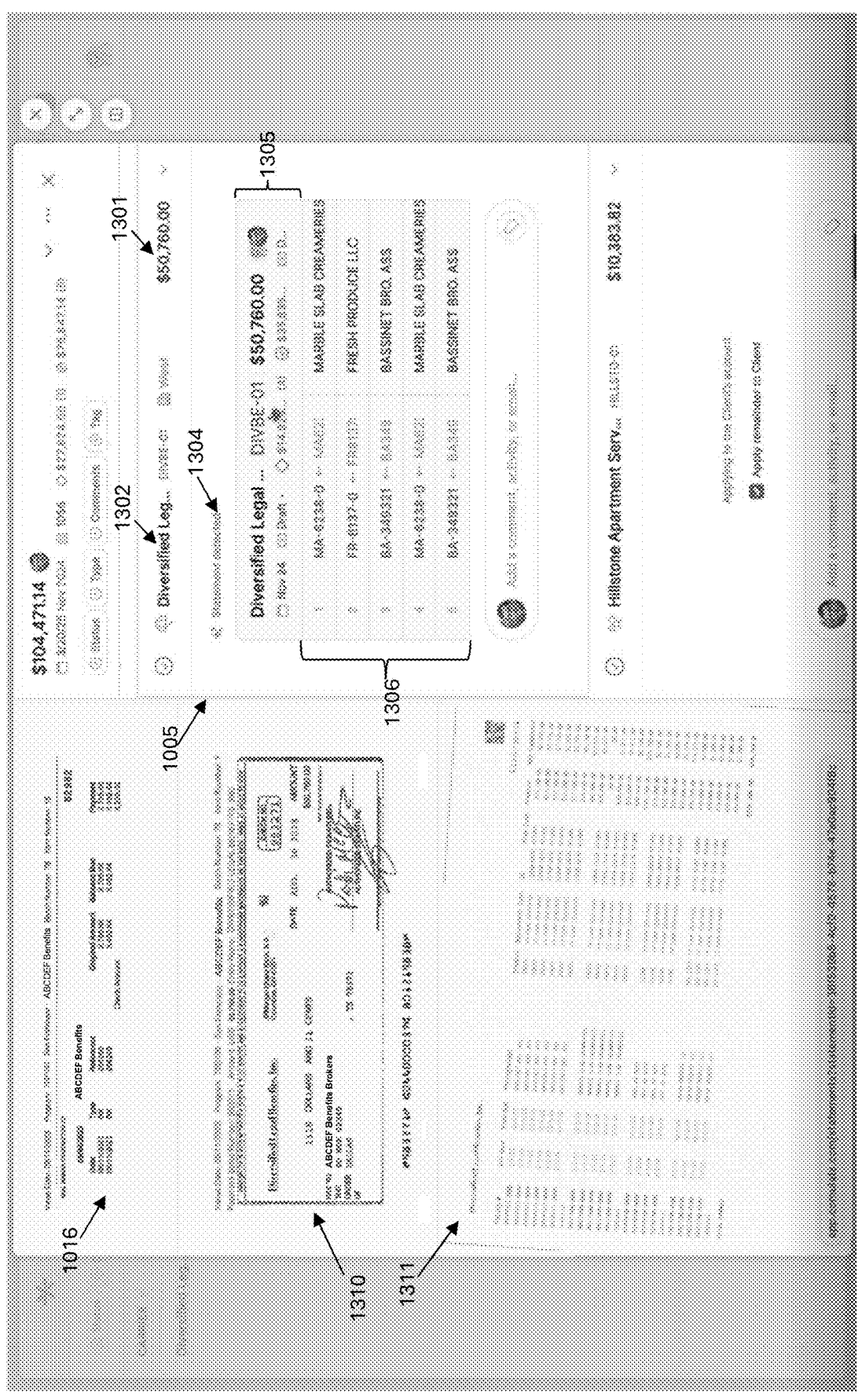
FIG. 13 illustrates an example of a user interaction with a particular portion of the user interface of FIG. 10.

For instance, FIG. 13 shows an example in which a user scrolls down on the left of divider 1005 in FIG. 10. Thus, the ground-truth information shown in FIG. 10 and corresponding to deposit 1011 is replaced with ground-truth parsed check 1310 and statement 1311 that accompanied the paper check 1310. As explained above, both these sources of ground-truth information have been cropped, so that only relevant information (rather than blank-page space or intervening pages) are shown in the UI. Because the user has scrolled down to ground-truth information that no longer matches the primary deposit 1011, the right side of divider 1005 is likewise scrolled. A new primary data object is determined as the data object that corresponds to the ground-truth document now shown to the left of divider 1005; in the example of FIG. 13, the primary data object is now the data object corresponding to deposit 1301. Information about this deposit is shown in element 1305, which includes the particular policy-level transaction data objects 1306 that were extracted from statement 1311 and matched to deposit 1301. A user can navigate this information by, for example, moving a cursor above this UI and scrolling among those transactions. As illustrated by element 1304, particular embodiments can identify on the UI when a particular statement for a deposit has been automatically detected from the ground-truth data.

In the example of FIG. 13, statement 1016 is shown at the top of the UI on the left of divider 1005, as the user is free to scroll to whatever point in the ground-truth information they would like (i.e., the scrolling can be continuous rather than page-by-page). However, the automatically linked scrolling on the right of divider 1005 has "snapped" the active data object to the top of the right of divider 1005, i.e., a portion of the data object corresponding to statement 1016 is not shown, even though that statement is still shown due to the user's scrolling actions on the left of divider 1005. This feature can help highlight which data object corresponds to the primary ground-truth information shown on the left of divider 1005. Similarly, in particular embodiments when a user scrolls through the right of divider 1005, then the user can scroll freely through these deposit data objects (including leaving a portion of a data object on the top of the UI), but the automatic scrolling on the left of the display will "snap" to the top of the UI, such that only the ground-truth data corresponding to the active deposit data object UI will be shown.

As a user navigates throughout the UI, in particular embodiments the user can collapse details about deposit data objects (e.g., using element 1020 in FIG. 10). In these embodiments, the primary data object's UI may be automatically expanded, unless collapsed by the user while active. In addition, each data object's UI to the right of divider 1005 may have a header that includes status 1012, depositor 1010, deposit 1011, and element 1020, and this header may be displayed even when the data object UI is collapsed. In particular embodiments, a data object UI header (such as the example described immediately above) may stay visible towards the top of the screen even as the user scrolls other portions of that data object UI off the screen, the header only disappearing when its entire data object is scrolled out of the display.

In particular embodiments, the primary deposit data object is determined by a threshold with respect to the top of the UI. For instance, if a user is navigating deposit data objects to the right of divider 1005, then an object that is, e.g., within 20% or less of the distance to the top of the UI may become the primary deposit data object. Likewise, if a user is scrolling through the left side of the UI, on ground-truth documents, then a document that is, e.g., within 20% or less of the distance to the top of the UI may have its corresponding deposit data object become the new primary data object. This disclosure contemplates that other thresholds may be used.

In particular embodiments, a particular deposit can contain several pages of relevant supporting information, such as several pages of statements, and these pages may not fit on the UI at the same time. In such instances, particular embodiments may scroll through the supporting documents when a user scrolls on the ground-truth side of the divider, while leaving the deposit image (e.g., the image of the check) on top of the UI on that side of the divider. Thus, a user can see the ground-truth deposit corresponding to the primary deposit data object while scrolling through other ground-truth pages associated with that deposit.

While the examples above illustrate a vertical divider between ground-truth information and deposit data objects, and further illustrate ground-truth information on the left of the divider and deposit data objects on the right of the divider, this disclosure contemplates that a divider may take other orientations (e.g., horizontal) and that the ground-truth images and deposit data objects may take other relative positions to this divider (e.g., the deposit data objects may be on the left, etc.).

Moreover, while the examples above describe a specific embodiment in which deposit data objects serve as the primary data objects that define which ground-truth documents are shown on the corresponding display, and vice versa, this disclosure contemplates that similar techniques may tie a UI displaying production data objects (e.g., statement data objects) to a corresponding UI displaying ground-truth documents for those production data objects.

And while the examples above describe detecting a statement that is included in a set of lockbox deposits, the same techniques may be used for a scanned file from any source. Likewise, a similar process may be used to detect a statement that accompanies an EFT deposit. For instance, an electronic copy of the deposited check along with a statement may be emailed to the broker, or the statement itself may be sent. The main difference in such embodiments is that the payment sender identifier for an EFT deposit is, or is based on, the depositor ID and originating depositor name, discussed above. This information can then be matched to a specific carrier or client in the system. EFT ground-truth documents may also be shown in connection with corresponding deposit data objects, using the techniques described above.

Figure 14:
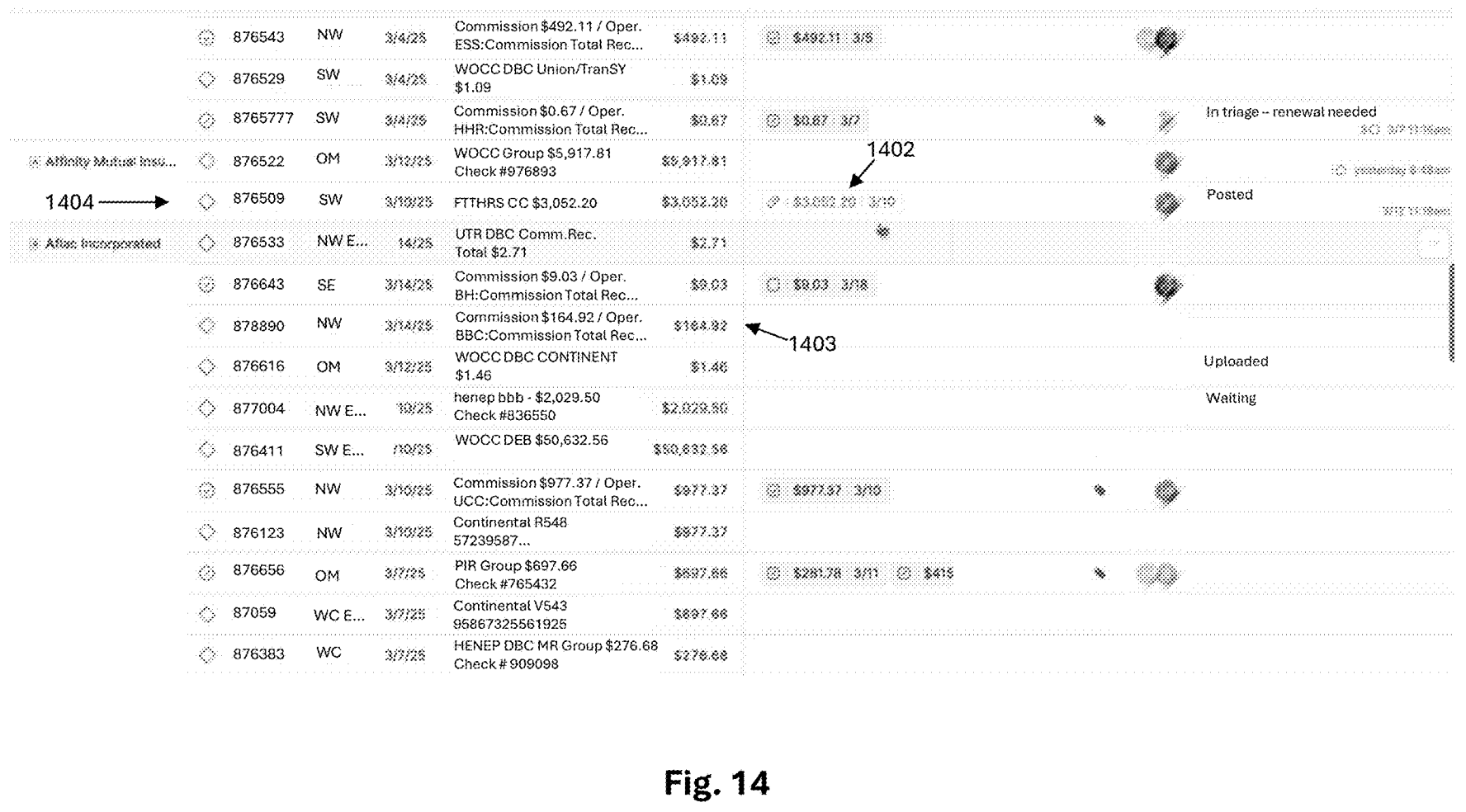

FIGS. 10 and 13 illustrate examples in which ground-truth information is presented in the context of a UI that surfaces both lockbox deposits and corresponding deposit data objects. However, these sources of ground truth may also or alternatively be surfaced in other ways by the system, in particular embodiments. For instance, FIG. 14 illustrates an example in which the accounting status of deposit objects are shown in rows, such as row 1404, to the left of divider 1403. To the right of divider 1403 are statement deposit objects that do or may match to each particular deposit data object. The example of FIG. 14 includes icon 1402 that identifies a statement as a match to the deposit data object of row 1404. In the example of FIG. 14, the deposit data object identified by row 1404 does not currently have any matched statements. In fact, the statement identified by icon 1402 has not even been imported into the system. Instead, this statement has been uploaded-including automatically uploaded, such as from an EFT or lockbox deposit—and the system has determined that the statement data object of this not-yet-imported statement should match to the deposit of row 1404. In other words, the UI of FIG. 14 surfaces this statement data object as a suggested match to the deposit data object of row 1404. This illustrates one of the benefits of embodiments of the system described herein: that the system finds and displays balanced transactions using statement data objects that are not yet imported into the system, and are therefore not even posted to the accounting statement of record. In other words, it is not even possible for the deposit of row 1404 to balance in the accounting system of record because statement 1402 does not exist in that system, yet the UI of FIG. 14 has automatically surfaced this statement data object as a suggested match for this deposit data object.

Figure 16A:
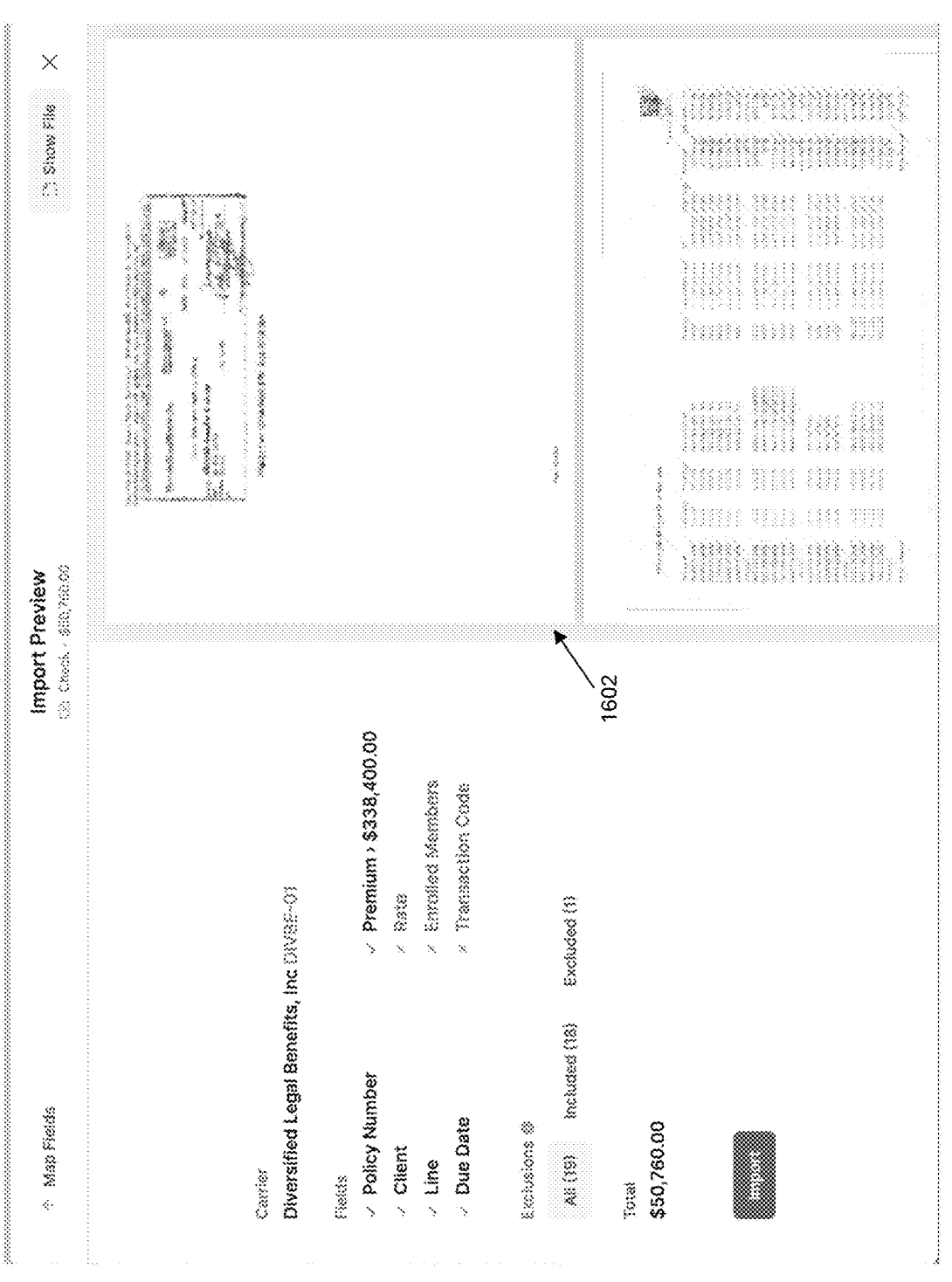
FIG. 16A illustrates an example user interface surfaced in response to a user interaction with a specific interactive element of the user interface of FIG. 15.

Continuing the example of FIG. 14, icon 1402 is an interactive element that is linked to the statement data object of the identified statement. For instance, a user can select icon 1402, which reveals the UI of FIG. 15. This UI shows the ingested, processed transactions within the statement identified by icon 1402. In the example of FIG. 15, a user can select icon 1502 to show the ground-truth data on which this statement is based. For instance, selecting icon 1502 results in the UI of FIG. 16A, in which ground-truth data is shown in portion 1602. In FIG. 16A, the physical check shown was used to make the deposit. By scrolling down in portion 1602, the user can reveal in FIG. 16B the start of a ground-truth statement, which may have been included with the check or may have been sent separately and linked via the system to the deposit check. The system parses the ground-truth statement pdf to generate the system-specific statement shown in FIG. 15, which treats each transaction as a dynamic, interactive data object in the system.

In general, deposits, statements, and invoices can take many forms and be ingested in many ways. For instance, any of these may come from an image (e.g., an OCR'd image) of a physical copy. They may also come in native electronic form, e.g., in a pdf file or spreadsheet-based file. Deposits, statements, and invoices can be ingested into the system manually, e.g., by a user selecting the file for download, by dragging and dropping the item into the system, etc. These items may also be ingested automatically, as described throughout. For instance, the system may monitor (e.g., receive forwards from) an email folder in which deposits, statements, or invoices are sent to or from, or may monitor a folder in a file system for the same, and may automatically ingest these types of data.

Once ingested, the system parses the input data (e.g., in pdf, spreadsheet, etc. format) and generates deposit, statement, invoice, and transaction data objects. In order to properly parse the input data, the system stores the ingested data in a consistent format for each type of data object in the system. For instance, FIG. 15 illustrates formatted transaction data from the pdf statement of FIG. 16B, and FIG. 17 illustrates formatted transaction data from the differently formatted pdf statement of FIG. 18.

Figure 16B:
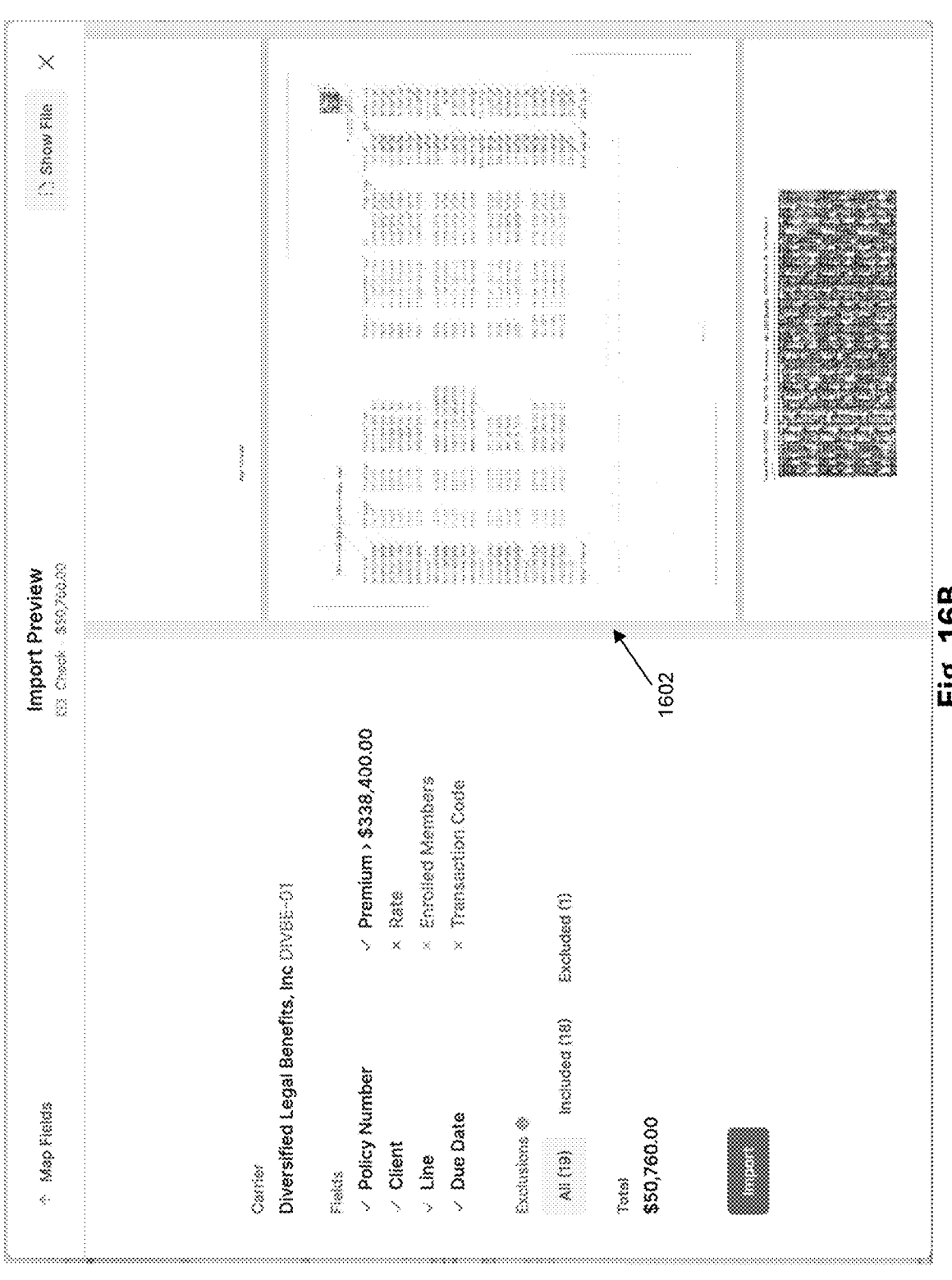
FIG. 16B illustrates an example user interface provided after a user interaction with the user interface of FIG. 16A.
Figure 18:
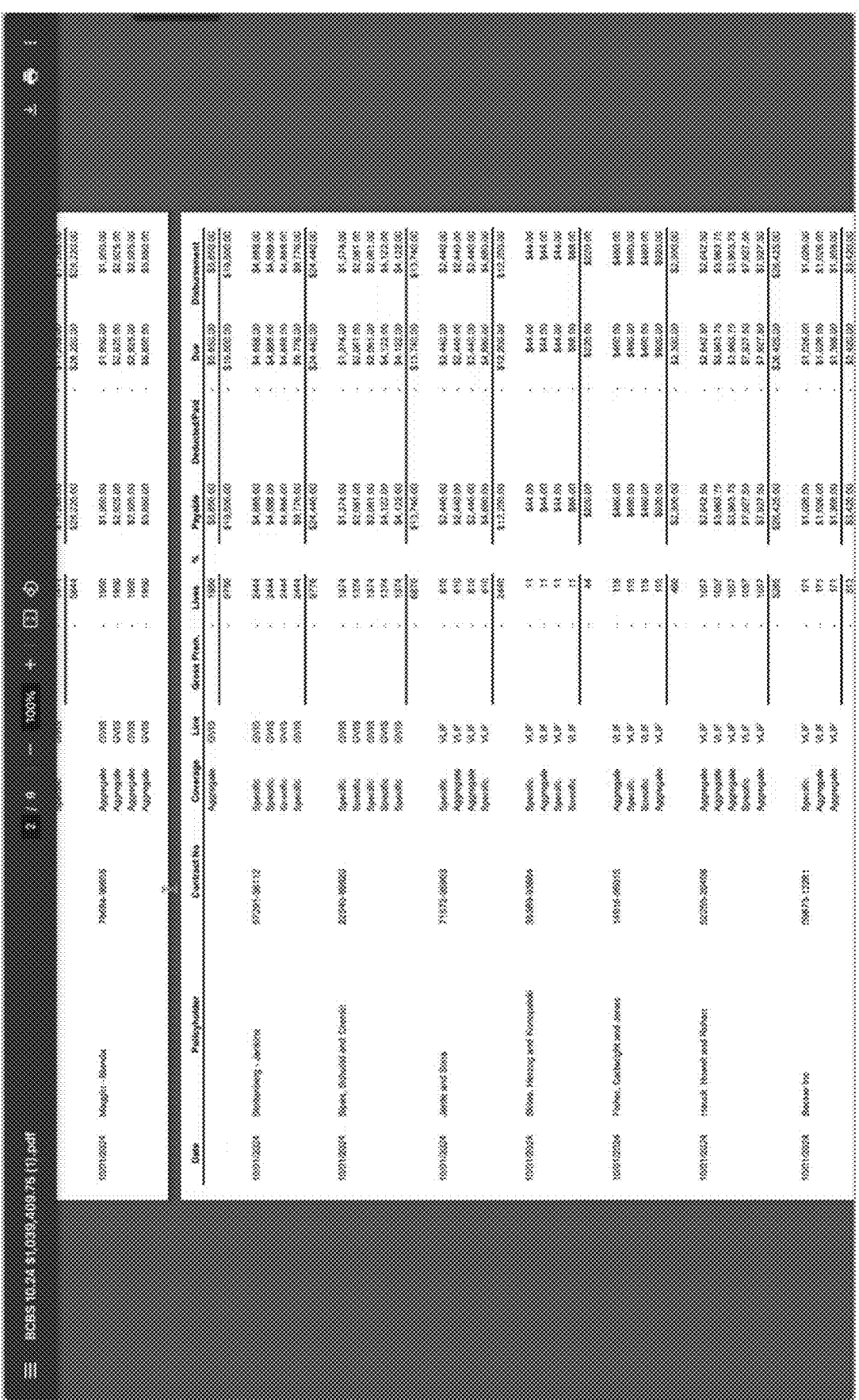
FIG. 18 illustrates an example pdf statement that is the ground-truth for the formatted transaction data of FIG. 17.

As described above and illustrated in, e.g., FIG. 16B and FIG. 18, input data can come in many different types of formatting, particularly because brokerages may be working with data from thousands of carriers and clients, and may have several different agencies within it. Thus, parsing ingested data into a consistent format ensures that the resulting data objects have a consistent structure within the system and its operations. For instance, the consistent format of a data object can include consistent fields, attributes, naming conventions, and objects associated with each data object. Different systems do not have consistent formatting for data objects, sometimes within the system but certainly across systems, and therefore making connections between actual data objects (as opposed to, e.g., a mere identification of the data object like an identifier in a spreadsheet) is not functionally possible.

Returning to FIG. 1, each row of that user interface represents a deposit data object in the system. Indeed, the deposit data object is the "anchor" for each row in the UI of FIG. 1; in particular embodiments, a row cannot exist with a deposit data object. Deposit data objects are represented to the left of divider 130, and statements (along with other information, as described herein) are represented on the right of divider 130. For instance, statement element 136 corresponds to a particular statement data object in the system, and statement element 138 corresponds to a partially applied statement data object, as described more fully below. Thus, divider 130 separates the UI of FIG. 1 into a first portion dedicated to deposit data objects and a second portion dedicated to statement data objects, among other things.

Importantly, and as explained below, the deposit and statement data objects in the system are both dynamic and interactive. So too is the particular UI in FIG. 1 in which the balancing and relationships (or lack thereof) of these dynamic, interactive data objects are displayed. For instance, the relationship between data objects is an attribute stored in the system in connection with the data objects, and this relationship can both dynamically change—e.g., in real time-based on the system's or a user's operations on one or both of a pair of associated data objects. In addition, a data object's real-time relationship with other data objects, with the system, and with a corresponding object in an external accounting system (e.g., the brokerage's general ledger) is also displayed in FIG. 1 and can dynamically change. These features are explained in more detail below. In addition, the example UI of FIG. 1 includes an identification of the person(s) assigned to that row and communications regarding the data objects in that row, where these communications are embedded within the UI, which is one example of an embedded communication described more fully below.

Each row in the example of FIG. 1 corresponds to a particular deposit data object. In FIG. 1, deposit information on the left of divider 130 includes the following features. Carrier 114 identifies the carrier associated with the deposit data object. As explained below, this carrier information is an attribute of the deposit data object i.e., it is not necessarily the carrier information contained in the raw deposit information, nor the carrier information that is an attribute of a deposit data object in an external system, such as in the brokerage's general ledger. Instead, this carrier information comes from the system's consistent data model for deposit data objects, and therefore is the carrier information that the system assigns to, and associates with, the respective deposit data objects. In particular embodiments, each carrier for a system deposit data object may correspond to a particular primary key identifier for that particular carrier in the deposit-data-object format.

Reference number 116 refers to a specific identifier, such as an object ID, in an external system, such as a general ledger. Agency field 118 is used, in the example of FIG. 1, to identify a specific agency within the brokerage that the deposit pertains to. Date 120 and amount 124 are deposit date and amount, respectively, that the system assigned as attributes to the deposit data object when it was made in the system. Description 122 in the example of FIG. 1 corresponds to the description field described in connection with FIG. 2, above. Carrier 114 identifies a carrier name in the example of FIG. 1; this more generally refers to a company, as described above.

In the example of FIG. 1, each deposit data object corresponds to a deposit that has been posted to an external accounting system. The specific system for a particular deposit data object is illustrated by an icon, e.g., icon 108, that identifies this external accounting system. Deposit information may be pulled from, and posted to, an external accounting system, and these icons identify the specific external system(s) that also contain this deposit information. However, while the deposit information may exist in many different systems, the deposit data object itself is specific to this system.

In the example UI of FIG. 1, the right side of divider 130 identifies in statements column 126 (1) whether a statement data object has been matched to, and associated with, the particular deposit data object, (2) the specific statement data object(s) that have been matched, and (3) the status of those statement data objects, e.g., whether they correspond to an uploaded statement, an imported statement, or a statement that has been posted to an external accounting system (e.g., the brokerage's general ledger). While the example of FIG. 1 illustrates matching deposits to statements, which in the context of insurance brokerages contain policy-level transaction details, this disclosure contemplates that deposits may be matched to other production such as invoices, using the same functionality as described herein for statements.

Related column 128 identifies journal-entry data objects that are sometimes used to balance deposits and production. People column 135 identifies the person(s) assigned to, or working on, the particular row and/or its constituent data objects. As explained below, in particular embodiments, while multiple people may work on a row, there may be only a single assigned owner of that row, and this assignment may be made automatically by the system. And as explained more fully below, in particular embodiments, the portions of each row corresponding to this column may be an interactive element that permits a user to contact the identified people and/or search for other person(s) to contact or add to this column.

Comments column 132 identifies a portion of notes and brokerage communications made regarding the row and its constituent data objects, and/or identifies whether such notes and communications have been made. As described below, in particular embodiments column 132 may correspond to embedded communications, such that the portion of each row below that column is an interactive element that reveals notes and correspondence (e.g., emails) that are persistently stored with the row and/or the constituent data objects, so that a user can, simply by interacting with this UI column, see related notes and communications, even if such communications are generated from an external system (e.g., the communication is an email). In particular embodiments, as explained below, a user can also generate new communications (e.g., a new email or an email reply) from the communications UI that is surfaced when a user interacts with these interactions elements, and this communications UI may be surfaced on top of the UI shown in FIG. 1 (i.e., the UI of FIG. 1 is persistently displayed, and a user is not navigated away from this UI in order to interact with the embedded communications UI).

Figure 19:
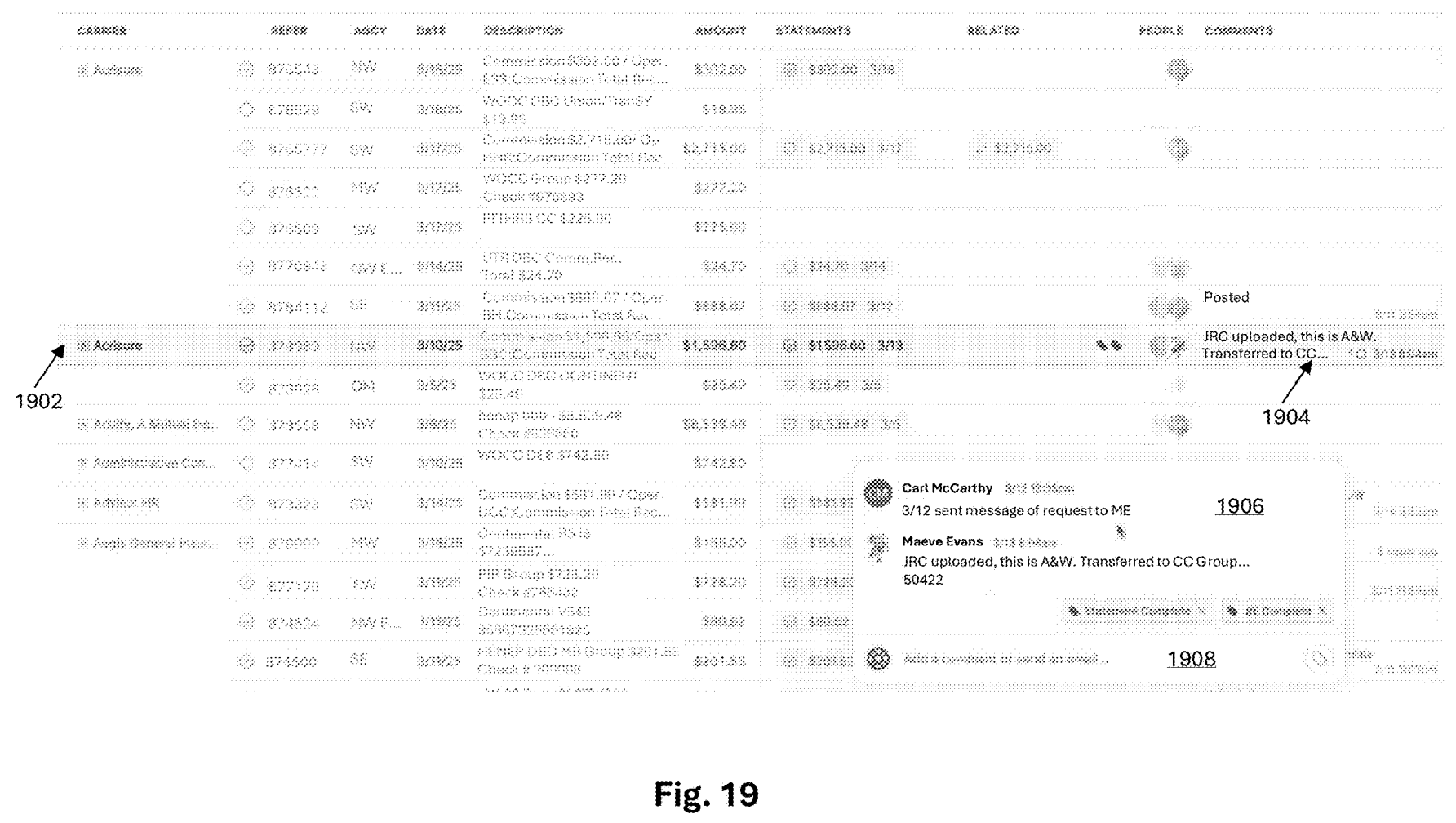

For example, FIG. 19 illustrates an example embodiment in which each row in the "Comments" column is an interactive element, for instance even if no content is within that row portion. In the example of FIG. 19, selecting row portion 1904 that corresponds to row 1902 results in UI 1906, which is overlaid on top of the UI illustrated in FIG. 1. In the example of FIG. 19, UI 1906 includes comments made to the row, and also includes embedded communications interactive element 1908, which initiates the embedded communications functionality described below. UI 1906 in FIG. 19 also illustrates the use of tags. Tags 133 and 134 are illustrated in the example of FIG. 1, and may be used to, e.g., make system-provided or user-created labels for the row.

In the example of FIG. 1, the data objects and the UI itself are integrated and work together to provide dynamic, interactive functionality. The data objects are dynamic in that they have real-time attributes; in the example of FIG. 1, these include the external accounting system to which each deposit is posted. The data objects in a given row also have dynamic, real-time relationships between each other. For instance, the deposit data object in row 102 is linked in the system to a statement corresponding to the statement data object identified by statement 136. This linkage is a relationship between receipt and production—but not necessarily a balancing relationship, as one powerful aspect of the system of FIG. 1 is that data objects can link that do not necessarily balance. For instance, as explained below, a statement can be linked to a deposit even if those two items do not balance, e.g., because the deposit data object in fact balances with multiple, different statement data objects, or because the statement data objects must be split across multiple deposit data objects. Instead, in the example of FIG. 1 the balancing status (and more generally, the accounting status) of a particular row is provided by real-time status identifiers, such as identifier 103 and identifier 141.

In the example of FIG. 1, real-time status identifiers are not user-provided or directly user manipulable. Rather, these status identifiers are dynamic, system-provided, real-time identifiers of whether objects in a row balance, as well as the status of the particular objects in that row.

For instance, identifier 103 (in the example of FIG. 1, a green circle with a check mark inside) is displayed when the deposit data object is completely accounted for by its associated production data objects. In other words, the deposit corresponding to that deposit data object is fully accounted for. Note that this is distinct, however, from a deposit data object in a row completely balanced with the statement data object(s) in that row—for instance, row 110 does not balance, as explained below, but the deposit data object in that row is nevertheless fully accounted for, as indicated by the status identifier on the left of divider 130 in that row. In contrast, status identifier 131 (here, an empty orange diamond) for the deposit data object of row 112 is displayed because that deposit is not fully accounted for; in fact, the deposit data object in that row has no associated statement data object, as is made immediately apparent by the UI of FIG. 1 (i.e., by the fact that the "statements" portion of row 112 is empty).

It is important to note here that, in the example of FIG. 1, several aspects of the UI are interactive even if the corresponding element is blank. For instance, even though the "statement" portion of row 112 is blank, this portion is still interactive-a user may select this portion, and in response the system may surface a UI (overlaid on the UI of FIG. 1) in which the user can search for and select one or more statements to put into that row, thereby linking the corresponding statement data object(s) with the deposit data object of that row. In particular embodiments, the system may filter statements in this UI to those that have a "carrier" (or "company") attribute that matches the carrier value for a carrier attribute of the deposit in this row, or may surface such statements as the top-ranked choice, e.g., in a scrollable UI. However, a user may still search for statements for other carriers, for instance because a carrier may have different divisions that inconsistently identify the carrier, and this association may be tracked by the system and used to automatically associate, in the system, the deposit data object's carrier ID with the carrier ID of the linked statement, e.g., so that the subsequent automatic matching process (described above) includes statements from this carrier when creating a subset of potential matches to future deposits.

The interactive UI interfaces with the system's dynamic data objects, and other UIs supporting those data objects, to provide a number of functionalities to the user. For instance, each row on the left of divider 130 in the example of FIG. 1 is an interactive element that, when selected, provides information about the corresponding deposit data object in the system. For instance, selecting a particular deposit may take the user to the "deposits" view described above. As another example, selecting a particular row may take the user to, or to a UI that provides access to, the ground-truth deposit data, e.g., to a scanned check and any supporting documentation from a lockbox, as described above. Likewise, each element in the "Statement" column to the right of divider 130 is an interactive element; e.g., selecting a blank portion of the row near that column surfaces a UI to search for and add additional statements, including filtering options for the search, in particular embodiments. Selecting a particular statement element (e.g., element 136) in a row may take the user to the "statements" view described above or to a UI that contains, or provides access to, the ground-truth statement data, e.g., to a pdf copy of the statement with policy-level transactions, as downloaded (automatically or manually) from a particular carrier's statement portal, described more fully below.

In the example of FIG. 1, other elements of the UI are interactive, as well: for instance, a user can select a particular row portion in the "related" column to surface an overlaid UI that allows the user to create a journal-entry data object for that row. Similarly, a user can select a row portion in the "people" column to view, add, or contact persons working on that row, and can select a row portion in the "comments" column to add notes or communications to the row, including embedded communications in particular embodiments. Thus, the UI of FIG. 1 ties together the related data objects, persons, and communications for each row and allows a user to interact with and modify these connections through the respective interactive elements in the UI.

Continuing the discussion of status identifiers, if a user selects a statement to add to row 112 (or a statement is automatically matched to the deposit data object of this row), then status identifier 131 will dynamically update in real time to reflect this change. For instance, if the deposit is now fully accounted for, then identifier 131 will change to look like identifier 103, in the example of FIG. 1. If the statement does not fully account for the deposit, but there is at least a statement associated with the deposit data object and therefore accounting for some of that deposit, then identifier 131 may update, e.g., to look like identifier 141 (an orange diamond that is not empty, but rather has a "does not equal" symbol in it).

In the example of FIG. 1, each row's statement(s) also have a status identifier that identifies the status of the statement corresponding to that statement data object. For instance, the statement identified in row 106 has an associated identifier 140, which is displayed when that production is fully accounted for, e.g., the deposit equals (or is greater than) the statement amount, such that the statement is fully applied and accounted for. In contrast, statement 138 has a status identifier 141 to indicate that, while the statement data object corresponding to 141 is associated in the system with the deposit data object of that row, the applied statement is not fully accounted for-some portion of the statement corresponding to element 138 is not accounted for by the deposit in that row. Thus, the brokerage must still perform some accounting on that statement in order to fully account for the policy-level transactions it contains, some of which are not accounted for by the deposit in this row. Other status identifiers include identifier 139 (a blue square with a check in it), which is displayed when the statement has been posted to the system of record, e.g., to the general ledger, and identifier 142, which is displayed when the system is exporting the statement to the system of record, but that posting has not yet completed. As explained above, these status identifiers are updated in real time and reflect the status of the associated data objects, their relationship to each other, and their status in the system of record.

While FIG. 1 illustrates an example in which a status identifier 141 indicates that a statement is not fully applied, particular embodiments may identify (explicitly or implicitly) the specific portion that has not been applied. For instance, FIG. 20 illustrates an example in which a statement element 2002 identifies a particular statement, its status (i.e., that it is not fully accounted for its associated deposit data object, although that deposit is fully accounted for), the statement amount that is applied to the deposit (i.e. $2,353.45), and the total amount of the statement data object (i.e., $2,364.80), leaving $11.35 in the statement as unapplied to the deposit corresponding to statement element 2002's row. In particular embodiments, this unapplied amount may also be explicitly shown, e.g., as part of statement element 2002.

Particular embodiments of the system described herein permit matching a single deposit to multiple items of production, associating a single item of production with multiple deposits, and matching multiple deposits to many items of production. Consistent with the example of FIG. 1, these items of production may be statements. For instance, FIG. 21 illustrates an example UI similar to that of FIG. 1 in which two statement data objects identified by elements 2102 and 2104 are linked to the single deposit data object in row 2101. Each statement data object includes its own status identifier. FIG. 21 also illustrates a journal entry data object 2106 in the amount of −$1,192.07 that is created and linked to the deposit data object of row 2101. This journal entry can be created in the system, for example by selecting the relevant row portion under the "related" column in the UI of FIG. 1 or FIG. 21, and then entering an amount of the journal entry. This creates a journal-entry data object that is associated in the system with the deposit data object for the row in which the journal entry was created. In particular embodiments, a user can then post this journal-entry data object to the brokerage's general ledger. Thus, this journal entry can be created in the UI of FIG. 21 and then pushed as a general-ledger journal entry to balance the ledger for that brokerage.

The ability to match many statements to a deposit, or vice versa, is particularly useful for brokerage accounting, because while much (at least some) of the matching can and does occur at the statement level, and statement data objects are often what a user will be interacting with, the accounting is actually being performed at the transaction level. This requires policy-level details, as each statement is typically made up of many different transactions, each of which corresponds to a particular policy. Thus, it is sometimes necessary to account for deposits and production at this policy level, which is much more complicated but sometimes required in order to account for a deposit and match it to production. For instance, a carrier may provide a payment that covers many policy-level transactions, but those transactions are a subset of the full set of transactions that happen to be contained in a statement. As explained above, typically nothing about the deposit identifies the specific policy-level transactions it is for, and therefore policy-level reconciliation must occur in order to accurately account for the deposit and the transactions to which it matches. In the example of FIG. 1 and FIG. 21, this accounting can seamlessly occur through the ability to create a dynamic relationship between multiple statement data objects with a single deposit data object, and vice versa, while immediately displaying that relationship and the accounting impact for the constituent data objects via the interactive UI.

Much of the functionality achieved by the dynamic, interactive data objects in connection with the UI described above cannot be achieved using conventional systems. For instance, the many-to-one, one-to-many, and many-to-many connections between deposit and statements data objects is not obtainable in existing systems. In fact, many existing subledgers support only one kind of data object, and therefore do not have dynamic relationships between these different deposit and production data objects. Likewise, the system described above connects with, but is not itself, the brokerage's general ledger, and therefore the relationships made between data objects and the statuses of those data objects to each other and to the accounting system can occur much earlier in the brokerage accounting process.

For instance, in conventional systems, a user may post a deposit to the general ledger. The user may then attempt to post a statement to the general ledger, but in many existing systems there is no connection at the data-object level between any particular deposit data object and any particular statement data object. In addition, partial posting of a statement is not allowed even in systems in which limited data-object matching is performed (as described above), and so a user must either withhold an entire statement that the user has not fully reconciled (e.g., at the transaction level to particular policies), or must create fictitious "statements" that contain only reconciled policy-level transactions, but then do not correspond to any real-world, ground-truth statement. However, embodiments of the insurance brokerage accounting system described herein can create connections between deposit data objects and production and communicate the accounting status of the transaction, e.g., that some portion of a statement is unbalanced and needs to be accounted for, before the deposit or the production is even posted to the system of record. Moreover, embodiments of the system described herein can do so on a partial basis, because the statement data objects of the insurance brokerage accounting system described herein accurately represent the ground-truth. If a particular transaction in a statement is not reconciled to a particular policy, the system described herein still treats that transaction as part of the statement, and dynamically updates the relationship between this statement and any corresponding data object(s) accordingly, and includes the unreconciled transaction in any deposit data object the statement is applied to. In particular embodiments, however, the system may not post the statement to an external accounting system until all transactions are applied to policies. Therefore, the system allows data-object matching and reconciliation, and dynamically surfaces the accounting implications of these relationships, even for statement data objects that contain transactions that have not been associated with any policy. This allows the brokerage to perform accounting tasks in parallel with, or even before, policy-level reconciliation, as well as before posting to the system of record.

In addition, the system pulls from, and pushes to, the system of record, and therefore communicates both the status of the relationship of data objects as matched in the system, while also communicating the status of those data objects with respect to the system of record (e.g., whether they have been posted or not). As another example, the system can identify and surface potential production matches to a particular deposit data object before those objects are posted to the general ledger, and indeed, in particular embodiments even before the production is fully imported into the system. In addition, particular embodiments of the system can treat unmatched portions of production (e.g., an unmatched portion of a statement) as a data object that can be investigated and matched to another deposit. This type of data object does not exist in conventional systems, and instead an unmatched portion must be kept track of outside the conventional systems, until the exact matching deposit is identified. Moreover, in conventional systems an unmatched portion puts the entire statement into triage (unreconciled), even if only a single policy-level transaction is unmatched. Finally, the status of deposits and production is only statically communicated, if at all, in existing systems, for example by running a report that outputs a spreadsheet reflecting the general ledger. In contrast, the data objects and UI described above are dynamic and update in real time, as a user or the system interacts with and modifies those objects and the relationships between them, and therefore the resulting status of related data objects is always up-to-date.

In the example of FIG. 1, filters 150 provide various filtering functions that can be selected by a user. Much of this filtering is made possible due to the dynamic nature of the data objects and relationships between them, as well as the real-time status associated with those objects. For instance, filters 150 can filter for "incomplete" rows, in which the deposit, statement, or both are not fully accounted for. Filtering on other status or combinations of status may be performed as well in the example of FIG. 1, and filtering may be performed on object attributes such as carrier, deposit or production dates, etc.

As explained above, particular embodiments of the system described herein can pull deposit and production information from external brokerage accounting systems (e.g., the general ledger or one or more subledgers) and push data to those external systems, although the data objects used by the insurance brokerage accounting system described herein are specific to that system and are not the same data objects as are used by an external system. In many embodiments, a brokerage works with several external accountings systems, particularly if the brokerage includes many separate agencies. For example, a broker that acquires agencies will acquire those agencies' legacy operations as well, and therefore can have many different accounting systems to work with in order to balance the brokerage's overall books. These external systems work differently, define data objects differently, and are typically poorly integrated, if integrated at all. However, the broker may receive a single deposit or commission statement from a carrier that applies to all activity across all its agencies, and the broker may need to synthesize information across multiple, different agency systems in order to reconcile that single deposit or statement. As a broker can receive thousands of deposits and statements, these demands can be quite challenging.

Particular embodiments of the insurance brokerage accounting system described herein interface with each external system used by a brokerage. For instance, the system can import data from each external system, normalize the imported data from each external system into the insurance brokerage accounting system's consistent data-object format, and then perform operations on those data objects as described above, thereby bypassing the limitations caused by distinct external-system boundaries. For instance, in the example of FIG. 1, the system can match deposits that originated from one external system to statements that originated from another external system. From the perspective of the system of FIG. 1, the insurance brokerage accounting system can perform the same functions on data objects that it pulls from separate external systems as it can on other data objects (e.g., can create relationships between partial objects or many objects, provide real-time statuses on the relationships between objects and their accounting impacts, etc.). Once these operations are performed in the insurance brokerage accounting system, then the resulting data objects can be pushed to external systems, if desired, thereby creating reconciled objects without having to work within the limitations of those external systems.

Figure 22:
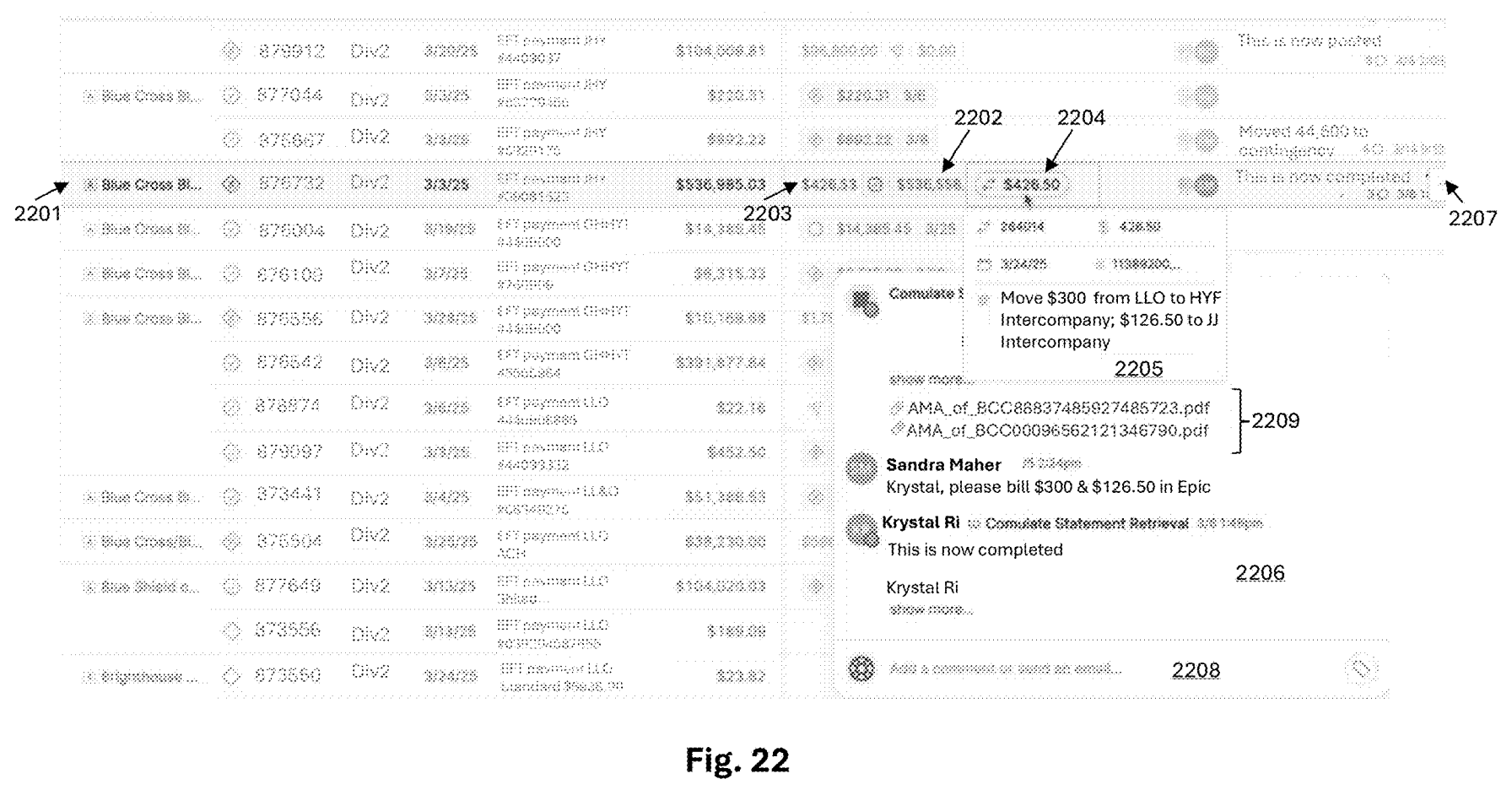

For instance, FIG. 22 illustrates an example in which a deposit data object corresponding to row 2201 is linked to a statement data object represented by element 2202. These two data objects do not balance, as indicated by element 2203 and the status identifiers for this row. However, as illustrated in FIG. 22, the statement data object is fully accounted for by the linked deposit data object, and this statement data object has been used to push the statement to the general ledger. As shown in FIG. 1, the deposit data object is not fully accounted for. In the example of FIG. 22, this is resolved through the use of a journal entry 2204 in the excess amount of the deposit data object. Specifically, this journal entry operates as an intercompany transfer for the brokerage, i.e., a portion of the deposit represented by the deposit data object is transferred from one agency within the brokerage to another agency within the brokerage. In particular embodiments, such as in the example of FIG. 22, this information is shown by, e.g., the user hovering a cursor over the journal entry data object shown by element 2204, which then reveals UI 2205 that provides the intercompany (and inter-system) transfer details.

Because the two different agencies within the same brokerage use different external accounting systems, the intercompany transfer results in a portion of the deposit corresponding to row 2201, which exists in agency system "A," being transferred to another accounting system, "E." Thus, the example of FIG. 22 illustrates how embodiments of the system described herein can create data objects to balance deposits, production, and journal entries across different external systems, while providing the real-time status of these data objects, the relationships between them, and the impact of their relationships on the brokerage's policy-level accounting. In addition, a user can see and link production across external systems to a deposit data object that may be in yet another system; the UI of FIGS. 1 and 22 surface these data objects (assuming more limiting filters are not set by the user) because they share the uniform data-object structure in the insurance brokerage accounting system, regardless of their origination in the brokerage's external subledgers and general ledger.

FIG. 22 also illustrates how embodiments of the system described herein facilitate communication and collaboration on deposit and production data objects for a given deposit. For example, interacting with the portion of row 2201 in the "comments" column reveals UI 2206, which surfaces comments, notes, and messages made by brokerage employees regarding this row. As illustrated in FIG. 22, UI 2206 may include links to documents such as ground-truth accounting data 2209. In addition, UI 2206 includes embedded communication element 2208, which is described more fully below.

Figure 23:
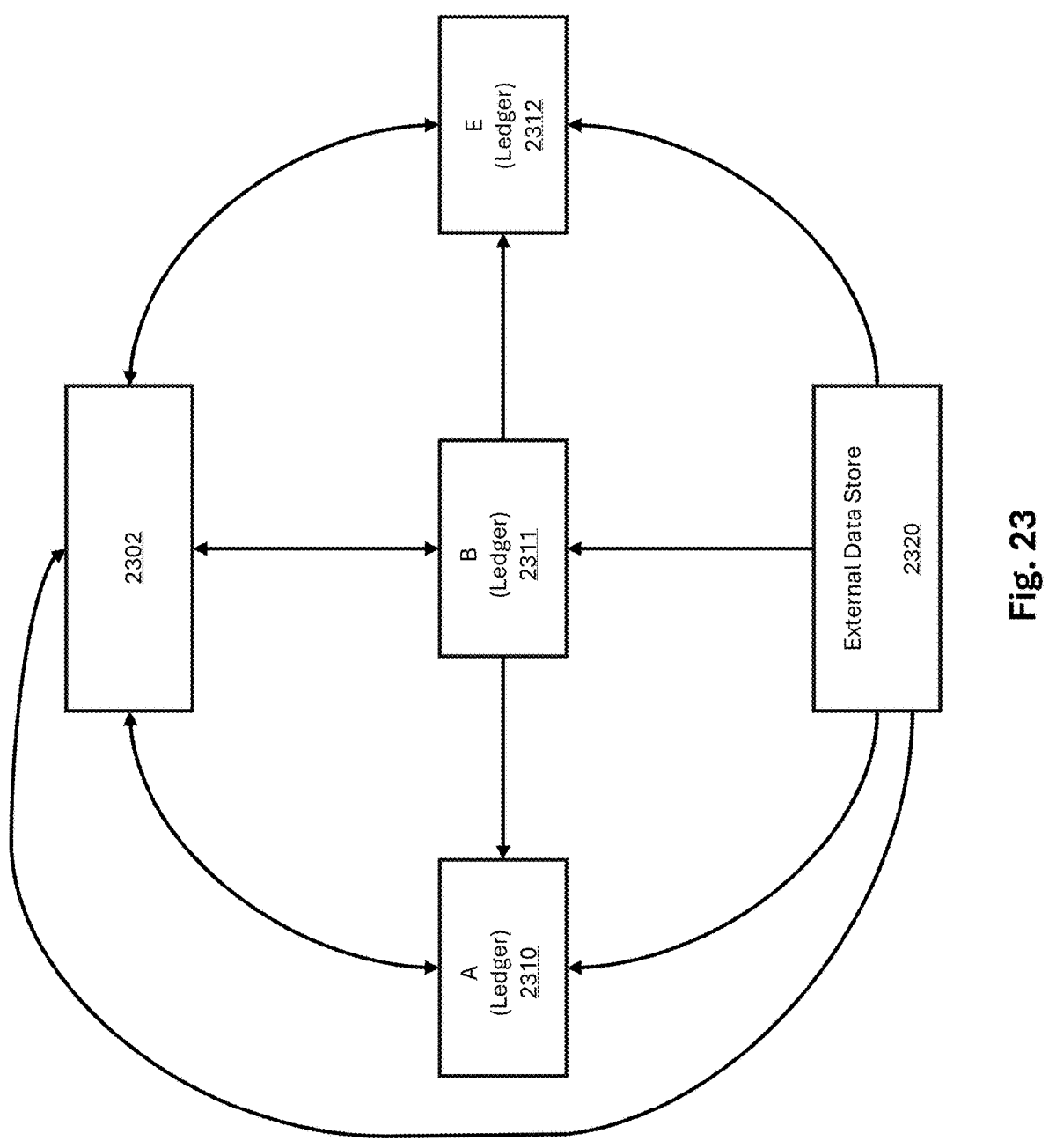
FIG. 23 illustrates an example of the interactions between an insurance brokerage accounting system and example external systems.

FIG. 23 illustrates an example of the interactions between insurance brokerage accounting system 2302 and external systems. In the example of FIG. 23, a brokerage uses three external systems: (1) system A 2310, which is a general ledger; (2) system B 2311, which is subledger that only operates on production; and (3) system E 2312, which is also a general ledger. While the example of FIG. 23 illustrates three external accounting systems, this disclosure contemplates that a broker may have many more external systems, or fewer.

In the example of FIG. 23, system 2302 integrates with each external system, such that system 2302 can pull from, and push to, each external system. The external systems may also have some limited integration; in the example of FIG. 23, production system B 2311 can push production data to the general ledgers of system A 2310 and system E 2312; however, data does not flow in the opposite direction. In addition, data can be pushed from external data store 2320 to each of the external systems and to system 2302. While a single data source 2320 is shown in the example of FIG. 23, this may represent external data sources (e.g., the brokerage's document management system, a carrier's statement portal, email attachments, etc.).

As described above, external systems 2310, 2311, and 2312 each represent data using their own internal data-object structure. Therefore, when system 2302 of this disclosure pulls data from these systems, it normalizes this data to the specific data-object format used by system 2302 and described herein. The same process occurs for data pulled from external data sources 2320.

One feature of insurance brokerage accounting system 2302 is that it can associate different data objects pulled from external systems, and treated as distinct objects by those systems, to create connections between these data objects and treat them as like objects for certain purposes. For instance, because each external system has its own data representation for, e.g., a carrier, the same carrier may be represented differently in different external systems and therefore treated as distinct entities. For example, a carrier "UniCare Assurance, Inc." may be represented as "UniCare Assurance" in one system, "UniCareAssurance," in another system, and as "UniCare, Inc." in yet another system. However, what is treated as a distinct entity in these systems is really a single entity, and therefore when, e.g., determining potential matches between deposits and production, data objects from each of these entities should be considered when creating a subset of production data to evaluate for potential matches. Likewise, a user searching (e.g., in the example UI of FIG. 1) for production to match to a deposit data object in a particular row may want to treat all production from what external systems treat as different entities as production from a single entity.

Particular embodiments of the insurance brokerage accounting system described herein can create associations between data objects in the insurance brokerage accounting system that are pulled from different external systems and external data sources so that certain attributes of these objects are treated as equivalent, even if those attributes differ in their respective external systems. These associations may be based on user interactions with these data objects in the system, in particular embodiments. For instance, continuing the example above, a user may create a relationship between a data object that has a carrier attribute of "UniCare Assurance" with a statement that has a carrier attribute of "UniCareAssurance." Based on this user-created relationship, the insurance brokerage accounting system may link these attributes together, not just for these two data objects acted on by the user but for all such data objects going forward. For instance, the system may have a primary key identifier associated with each carrier attribute, and the system may link the primary key identifier of "UniCare Assurance" with the primary key identifier of "UniCareAssurance," based on this user activity, so that subsequent data objects having these different carrier attributes nevertheless are treated in the system as coming from the same carrier. A user may dissociate these connections, which are then updated in the system's attribute linkages.

While the example above relates to a carrier attribute, similar techniques may be used on other disparate attributes of data objects that are associated by user activity, such that the system creates associations between such attributes in its data model so that, going forward, these disparate attributes are treated similarly.

One complication with external systems is that duplicates in system 2302 can appear based on the interactions between external systems. For instance, suppose system 2302 pulls and pushes data from both system B 2311 and system A 2310. If system 2302 pushes a particular statement to system B 2311, this statement will be assigned a data object ID in system 2311. External systems typically—but not always—communicate this object ID to system 2302, which associates this ID with the pushed statement so that when system 2302 subsequently pulls information from system B 2311, it recognizes that statement as a copy of the statement it pushed, and does not erroneously create a duplicate record of this statement in its system.

However, suppose system B 2311 pushes this statement to system A 2310. System A 2310 typically gives this statement its own object ID in that system. If system 2302 pulls this statement from system A 2310, system 2302 will not know whether this statement is a duplicate of the one it provided to system B 2311 based on the object ID, because this object ID was created without system 2302's involvement or notification. Simply looking at attributes such as deposit amount is not sufficient, as a carrier may in fact make multiple deposits of the same amount. Thus, unequivocally treating such objects as duplicates will create gaps in the system 2302's data objects.

To overcome these challenges, particular embodiments of this disclosure evaluate the metadata of pulled objects to determine whether that object is a duplicate of one already in system 2302. Here, a duplicate refers to an instance in which the underlying data object is really the same as, or is just a modified version of, one that already exists in system 2302, even though such data objects may not be identical duplicates (e.g., because they may have different attribute values for certain attributes due to the fact that different systems have different data-object models for the same set of data). Thus, importing a duplicate data object results in erroneous double-tracking of some underlying data, e.g., a statement, even though the data objects corresponding to that statement may not necessarily be identical.

These approaches may be system dependent, in particular embodiments. For example, system B 2311 may provide its object ID in a particular field (e.g., a "description" field) when it pushes the data to system A 2310. Thus, system 2302 may deduplicate by evaluating the metadata associated with the data object it receives from system A 2310 to see whether the object ID of system B 2311 is present. If so, then system 2302 can treat this data object as a duplicate of an existing data object in its system.

As another example, in particular embodiments system 2302 may place fingerprints in the data its pushes to external system. The exact fingerprint used (e.g., a particular field in a AL3 file) may be system dependent. This fingerprint generated by system 2302 when pushing data to an external system may then be used to determine whether data objects pulled from another system contain any duplicates. For instance, when pulling production data from system A 2310, system 2302 may evaluate that data for a system-2302 provided fingerprint (which evaluation may require processing the data received from system A 2310, e.g., performing multiple join operations); if the fingerprint is present, then system 2302 treats that pulled data object as a duplicate of an existing data object. In this example, the deduplication key was first generated not by data from system 2311 or from 2310, but by system 2302 in order to prevent duplicates from appearing in its system.

The examples described above relate to instances in which system 2302 pushes data to one system and pulls from another, with some intervening communication between these two external systems, but the interactions with external systems described herein can be used in a wide variety of circumstances. For instance, for some external systems, when a user edits an object in that system then the external system voids the original object and creates a new data object with the edited data. In these instances, system 2302 may check metadata of the newly created data object and/or metadata of the voided object, if provided, in order to determine whether a data object in its system corresponding to the voided data object should likewise be voided and replaced with the new data object.

In particular embodiments, the insurance brokerage accounting system described herein may function as a full subledger between a policy-level brokerage system, such as an enterprise customer relationship management system, and an enterprise general ledger. These enterprise systems are horizontal and so are designed for many different use cases, and therefore do not have the capabilities to perform policy-level accounting. Embodiments of the system described herein may serve as a full subledger that performs such policy-level accounting, among other functions, and can bring policy-level data in from an enterprise CRM and push reconciled accounting data to an enterprise general ledger based on the matching, reconciliation, and related features described herein.

In the example UI of FIG. 1, "People" column 135 identifies the brokerage employee(s) who are working on the particular line item in the respective rows. Thus, a user working with the UI of FIG. 1 can see the relationship and accounting statuses of deposit data objects and balancing data objects, and can also see who is assigned to this particular line item. In particular embodiments, assigned employee(s) may be identified based on manual input. For instance, each portion of the row under the "people" column may be an interactive element that, when selected, allows a user to search for and choose one or more specific employees to assign to the line item corresponding to that selected row portion.

In particular embodiments, employee assignments may be made automatically by the system. For instance, in particular embodiments, the system may designate a single employee as the owner of the line item and then assign the line item to that employee. Thus, an assignee is not merely anyone who is involved with, or who has interacted with, the line item and its constituent parts (e.g., deposit, statement, invoice, etc.), but rather is the single employee designated as the owner for that line item. In particular embodiments, a manually created assignee may take precedence over an automatically identified assignee, e.g., assignees may be identified only for line items that do not have a manually identified assignee, and manual assignment may override or delete an automatic assignee.

In particular embodiments, such as in the example of FIG. 1, while a single employee is the owner/assignee of a particular line item, more than one employee may be identified under the "people" column for that line item. For instance, two employees are identified in the "people" column of row 102 in FIG. 1. This is because particular embodiments show all the employees who are involved in the line item (e.g., took some action on the underlying data objects for that line item), which includes but is not limited to the line item's owner/assignee. Particular embodiments, such as in FIG. 1, may distinguish in the UI between owner and non-owner persons, for instance by using a graphical emphasis for the owner relative to the non-owner. For example, in people column 135, the owner is identified by an icon that has full opacity, while the non-owner person is identified in a greyed-out, somewhat transparent icon. This disclosure contemplates that any suitable graphical emphasis may be used to distinguish between displayed non-owners and the owner for a line item.

In particular embodiments, the owner/assignee may be a derived deposit owner for the line item. For example, a derived deposit owner may be based on activity with respect to a particular data object. For example, a derived deposit owner may be determined according to the action-assignment priority of the follow example logic. First, if an employee has been identified (e.g., manually) as the owner of the corresponding statement data object, then this employee will be the owner of the line item in the UI of FIG. 1. If there is no statement owner, then the employee who imported the statement may be identified as the owner in the UI. If there is no statement importer (e.g., because the statement was automatically imported by the system), then the employee who uploaded the statement is identified as the owner of the line item in the UI. While the description above uses statement data objects to describe the example assignment logic, the same logic may be used for invoice data objects, transaction data objects and deposit data objects.

In particular embodiments, the system may automate both uploading and importing of statements or invoices. In such embodiments, the owner of a particular line item in the UI of FIG. 1 for that data object may be identified as the system itself (for example, by the owl icon in the "people" column 135 of FIG. 1).

Other UIs described herein may include a column that identifies the owner of the line item (for a table) or of a particular data object in other graphical representations. For example, a triage UI may display those line items that are not reconciled, and a deposit UI may identify information about deposit data objects. Such UIs may use the assignment logic described above, or may use other assignment logic. For example, a deposits UI may include an automatically identified owner for a line item based on (in order) the brokerage individual who is manually assigned as the owner of the deposit, the individual who posted a corresponding deposit data object to the accounting system of record, or the individual who uploaded the raw deposit information to the system. As another example, embodiments may automatically assign an owner to one or more of a broader set of brokerage-accounting-system data objects, such as production data objects, deposit data objects, billing-request data objects, company payable data objects, and exception data objects. The owner may be automatically assigned by, for instance, a user's creation of or interaction with such data objects in the insurance brokerage accounting system.

As explained throughout, embodiments of the systems described herein provide functionality that is not available in conventional accounting systems. For instance, conventional deposit systems of record do not have the notion of an incomplete, unbalanced deposit data object in which the deposit is not balanced with a corresponding statement or invoice. Likewise, conventional accounting systems do not have the concept of a statement data object that is partially balanced or posted, e.g., in which certain statement transactions match to, and are in balance with, a particular deposit while other statement transactions are not. Thus, such systems are not able to, for example, filter based on matched but unbalanced deposit-statement line items. In contrast, embodiments of the systems described herein provide this functionality, and likewise can provide a UI that both presents information about these data objects and allows a user to interact with and modify those data objects. The ability, as illustrated in FIG. 1, to see the employees assigned to particular line items becomes particularly useful in such embodiments, as a user can see details about specific data objects as well as the person(s) who are best positioned to take action on those data objects. In addition, the techniques described above do not require a user to manually identify themselves or others as an owner of a particular line item, which can be especially burdensome and impractical when thousands of line items exist.

In particular embodiments, the icons or other graphical identifiers for persons (such as owners) in the "people" column of FIG. 1 may be interactive elements, so that a user can select the element to see more information (e.g., name, contact information, etc.) about such persons. In particular embodiments, selecting an icon may also create an overlaid element (a UI element overlaid on the main UI) for generating and storing communications about the particular line item (for example an embedded communication, as explained more fully below), and such communications may automatically be directed to the person corresponding to the selected icon and/or to the owner of the line item.

In particular embodiments, an insurance brokerage accounting system may include on a UI an interactive element that imports statements from an external, third-party system. For instance, statements pertaining to a particular brokerage are often imported from the carrier's system, which may be accessed for example via a secure carrier website.

Figure 24:
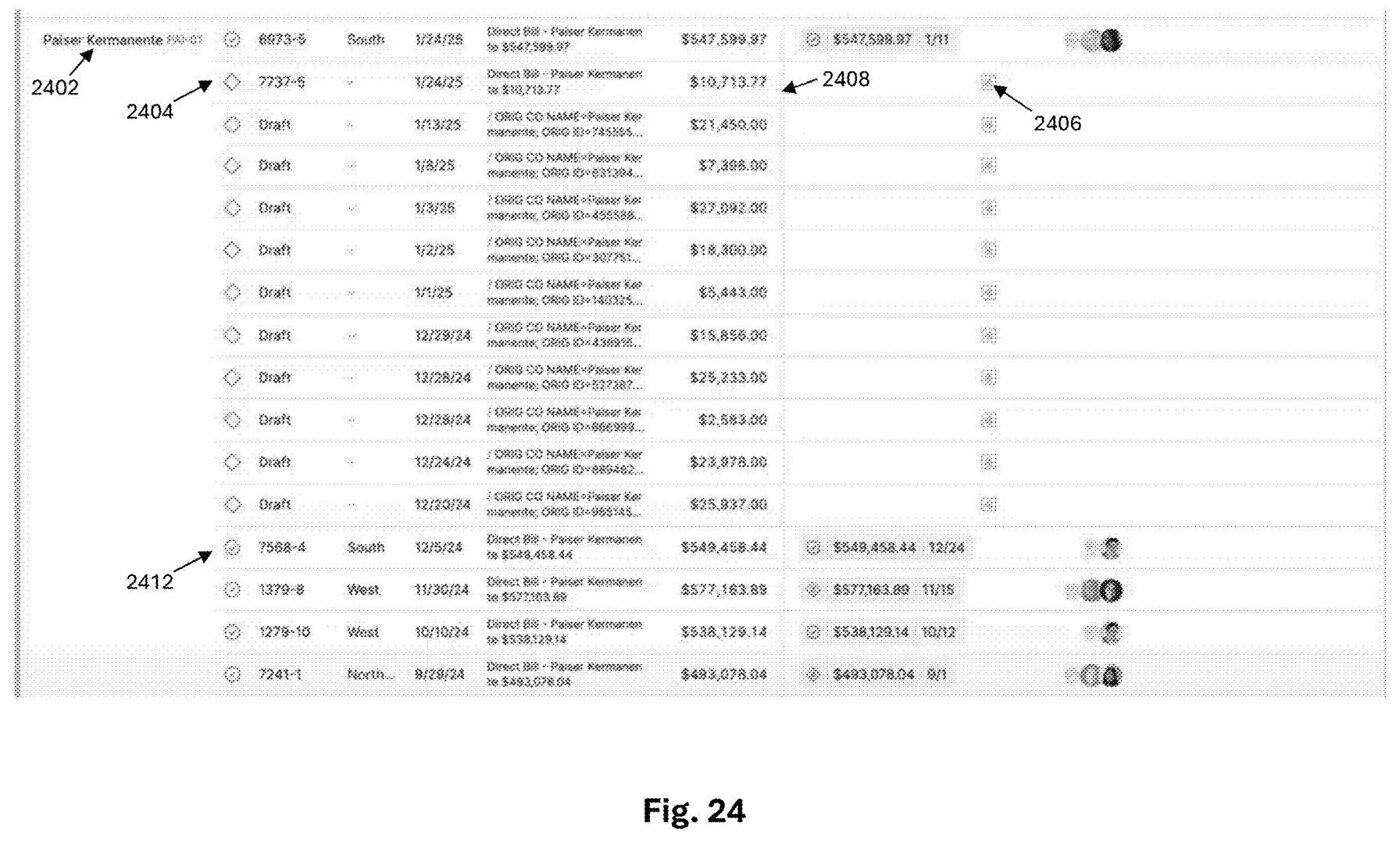

FIG. 24 illustrates an example UI element 2406 for importing statements. As illustrated in the example of FIG. 1, element 2406 may appear when a deposit in a row does not have any matching statement. For example, the UI of FIG. 24 illustrates a detailed view for a particular carrier 2402. Several line items in the UI are deposit data objects that do not have any matching production data object (e.g., statement or invoice data object), and therefore the right side of divider line 2408 has no corresponding data object identified for these rows.

For those line items that contain no matching statements, a user may interact with UI element 2406 to load the appropriate statement into the system. Each UI element 2406 is specific to its line item, such that the resulting functionality of selecting a particular UI element in this flow depends on the specific UI element that is selected.

For example, if a user selects element 2406 of row 2404, then the corresponding carrier information defines the resulting functionality. Here, the carrier information can be extracted from cither or both of (1) carrier information 2402 or (2) attributes associated with the deposit data object of row 2404, such as the originator ID, originator company name, or other data captured in a "description" field as shown in the example of FIG. 2. In other words, UI element 2406 is associated with the specific carrier corresponding to line item 2404, and thus selecting UI element 2406 launches a portal to that specific carrier's system that holds the corresponding statement.

In order to identify the proper carrier location from which to access a statement for a particular deposit data object, then in response to a user interaction with the interactive element corresponding to that deposit data object, the system determines one or more sets of authentication credentials that may access the statement from the right secure location of the right carrier. A brokerage typically has many, many authentication credentials, including many sets that each correspond to a particular carrier, and each set may correspond to a different secure webpage of the carrier for accessing different statements. For instance, a brokerage may contain many different agencies, with each agency having its own statements and carrier account, and therefore each agency having a distinct set of authentication credentials for the carrier.

Figure 25:
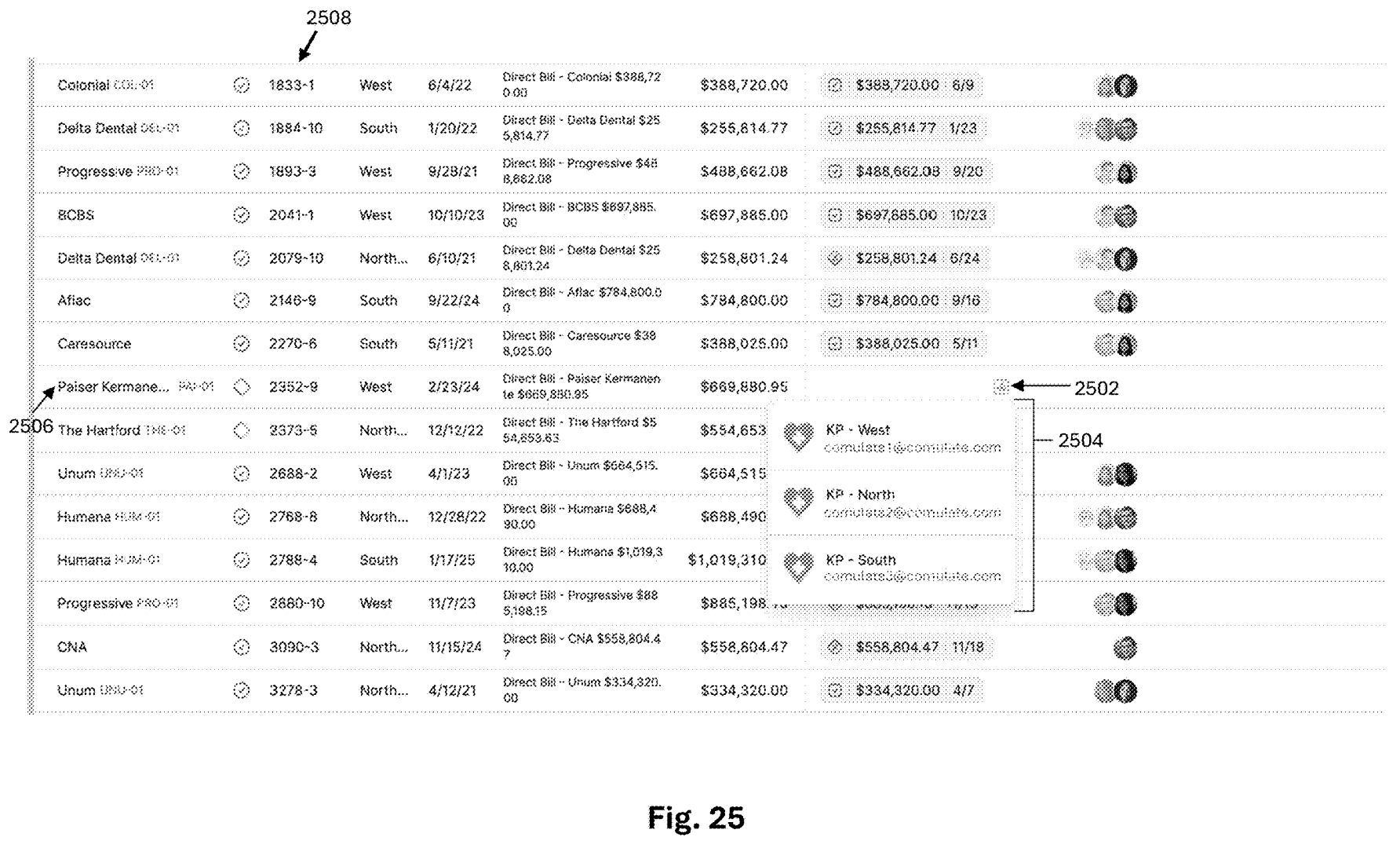

In particular embodiments, interacting with element 2406 may first surface a UI element that (1) presents the available brokerage-side authentication credentials for the carrier of the associated deposit data object and (2) allows the user to select a particular set of credentials to start the statement acquisition process. For example, FIG. 25 illustrates an example embodiment in which a user has selected element 2502 corresponding to carrier 2506. Here, because there are multiple credential accounts for the brokerage associated with this carrier and the system is not sure which specific set of credentials to select, then UI 2504 is provided. Each row in UI 2504 is an interactive element linked to a specific set of brokerage-side credentials for that carrier, and the user may select the desired credentials for the statement being imported, e.g., for the brokerage agency that the statement pertains to. In particular embodiments, a particular authentication credential may be automatically selected from a set of available credentials based on, e.g., an attribute of the deposit data object, such as an agency code in column 2508 that can identify the specific agency to which the statement pertains, or based on previous user activity, as described more fully below.

Figure 26:
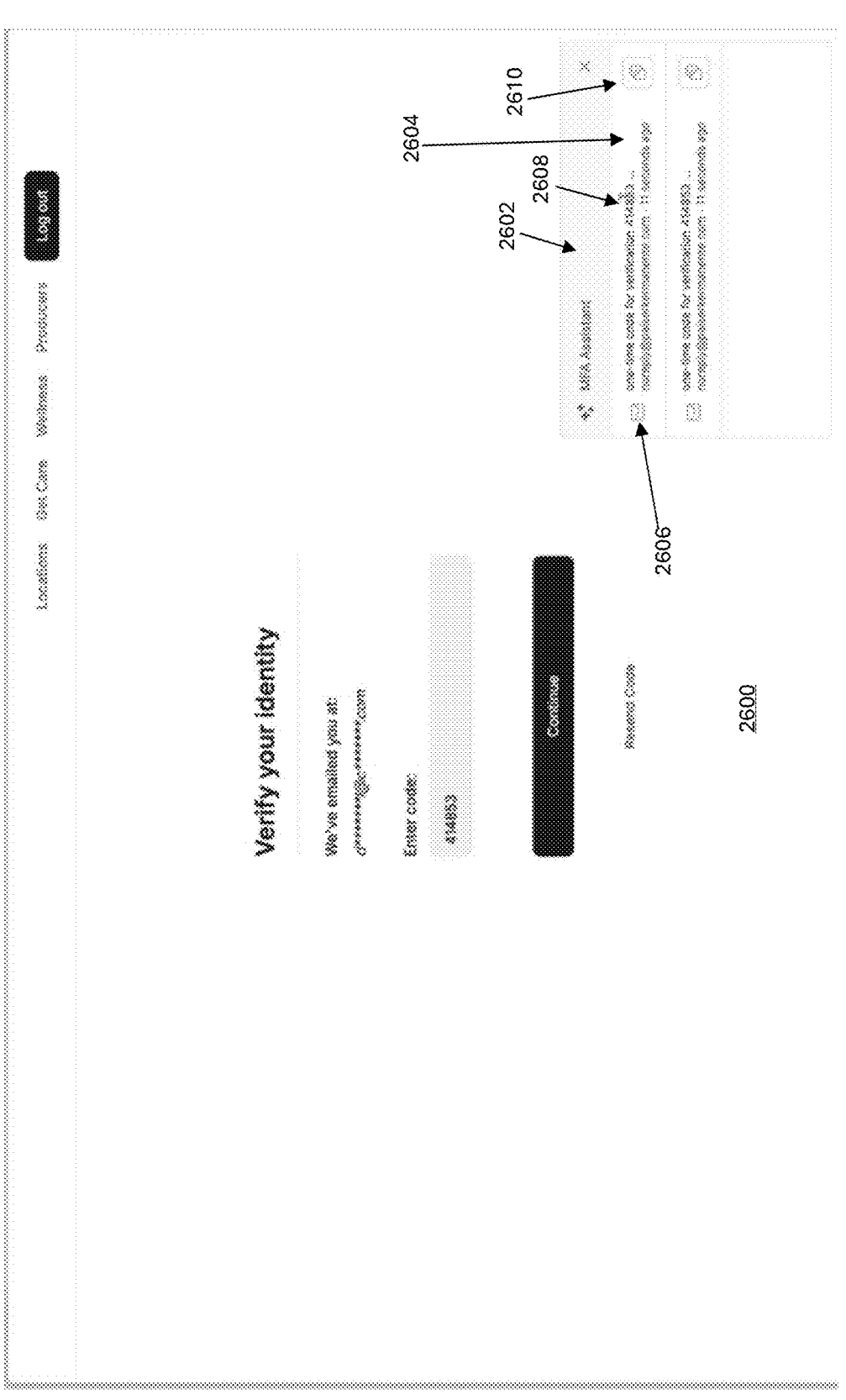
FIG. 26 illustrates an example user interface displaying a carrier's website identified in connection with the interactive element of FIG. 25.

Upon selecting UI element 2406 (and then a set of authentication credentials in particular embodiments) then the system may automatically launch a web browser with a URL directed specifically to the carrier's web domain for accessing brokerage statements. The web browser may be integrated within an application of the system itself (such as an in-app browser) or may be external to the system (such as a third-party web browser). The web domain to access a statement is often a landing page that requires authentication credentials to login to the carrier's statement system. The system may store login credentials for the user to various carriers, and may automatically fill in the correct credentials for the carrier that is linked to UI element 2406. Likewise, as authentication often requires providing multi-factor authentication (MFA) credentials that are generated by a carrier in response to an authentication request, the system may automatically identify received MFA credentials and surface those to the user or automatically fill them in-all, in particular embodiments, within the system's integrated in-app browser and user interface, or within an external browser, using a browser plug-in integrated with the system. For instance, FIG. 26 illustrates an example UI 2600 of an in-app browser, where the UI is displaying a carrier's website identified in connection with UI element 2406. In other words, in the example of FIG. 26, the user has never left the system's software application when interacting with element 2406.

In FIG. 26, the user has attempted to login to the identified carrier's system, which generated a request for the user to provide MFA credentials. In other words, the user has submitted authentication credentials of the brokerage, which the carrier has approved, but the carrier implements a multi-factor authentication technique in order to access the secure carrier statement portal. In particular embodiments, the system may integrate with the communication systems (e.g., email inbox, real or virtual phone number for calls or SMS messages, etc.) used by the user to receive MFA credentials. For instance, in the example of FIG. 26, the system has access (approved by the brokerage, and either direct access or via email forwarding, etc.) to an email inbox for which the brokerage (e.g., its accounting department) receives MFA emails. Upon receiving an email containing MFA credentials, the system identifies the email and surfaces that email on top of, or in conjunction with, the UI displayed on the in-app browser (or external browser via a browser plugin) showing the carrier's authentication page.

For instance, in the example of FIG. 26, transient MFA UI 2602 is automatically surfaced to the user on top of (overlaid on) the carrier's authentication web page. MFA UI 2602 contains the specific MFA codes provided by the carrier in response to the user's authentication request. In the example of FIG. 26, MFA UI 2602 contains several UI elements, including an interactive element showing each MFA message (e.g., message 2604); an indication of the source of the MFA message (e.g., indicator 2606 identifying that the MFA message came via email); and an interactive paste button 2610 that captures the specific MFA code (e.g., MFA code 2608) in the corresponding message, without capturing other text in that message, so that a user can automatically paste the MFA code in the message (e.g., the system may copy the MFA credentials to a clipboard). In particular embodiments, if only one MFA message is surfaced in UI 2602, then the system may automatically propagate the corresponding MFA code into the MFA-entry box in the carrier's webpage.

In particular embodiments, UI 2602 may be surfaced when the carrier's MFA portal is loaded, e.g., when an input box is displayed to a user to input MFA credentials. Thus, upon detecting that the user is at an MFA portal (e.g., based on text on the webpage or the URL of the webpage, etc.), UI 2602 may be automatically surfaced to the user on top of the webpage, notifying the user that the automatic MFA authentication is occurring.

Access to the brokerage's messages (e.g., emails) is possible because of the previously granted permissions. While the system therefore ingests or has access to many emails (or SMS messages, etc.), the system can select the specific email (or SMS message, etc.) with the needed MFA code based on an identification that the email is from a carrier for which an MFA code is needed. The system knows that an MFA code is needed for a particular carrier based on, for example, a user's interaction with UI element 2406, which is carrier specific. In particular embodiments, the same analysis may be used to determine a specific agency email account of the brokerage from which to access the MFA credentials. In addition, the system can identify the carrier from the URL that launches the carrier webpage, and/or from website data when using an in-app browser or browser plugin. Thus, the system can identify that an email arrived from the carrier for which an MFA code is needed, and can surface only that email (out of all accessed emails) in UI 2602. In addition, particular embodiments may require that an MFA message, such as an email, be received within a certain amount of time from a user action, such as from selecting UI element 2406 or from entering the brokerage's credentials into the in-app browser or plugin, further ensuring that only relevant MFA messages appear in UI element 2602.

Among the many benefits of UI 2602 is that such carrier authentication messages may be sent to a brokerage's designated contact information (e.g., email address or virtual phone number) for such messages, which may be distinct from any particular user's contact information. Thus, while an employee normally has, for example, their own email account open on their work computer, in order to access an MFA authentication code the user typically would need to instead log into and access a shared brokerage account for receiving such messages. UI 2602 bypasses this point of friction, among other things.

In particular embodiments, messages 2604 displayed in MFA UI 2602 are interactive elements, such that selecting an element corresponding to a message may open a copy of the full message, either within the system (e.g., within MFA UI 2602) or within the message's native system (e.g., within the email inbox).

Once fully authenticated, a user can access one or more desired statements and select those statements for retrieval. For example, the user may select a URL link to download a statement. In particular embodiments, for example when the user is accessing the carrier website using an in-app browser or plugin, then selecting a statement for download may automatically trigger a UI that prompts a user to approve automatically uploading the selected statement into the system. To do so, the system detects that the selected file is in fact a statement from the carrier, for example by using any suitable statement-detection technique, including those described herein. In particular embodiments, uploading may occur automatically, i.e., may not require any user approval if a statement is detected.

If a user approves uploading the statement or the statement is automatically uploaded, then a statement data object is created in the system for that statement. For instance, FIG. 27 illustrates an example of a "statement" UI 2700 in which a statement corresponding to line item 2702 has been detected and uploaded in response to a user's approval. In the example of FIG. 27, description 2704 identifies the statement as being automatically uploaded. Element 2708 can be selected to import this uploaded statement; in other embodiments, an automatically uploaded statement may also be automatically imported, and this functionality may be an option that can be toggled by the brokerage. For example, a statement may be automatically imported if some or all of that statement has been applied to a deposit; some embodiments may require a statement to be fully applied to one or more deposits in order to automatically import it. As discussed above, the statement importer has been automatically assigned as the owner of the statement, as identified by element 2706, which illustrates that an employee's initials may be used instead of an employee's image icon, in particular embodiments. In particular embodiments, if the statement is automatically imported, then the system may be identified as the owner of that statement data object in the system, e.g., via an icon specific to the system.

Once a statement is uploaded and imported, it may be matched and posted as described above. Thus, in particular embodiments components of the system described herein may work together such that if a user interacts with a particular element 2406 associated with a particular deposit data object, then the system may automatically determine where the corresponding statement is located, automatically identify and upload a selected statement from a carrier's system (thereby creating a statement data object in the system), automatically import the statement, automatically match the statement to a deposit data object in the system (e.g., to the deposit data object associated with the particular element 2406), and then automatically post the matched deposit and statement if each are fully accounted for by the match (thereby creating a deposit data object and a statement data object in the accounting system of record for the brokerage). In particular embodiments, a statement data object may be automatically posted to an external accounting system when each transaction in that statement data object is applied to a particular policy. Other embodiments may also take into account criteria such as the historical intervention rate (i.e., the rate at which users modify a fully applied statement) for the particular carrier that corresponds to a particular statement data object. For example, a statement may automatically post only if the intervention rate is below a particular threshold.

In particular embodiments, statement acquisition may be based on user activity, and therefore may improve over time based on this activity. For example, when an unbalanced deposit data object exists in the system, then a user may pull a statement from a specific carrier website using some specific brokerage credentials out of many available credentials for that brokerage, which may even include many credentials for that specific carrier. If that statement is successfully imported and matched to a deposit, then the system may identify (1) how the statement was obtained (i.e., which carrier portal and which specific set of login credentials were used) and (2) the specific carrier deposit information to which the statement was matched. Then, when a subsequent deposit data object is created in the system, then the system may determine, based on the similarity between previous deposit data objects for which statements were uploaded (e.g., based on a similarity between attributes such as carrier name, ID, bank account used, etc.), a specific carrier portal and set of credentials to use to access the inferred correct statement for that deposit. When a user interacts with element 2406 for that deposit then the identified credentials may be surfaced first or automatically invoked. Moreover, in particular embodiments the system may instead automatically acquire the statement, e.g., by navigating to the portal, using the identified credentials, prefilling an MFA code (if required, for example as described above), and pulling all available statements or all statements that the system determines have not already been pulled, uploading the pulled statements (deleting duplicates, if necessary), and then importing the uploaded statement(s) and matching the correct one(s) to the deposit that triggered this statement acquisition process.

In particular embodiments, when a statement is automatically uploaded to the system (for example using the techniques above) then the statement may be automatically renamed by the system. For instance, a statement downloaded from a carrier website may use a name that is determined by the carrier, and for instance may be seemingly random alphanumeric string. When uploading the statement, the system may rename the file according to, for example, naming conventions specified by the brokerage or by past user behavior. These naming conventions may be specific to particular agencies within the brokerage or to specific carriers. For instance, a particular agency within a brokerage may use the carrier name as the statement name, while another may use the carrier name and statement date. The system automatically names the statement (e.g., as in element 2702 under the "source" column) according to these conventions. In particular embodiments, an accounting system of record may require that statement data objects have a particular naming convention, and thus this automatic naming technique can ensure that statement data objects in the system are ready to post to the accounting system of record when accounted for.

In particular embodiments, an embedded communications UI element may be integrated into a UI. As explained below, the embedded communications element may be a persistently displayed element of the UI on which it appears that facilitates and tracks communications particular to a data object and keeps those communications embedded in a UI showing the data object, even when the underlying communications take place in an external system. As explained below, if a user interacts with a particular embedded communications interactive element and creates a communication, then a subsequent interaction by the same or a different user with that particular embedded communications interactive element will reveal the communication, i.e., the communication is consistently displayed in the embedded communication user interface that appears when a user interacts with the particular embedded communications interactive element, even though that user interface may be transiently displayed on the UI in which the embedded communication interactive element appears. In particular embodiments, the embedded communications interactive element itself may be persistently displayed on this UI, or a preceding interactive element that surfaces the particular embedded communications interactive element may be persistently displayed.

Figure 28:
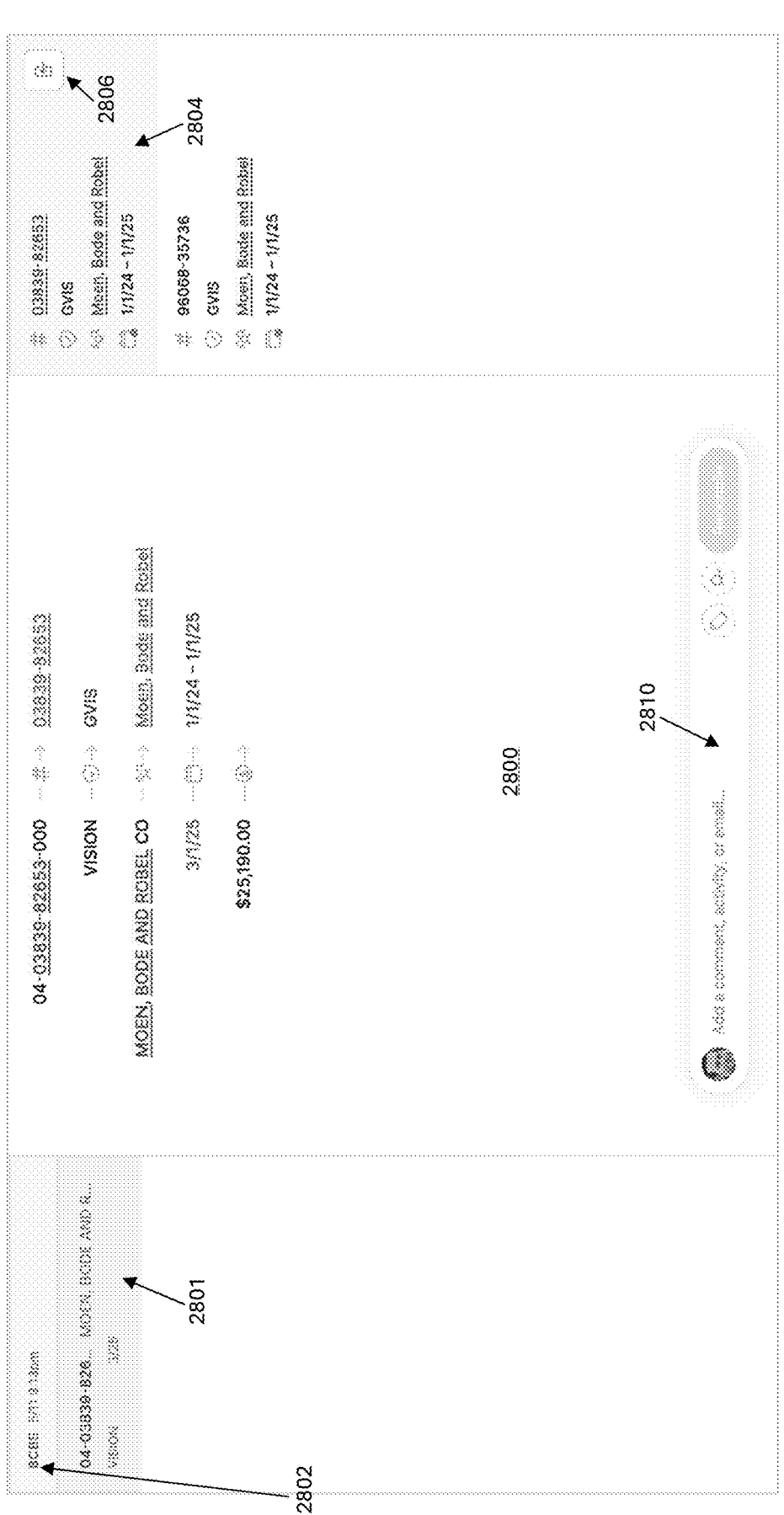
FIG. 28 illustrates an example implementation of an embedded communications element.

FIG. 28 illustrates an example implementation of an embedded communications element. FIG. 28 illustrates an example UI 2800, which illustrates deposit data objects from a carrier 2802 that are not fully accounted for by production data objects in the system. For instance, deposit 2801 does not match any production data object in the system.

UI 2800 illustrates candidate production data objects in the system that are surfaced by the system as a potential match to a particular selected, unmatched deposit (e.g., to deposit 2801). For instance, production 2804 is one potential match to deposit 2801. UI 2800 illustrates an embodiment in which embedded communication interactive element 2810 is persistently displayed on the UI 2800. UI 2800 also illustrates the potential match between a selected deposit data object (i.e., deposit 2801) and a selected candidate matching production data object (i.e., production 2804). In the example of FIG. 28, embedded communication interactive element 2810 persistently appears even as a user selected different deposit data objects. However, each embedded communication interactive element 2810 is particular to the selected deposit data object; while the embedded communication interactive elements look the same, the functionality that occurs when a particular element is selected is tied to a particular deposit data object.

Figure 29:
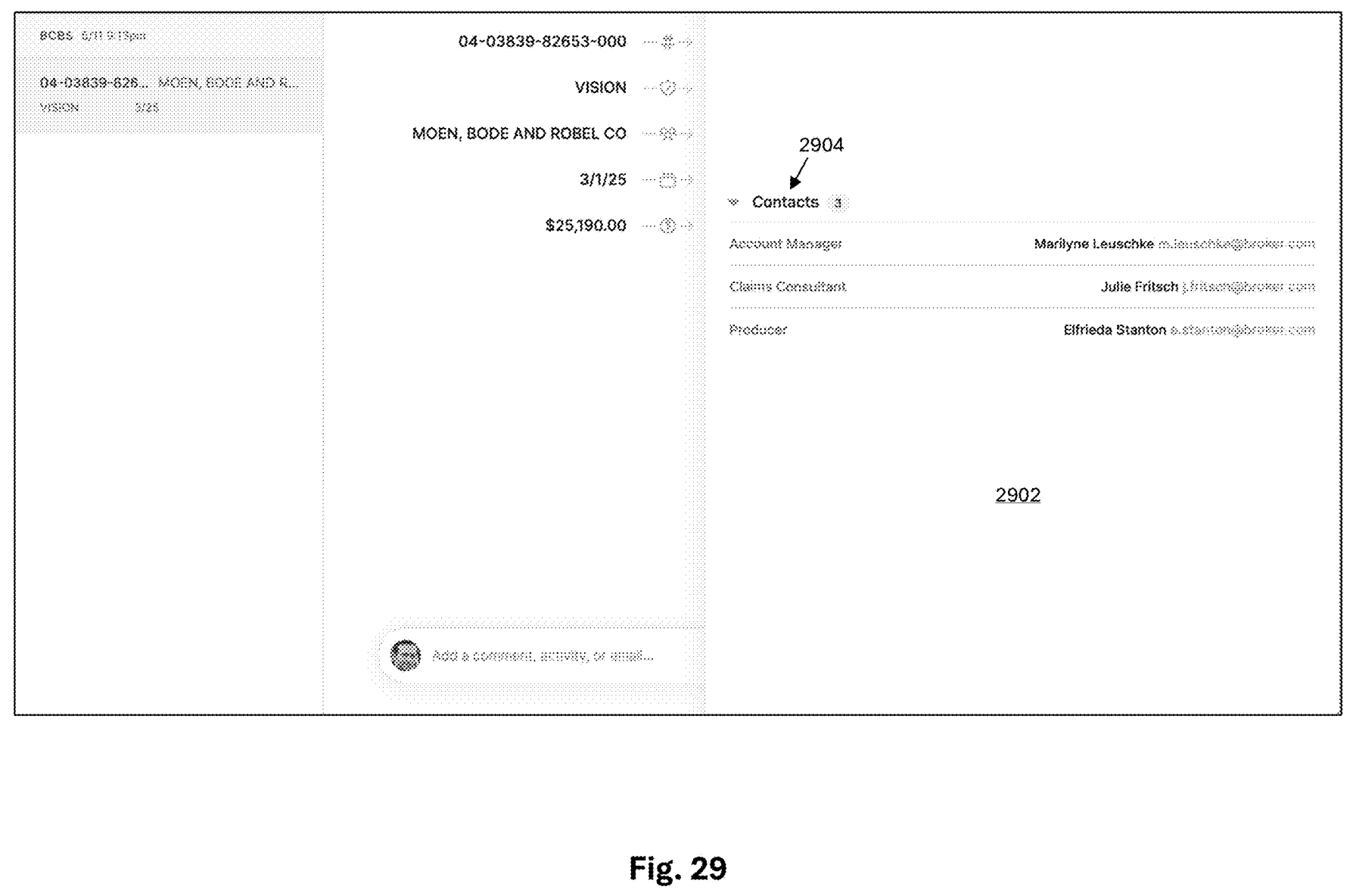

FIG. 29 illustrates an example embodiment of a UI that is surfaced when a user interacts with element 2806. In the example of FIG. 29, UI 2902 includes detail about the production data object that may match to deposit 2801. The associated information can include, for example, contacts 2904, which are the brokerage employees typically responsible for the production data objects. In particular embodiments, contacts 2904 may include the owner of the production data object, for example as automatically determined by the system using the techniques described above.

Figure 30:
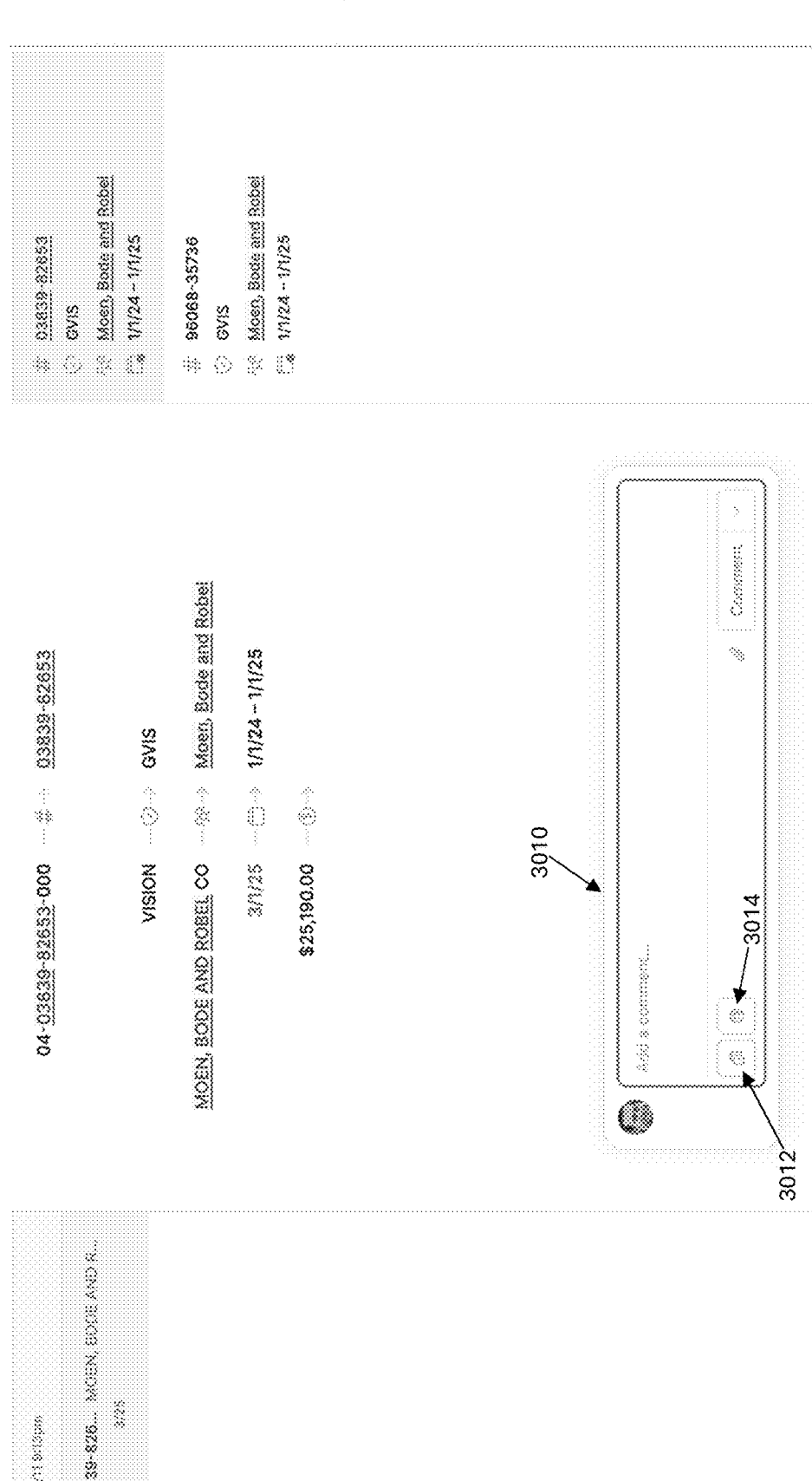
FIG. 30 illustrates an example of an embedded-communication element overlaid on the underlying user interface of FIG. 28.

In particular embodiments, if a user selects initial embedded communication interactive element 2810, then a series of one or more transient embedded communications user interfaces are displayed. In the example of FIG. 30, these transient interfaces are displayed overlaid on the user interface showing the deposit data objects and potential matching production (i.e., overlaid on UI 2800). In the example of FIG. 30, interacting with embedded communication interactive element 2810 results in initial transient embedded communication user interface 3010, from which a user can add a comment, and this comment will be associated with either or both of the deposit data object displayed on UI 2800 (i.e., deposit 2801 and/or production 2804). UI 3010 also contains interactive elements 3012 and 3014 for taking an action regarding one or both of these data objects or generating additional communications regarding transaction these data objects.

Figure 32:
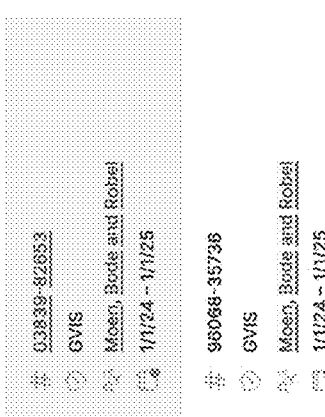
FIG. 32 illustrates another example user interface of an embedded communication element that is surfaced in response to a particular user interaction.

If a user interacts with element 3014 for generating a communication, the transient embedded communication user interface is updated to display UI 3110 of FIG. 31. This UI is used to generate an email regarding one or both data objects. FIG. 31 illustrates an example email interface 3110 generated in response to a user interacting with communication element 3014. In particular embodiments, the system can use custom templates that will pre-fill email contents for the user. These templates may be triggered based on certain conditions, e.g., that the email is the first email associated with the particular data object. For instance, in the example FIG. 31, UI 3110 includes a pre-filled email body and a pre-filled contact 3112 that are created in response to a user interacting with email element 3014. The pre-filled contact may be, for example, the owner of the data object for which the communication is being generated (e.g., in the example of FIG. 31, the owner of deposit 2801). In particular embodiments, such as illustrated in FIG. 32, when a user selects the recipients of an embedded email (e.g., selects element 3112 in FIG. 31), then a list of potential additional contacts may be surfaced for the user, for example using contact information associated with the production data object shown in UI 2804, as this data object is currently proposed as a match to the deposit-side data object in UI 2800.

Figure 33:
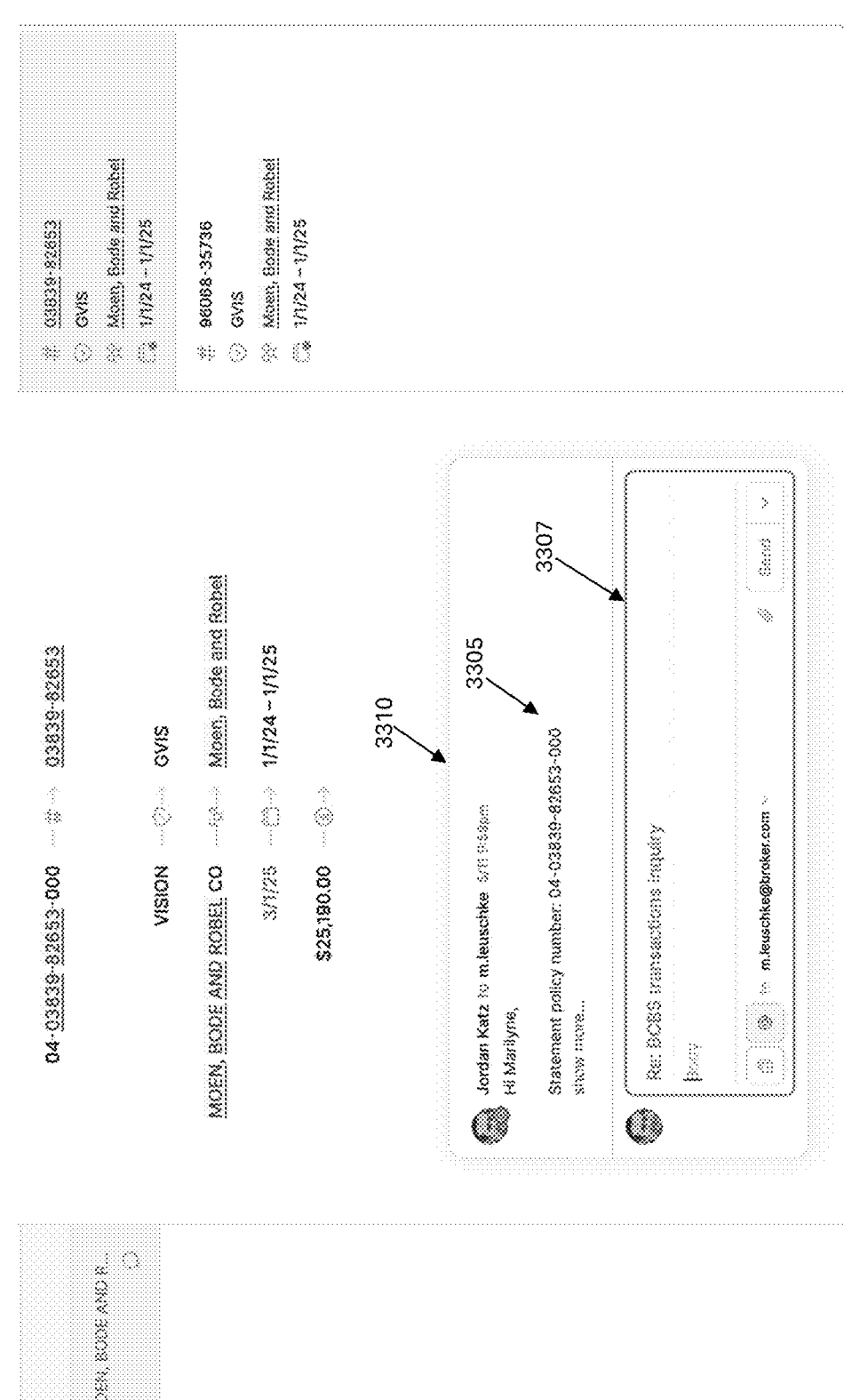
FIG. 33 illustrates an example user interface of an embedded communications interactive element.

The user may edit the contents of the email and then send the email to the recipients, all from transient embedded communication user interface 3110. This will, naturally, generate an email message in the recipient's email inboxes. However, the contents of this email will also be embedded within embedded communications interactive element 2810. For instance, as shown in FIG. 33, after an email is sent, then UI 3310 may (when displayed, e.g., when a user subsequently selects embedded communication interactive element 2810) persistently show the contents of that sent email 3305. In addition, as shown in FIG. 33, a user may send an additional email as a reply to this email (e.g., using element

3307 in embedded communication user interface 3310), and this additional email (and any subsequent related emails) will also be embedded within embedded communication interactive element 2810. Likewise, a reply to the email sent by a recipient (even from the recipient's email inbox, in embodiments in which the system has access to the email inbox) persistently appears within the transient embedded communication user interface for its respective data object.

A user may also select an action UI element (e.g., element 3012 of FIG. 30), which may then generate an action UI 3405 as shown in FIG. 34. Action UI 3405 is part of UI 3410, which illustrates that the previously generated email 3305 remains embedded in the transient embedded communication user interface that is displayed when a user interacts with embedded communication interactive element 2810. In particular embodiment, embedded communications may be shown in temporal order, or based on a type (e.g., email, action) and then on temporal order.

Action UI 3405 allows the user to take certain actions with respect to a deposit data object, a production data object, or a connection between them. For instance, action UI 3405 shows that an action will be taken with respect to production data object shown in element 2804, for example by creating an activity or task for the data object in an external system. Users can then perform actions on this activity/task, for example by adding comments, notes, etc., both in the external system and in the embedded communication. In the example of FIG. 34, the created activity will be embedded in embedded communication interactive element 2810, and may be associated with the selected production data object across various user interfaces in the insurance brokerage accounting system.

One impact of this type of association is that particular embodiments may embed associated communications across different UI flows. For example, a user encountering production data object 2804 or deposit data object 2801 in a different UI (e.g., in the UI of FIG. 1, FIG. 2 regarding deposits, FIG. 3 regarding statements, etc.) may access an embedded communication interactive element on that UI for this object, and doing so may reveal the associated communications generated in a different UI. For instance, a user interacting with an embedded communication interactive element on the UI of FIG. 1 that is particular to deposit 2801 will, in particular seen, the embedded communications generated while viewing UI 2800. In other embodiments, an embedded communication may be specific to the UI in which it is generated, e.g., an embedded communication created for a particular deposit data object in a "Triage" UI may show up only in that UI, while another embedded communication for the same deposit data object created in a deposits UI may show up only in that UI, such that the same data objects may have different embedded communications surfaced according to the selected UI. In particular embodiments, a user may choose whether a particular embedded communication for an object travels across or stays within particular UIs.

In particular embodiments, communications generated entirely outside of an insurance brokerage accounting system but related to a communication or activity that is associated with an embedded communication within the system may be reflected in the embedded communication element. For example, suppose a user generates an email message (or text message, message in a messaging application, etc.) from an embedded communication element. If a recipient of this message replies to the message in the native system (e.g., simply hits "reply" to a received email in an email system), then the externally generated reply may be propagated to, and reflected in, the embedded communication as a reply to the original message. Likewise, if a user takes an action with respect to an activity or task in an external system, and that activity or task is reflected in an embedded communication, then the user's action in the external system may be propagated to the corresponding embedded communication. In fact, the user in the external system may not be part of the brokerage's accounting team at all, but the user's actions with the activity in the external system nevertheless are dynamically reflected in an embedded communication in the insurance brokerage accounting system. Thus, actions taken within the embedded communication may be reflected in an external system, and vice versa.

In particular embodiments, content in an embedded communication (e.g., notes, messages, activities, etc.) may be automatically created. For example, if a condition is met (e.g., a policy associated with a statement data object needs to be renewed), then this condition can automatically trigger the creation of a message to a particular recipient (e.g., to the owner of the statement data object), and this message may be reflected in the embedded communication element.

As explained above, the communications embedded within an embedded communications interactive element can include communications that are generated in, or exist in, external communications system, including email, messaging system, etc. A user can therefore access communications relevant to a data object or to a data object/UI pairing without having to navigate to external communication systems or to investigate what communications have already occurred regarding that data object. Instead, these communications are immediately and persistently embedded within the embedded communication interactive element in which they were created, such that subsequent interactions (from the same user or from any other user) with this same element displays those embedded communications, as well as providing the subsequent-interaction user the ability to respond to the embedded communications or create new ones. These communications are likewise embedded and subsequently displayed to users performing subsequent interactions with this particular embedded communication interactive element.

Figure 35:
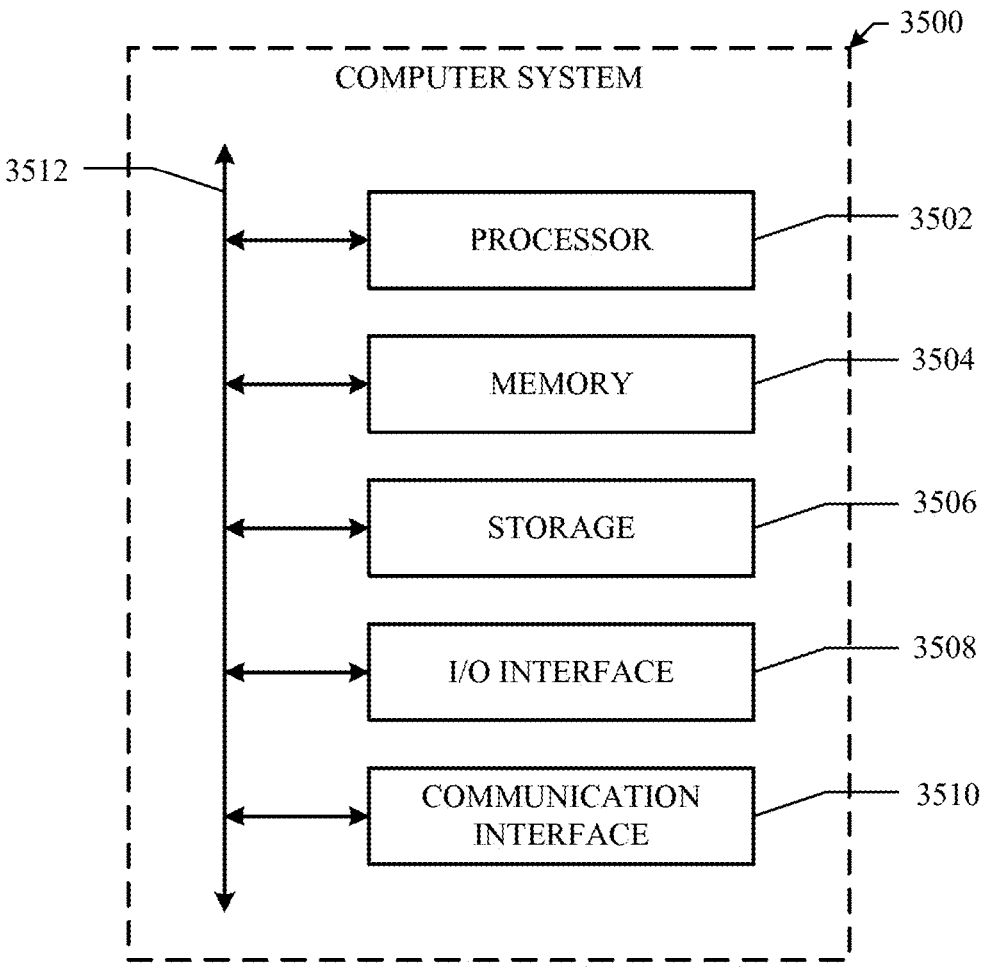
FIG. 35 illustrates an example computing system.

FIG. 35 illustrates an example computer system 3500. In particular embodiments, one or more computer systems 3500 perform one or more steps of one or more methods described or illustrated herein. In particular embodiments, one or more computer systems 3500 provide functionality described or illustrated herein. In particular embodiments, software running on one or more computer systems 3500 performs one or more steps of one or more methods described or illustrated herein or provides functionality described or illustrated herein. Particular embodiments include one or more portions of one or more computer systems 3500. Herein, reference to a computer system may encompass a computing device, and vice versa, where appropriate. Moreover, reference to a computer system may encompass one or more computer systems, where appropriate.

This disclosure contemplates any suitable number of computer systems 3500. This disclosure contemplates computer system 3500 taking any suitable physical form. As example and not by way of limitation, computer system 3500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 3500 may include one or more computer systems 3500; be unitary or distributed; span multiple locations; span multiple machines; span multiple data centers; or reside in a cloud, which may include one or more cloud components in one or more networks. Where appropriate, one or more computer systems 3500 may perform without substantial spatial or temporal limitation one or more steps of one or more methods described or illustrated herein. As an example and not by way of limitation, one or more computer systems 3500 may perform in real time or in batch mode one or more steps of one or more methods described or illustrated herein. One or more computer systems 3500 may perform at different times or at different locations one or more steps of one or more methods described or illustrated herein, where appropriate.

In particular embodiments, computer system 3500 includes a processor 3502, memory 3504, storage 3506, an input/output (I/O) interface 3508, a communication interface 3510, and a bus 3512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3502 includes hardware for executing instructions, such as those making up a computer program. As an example and not by way of limitation, to execute instructions, processor 3502 may retrieve (or fetch) the instructions from an internal register, an internal cache, memory 3504, or storage 3506; decode and execute them; and then write one or more results to an internal register, an internal cache, memory 3504, or storage 3506. In particular embodiments, processor 3502 may include one or more internal caches for data, instructions, or addresses. This disclosure contemplates processor 3502 including any suitable number of any suitable internal caches, where appropriate. As an example and not by way of limitation, processor 3502 may include one or more instruction caches, one or more data caches, and one or more translation lookaside buffers (TLBs). Instructions in the instruction caches may be copies of instructions in memory 3504 or storage 3506, and the instruction caches may speed up retrieval of those instructions by processor 3502. Data in the data caches may be copies of data in memory 3504 or storage 3506 for instructions executing at processor 3502 to operate on; the results of previous instructions executed at processor 3502 for access by subsequent instructions executing at processor 3502 or for writing to memory 3504 or storage 3506; or other suitable data. The data caches may speed up read or write operations by processor 3502. The TLBs may speed up virtual-address translation for processor 3502. In particular embodiments, processor 3502 may include one or more internal registers for data, instructions, or addresses. This disclosure contemplates processor 3502 including any suitable number of any suitable internal registers, where appropriate. Where appropriate, processor 3502 may include one or more arithmetic logic units (ALUs); be a multi-core processor; or include one or more processors 3502. Although this disclosure describes and illustrates a particular processor, this disclosure contemplates any suitable processor.

In particular embodiments, memory 3504 includes main memory for storing instructions for processor 3502 to execute or data for processor 3502 to operate on. As an example and not by way of limitation, computer system 3500 may load instructions from storage 3506 or another source (such as, for example, another computer system 3500) to memory 3504. Processor 3502 may then load the instructions from memory 3504 to an internal register or internal cache. To execute the instructions, processor 3502 may retrieve the instructions from the internal register or internal cache and decode them. During or after execution of the instructions, processor 3502 may write one or more results (which may be intermediate or final results) to the internal register or internal cache. Processor 3502 may then write one or more of those results to memory 3504. In particular embodiments, processor 3502 executes only instructions in one or more internal registers or internal caches or in memory 3504 (as opposed to storage 3506 or elsewhere) and operates only on data in one or more internal registers or internal caches or in memory 3504 (as opposed to storage 3506 or elsewhere). One or more memory buses (which may each include an address bus and a data bus) may couple processor 3502 to memory 3504. Bus 3512 may include one or more memory buses, as described below. In particular embodiments, one or more memory management units (MMUs) reside between processor 3502 and memory 3504 and facilitate accesses to memory 3504 requested by processor 3502. In particular embodiments, memory 3504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3504 may include one or more memories 3504, where appropriate. Although this disclosure describes and illustrates particular memory, this disclosure contemplates any suitable memory.

In particular embodiments, storage 3506 includes mass storage for data or instructions. As an example and not by way of limitation, storage 3506 may include a hard disk drive (HDD), a floppy disk drive, flash memory, an optical disc, a magneto-optical disc, magnetic tape, or a Universal Serial Bus (USB) drive or a combination of two or more of these. Storage 3506 may include removable or non-removable (or fixed) media, where appropriate. Storage 3506 may be internal or external to computer system 3500, where appropriate. In particular embodiments, storage 3506 is non-volatile, solid-state memory. In particular embodiments, storage 3506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3506 taking any suitable physical form. Storage 3506 may include one or more storage control units facilitating communication between processor 3502 and storage 3506, where appropriate. Where appropriate, storage 3506 may include one or more storages 3506. Although this disclosure describes and illustrates particular storage, this disclosure contemplates any suitable storage.

In particular embodiments, I/O interface 3508 includes hardware, software, or both, providing one or more interfaces for communication between computer system 3500 and one or more I/O devices. Computer system 3500 may include one or more of these I/O devices, where appropriate. One or more of these I/O devices may enable communication between a person and computer system 3500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3508 for them. Where appropriate, I/O interface 3508 may include one or more device or software drivers enabling processor 3502 to drive one or more of these I/O devices. I/O interface 3508 may include one or more I/O interfaces 3508, where appropriate. Although this disclosure describes and illustrates a particular I/O interface, this disclosure contemplates any suitable I/O interface.

In particular embodiments, communication interface 3510 includes hardware, software, or both providing one or more interfaces for communication (such as, for example, packet-based communication) between computer system 3500 and one or more other computer systems 3500 or one or more networks. As an example and not by way of limitation, communication interface 3510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3510 for it. As an example and not by way of limitation, computer system 3500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3500 may include any suitable communication interface 3510 for any of these networks, where appropriate. Communication interface 3510 may include one or more communication interfaces 3510, where appropriate. Although this disclosure describes and illustrates a particular communication interface, this disclosure contemplates any suitable communication interface.

In particular embodiments, bus 3512 includes hardware, software, or both coupling components of computer system 3500 to each other. As an example and not by way of limitation, bus 3512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3512 may include one or more buses 3512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure contemplates a system that includes one or more non-transitory computer readable storage media storing instructions; and one or more processors coupled to the one or more non-transitory computer readable storage media and operable to execute the instructions to perform certain functions includes embodiments in which those functions are performed by a single processor, embodiments in which those functions are performed by multiple processors that each perform all the functions, and embodiments in which those functions are performed by multiple processors (e.g., in separate computing devices) where each processor performs at least one function but less than all recited functions.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   displaying, on a user interface of an insurance brokerage accounting system, an identification of at least one of a deposit data object or a production data object;
   displaying, on the user interface of the insurance brokerage accounting system, an embedded communication interactive element that is specific to a particular one of the at least one deposit data object or production data object identified on the display;
   receiving input from a user comprising an interaction with the embedded communication interactive element;
   in response to the user input, displaying a transient embedded communication user interface overlaid on the user interface of the insurance brokerage accounting system and specific to the particular one of the at least one deposit data object or production data object identified on the display;

receiving, from the user and on the embedded communication user interface, second user input comprising a communication regarding the particular data object;
   removing the transient embedded communication user interface from the user interface of the insurance brokerage accounting system; and
   persistently embedding the communication in the embedded communication user interface so that, upon subsequently receiving a third user input on an instance of the embedded communication interactive element displayed in the insurance brokerage accounting system that is specific to that particular data object, then displaying, in response to the third user input, the transient embedded communication user interface including the embedded communication of the second user input.

2. The method of claim 1, further comprising persistently displaying, on the user interface of the insurance brokerage accounting system, an identification of the communication in association with the particular data object.

3. The method of claim 1, wherein one or more of (1) the third user input is from a second user that is different than the user or (2) the instance of the embedded communication interactive element is displayed on the user interface of the insurance brokerage accounting system or is displayed on a different user interface of the insurance brokerage accounting system.

4. The method of claim 1, wherein the transient embedded communication user interface displayed in response to the third user input comprises (1) a first interactive element configured to generate a response to the communication of the second user input and (2) a second interactive element configured to generate a separate communication.

5. The method of claim 1, wherein the communication regarding the particular data object comprises a task.

6. The method of claim 1, wherein the communication regarding the particular data object is created, in response to the second user input, in an external communication system.

7. The method of claim 6, further comprising:
   accessing, from the external communication system, a subsequent communication created in the external system that is responsive to the communication; and
   updating the transient embedded communication user interface to persistently embed within that user interface the subsequent communication.

8. The method of claim 6, wherein the external communion system comprises an email system, and the communication is created in an email account of a recipient of the communication.

9. The method of claim 1, further comprising creating, by the insurance brokerage accounting system, an association between the particular data object and the communication regarding the particular data object.

10. The method of claim 9, further comprising:
    displaying, on a second user interface of the insurance brokerage accounting system, the particular data object;
    displaying, on the second user interface of the insurance brokerage accounting system, the instance of the embedded communication interactive element that is specific to the particular data object;
    receiving, on the instance of the embedded communication interactive element displayed on the second user interface, the third user input; and
    displaying, in response to the third user input, the transient embedded communication user interface overlaid on the second user interface of the insurance brokerage accounting system, wherein the transient embedded communication user interface includes the persistently embedded communication of the second user input.

11. A system comprising:

one or more non-transitory computer readable storage media storing instructions; and one or more processors coupled to the one or more non-transitory computer readable storage media and operable to execute the instructions to:

display, on a user interface of an insurance brokerage accounting system, an identification of at least one of a deposit data object or a production data object;

display, on the user interface of the insurance brokerage accounting system, an embedded communication interactive element that is specific to a particular one of the at least one deposit data object or production data object identified on the display;

receive input from a user comprising an interaction with the embedded communication interactive element;

in response to the user input, display a transient embedded communication user interface overlaid on the user interface of the insurance brokerage accounting system and specific to the particular one of the at least one deposit data object or production data object identified on the display;

receive, from the user and on the embedded communication user interface, second user input comprising a communication regarding the particular data object;

remove the transient embedded communication user interface from the user interface of the insurance brokerage accounting system; and persistently embed the communication in the embedded communication user interface so that, upon subsequently receiving a third user input on an instance of the embedded communication interactive element displayed in the insurance brokerage accounting system that is specific to that particular data object, then the insurance brokerage accounting system displays, in response to the third user input, the transient embedded communication user interface including the embedded communication of the second user input.

12. The system of claim 11, further comprising one or more processors that are operable to execute the instructions to persistently display, on the user interface of the insurance brokerage accounting system, an identification of the communication in association with the particular data object.

13. The system of claim 11, wherein one or more of (1) the third user input is from a second user that is different than the user or (2) the instance of the embedded communication interactive element is displayed on the user interface of the insurance brokerage accounting system or is displayed on a different user interface of the insurance brokerage accounting system.

14. The system of claim 11, wherein the transient embedded communication user interface displayed in response to the third user input comprises (1) a first interactive element configured to generate a response to the communication of the second user input and (2) a second interactive element configured to generate a separate communication.

15. The system of claim 11, wherein the communication regarding the particular data object comprises a task.

16. The system of claim 11, wherein the communication regarding the particular data object is created, in response to the second user input, in an external communication system.

17. The system of claim 16, further comprising one or more processors that are operable to execute the instructions to:

access a subsequent communication created in the external system that is responsive to the communication; and update the transient embedded communication user interface to persistently embed within that user interface the subsequent communication.

18. The system of claim 16, wherein the external communion system comprises an email system, and the communication is created in an email account of a recipient of the communication.

19. One or more non-transitory computer readable storage media storing instructions that are operable when executed by one or more processors to:

display, on a user interface of an insurance brokerage accounting system, an identification of at least one of a deposit data object or a production data object;

display, on the user interface of the insurance brokerage accounting system, an embedded communication interactive element that is specific to a particular one of the at least one deposit data object or production data object identified on the display;

receive input from a user comprising an interaction with the embedded communication interactive element;

in response to the user input, display a transient embedded communication user interface overlaid on the user interface of the insurance brokerage accounting system and specific to the particular one of the at least one deposit data object or production data object identified on the display;

receive, from the user and on the embedded communication user interface, second user input comprising a communication regarding the particular data object;

remove the transient embedded communication user interface from the user interface of the insurance brokerage accounting system; and persistently embed the communication in the embedded communication user interface so that, upon subsequently receiving a third user input on an instance of the embedded communication interactive element displayed in the insurance brokerage accounting system that is specific to that particular data object, then the insurance brokerage accounting system displays, in response to the third user input, the transient embedded communication user interface including the embedded communication of the second user input.

20. The system of claim 11, further comprising one or more processors that are operable to execute the instructions to:

display, on a second user interface of the insurance brokerage accounting system, the particular data object;

display, on the second user interface of the insurance brokerage accounting system, the instance of the embedded communication interactive element that is specific to the particular data object;

receive, on the instance of the embedded communication interactive element displayed on the second user interface, the third user input; and display, in response to the third user input, the transient embedded communication user interface overlaid on the second user interface of the insurance brokerage accounting system, wherein the transient embedded communication user interface includes the persistently embedded communication of the second user input.

* * * * *